US005433076A

United States Patent [19]

Sugiyama et al.

[11] Patent Number: 5,433,076

[45] Date of Patent: Jul. 18, 1995

[54] HYDRAULIC CONTROL VALVE APPARATUS AND HYDRAULIC DRIVE SYSTEM

[75] Inventors: Genroku Sugiyama, Ibaraki; Toichi Hirata, Ushiku; Yusaku Nozawa, Ibaraki; Masami Ochiai, Atsugi, all of Japan

[73] Assignee: Hitachi Construction Machinery Co., Ltd., Tokyo, Japan

[21] Appl. No.: 244,038

[22] PCT Filed: Oct. 28, 1993

[86] PCT No.: PCT/JP93/01558

§ 371 Date: May 16, 1994

§ 102(e) Date: May 16, 1994

[87] PCT Pub. No.: WO94/10456

PCT Pub. Date: May 11, 1994

[30] Foreign Application Priority Data

Oct. 29, 1992 [JP] Japan .................................. 4-291705
Oct. 29, 1992 [JP] Japan .................................. 4-291706
Oct. 29, 1992 [JP] Japan .................................. 4-291707

[51] Int. Cl.[6] ......................... F16D 31/02; F15B 11/08

[52] U.S. Cl. ......................................... 60/426; 60/459; 60/484; 91/512; 91/444; 91/461

[58] Field of Search ................. 91/461, 511, 512, 444, 91/446, 448; 60/420, 426, 459, 484

[56] References Cited

U.S. PATENT DOCUMENTS

| | | | |
|---|---|---|---|
| 4,741,248 | 5/1988 | Budzich | 91/446 X |
| 4,747,335 | 5/1988 | Budzich | 91/448 X |
| 4,748,897 | 6/1988 | Hoge et al. | 91/461 |
| 5,025,625 | 6/1991 | Morikawa | 60/426 |
| 5,046,309 | 9/1991 | Yoshino | 91/461 X |
| 5,168,705 | 12/1992 | Hirata et al. | 91/448 X |

FOREIGN PATENT DOCUMENTS

| | | |
|---|---|---|
| 58-501781 | 10/1983 | Japan . |
| 59-51861 | 4/1984 | Japan . |
| 60-5928 | 1/1985 | Japan . |
| 60-11706 | 1/1985 | Japan . |
| 62-38496 | 8/1987 | Japan . |
| 62-284835 | 12/1987 | Japan . |
| 2-134402 | 5/1990 | Japan . |
| 2-256902 | 10/1990 | Japan . |
| 3-84202 | 4/1991 | Japan . |
| 4-194403 | 7/1992 | Japan . |
| 4-266603 | 9/1992 | Japan . |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A hydraulic control valve apparatus including a flow control valve having a pair of variable throttles, a feeder passage, a pair of load passages, directional control valve devices comprise a seat valve having a seat valve body movably disposed in a housing to form an auxiliary variable throttle in the feeder passage, and a control variable throttle (33) formed in the seat valve body for changing an opening area in accordance with an amount of movement of the seat valve body; (b) a pilot line (24, 29–31, 35–37) for communicating a portion (7C) of the feeder passage upstream of the auxiliary variable throttle with a downstream portion (7A, 7B) of the feeder passage through the control variable throttle to determine the amount of movement of the seat valve body in accordance with a flow rate of the hydraulic fluid passing through the pilot line; and (c) pilot flow control (400; 401; 403; 405; 406; 407; 408) having a pilot variable throttle (45) disposed in the pilot line and input (800; 52–59; 159, 54–59; 231A, 231B, 251, 252) for receiving a flow restricting signal whereby an opening area of the pilot variable throttle is changed in accordance with the received flow restricting signal to control a flow rate of the hydraulic fluid passing through the pilot line.

39 Claims, 36 Drawing Sheets

HYDRAULIC CONTROL VALVE APPARATUS AND HYDRAULIC DRIVE SYSTEM

TECHNICAL FIELD

The present invention relates to a hydraulic control valve apparatus used in hydraulic drive systems for construction machines, and more particularly to a hydraulic control valve apparatus which includes a flow control valve of spool type and has an auxiliary flow control function and a load check function, and to a hydraulic drive system having the hydraulic control valve apparatus incorporated therein.

BACKGROUND ART

As to hydraulic control valve apparatus or hydraulic drive systems for use in construction machines such as hydraulic excavators, the following prior arts are known:

(1) JP, A, 60-5928
(2) JP, A, 62-38496
(3) JP, U, 59-51861
(4) JP, A, 60-11706
(5) JP, A, 2-134402
(6) JP, A, 58-501781

(1) JP, A, 60-5928, (2) JP, A, 62-38496 and (3) JP, U, 59-51861 describe hydraulic drive systems using valve apparatus which include flow control valves of center bypass type. The term "flow control valve of center bypass type" means a valve of the type that a center bypass passage for communicating a pump port with a reservoir is throttled depending on the amount of movement of a spool. With the center bypass passage throttled, the pump delivery pressure is raised to supply a hydraulic fluid to an actuator via a feeder passage and a meter-in variable throttle. A load check valve for preventing the hydraulic fluid from flowing reversely is installed in the feeder passage.

Also, the hydraulic drive systems described in (1) JP, A, 60-5928, (2) JP, A, 62-38496 and (3) JP, U, 59-51861 are arranged to be used with hydraulic excavators. Of them, in the hydraulic drive system of (1) JP, A, 60-5928, a swing preference switch valve operable in response to a swing pilot pressure is connected between an arm flow control valve for supplying a hydraulic fluid to an arm cylinder of the hydraulic excavator and a pump port so that, when a swing flow control valve for supplying the hydraulic fluid to a swing motor and the arm flow control valve are simultaneously driven, a flow of the hydraulic fluid supplied to the arm flow control valve is throttled to raise a pressure of the hydraulic fluid supplied to the swing flow control valve.

In the hydraulic drive system of (2) JP, A, 62-38496, for the same purpose, a variable sequence valve operable in response to the swing pilot pressure is connected between the arm flow control valve and the pump port.

In the hydraulic drive system of (3) JP, U, 59-51861, for the same purpose, the pressure at an inlet port of the swing flow control valve is introduced as a pilot pressure to a load check valve installed at an inlet port of the arm flow control valve so that the pilot pressure pushes a popper of the load check valve to move, thereby throttling a flow of the hydraulic fluid passing through the load check.

Further, (4) JP, A, 60-11706 and (5) JP, A, 2-134402 describe hydraulic drive systems using valve apparatus which include flow control valves of closed center type. The term "flow control valve of closed center type" means a valve of the type that a pump port is not communicated with a reservoir regardless of the position of a spool, and that is usually employed in combination with a load sensing system for controlling the delivery rate of a hydraulic pump depending on a load pressure. Additionally, a pressure compensating valve is installed upstream of the flow control valve of closed center type so that operating speeds of a plurality of actuators will not be changed with variations in loads. A load check valve for preventing the hydraulic fluid from flowing reversely is disposed between the pressure compensating valve and the flow control valve.

In the valve apparatus described in (5) JP, A, 2-134402, particularly, when the flow control valve of spool type, the pressure compensating valve and the load check valve are combined to construct a hydraulic control valve apparatus, these three valves are assembled in one block to provide a single valve apparatus for purposes of reducing the number of piping lines and rendering the apparatus compact.

On the other hand, (6) JP, A, 58-501781 proposes a hydraulic control valve apparatus of not spool type but seat valve type. This hydraulic control valve apparatus comprises a seat valve and a pilot control valve combined with each other.

DISCLOSURE OF THE INVENTION

The hydraulic control valve apparatus described in (1) JP, A, 60-5928 and (2) JP, A, 62-38496 include each the load check valve and the swing preference switch valve or the variable sequence valve disposed in a main passage upstream of the arm flow control valve. Also, the hydraulic control valve apparatus described in (4) JP, A, 60-11706 and (5) JP, A, 2-134402 include each the load check valve and the pressure compensating valve in a main passage upstream of the flow control valve. The swing preference switch valve, the variable sequence valve and the pressure compensating valve serve to provide a kind of auxiliary flow control function for the arm flow control valve. With additional provision of those valves, however, the hydraulic fluid supplied from the hydraulic pump to the actuator is obliged to pass three valves, i.e., any one of those valves, the load check valve and the flow control valve (main variable throttle). This raises a problem that flow resistances caused in the three valves increase the pressure loss and hence the energy loss.

In the valve apparatus described in (3) JP, U, 59-51861, since the flow is throttled by the load check valve, additional provision of a special valve is not required and the pressure loss is smaller than that in the above valve apparatus. However, because of such a simple structure that the pilot pressure pushes the popper of the load check valve to move, the flow passing through the load check valve cannot be precisely controlled and hence the auxiliary flow control function with high control accuracy cannot be obtained.

Further, in the valve apparatus described in (5) JP, A, 2-134402, a number of pressure receiving chambers, passages, etc., which have complex configurations, must be formed in a balance piston of the pressure compensating valve. More specifically, it is required to form pressure receiving chambers in both ends of the balance piston independently of the pump passage for thereby introducing inlet and outlet pressures of the main variable throttle to those chambers, and to form two additional pressure receiving chambers in the case where a target compensating differential pressure of the pressure compensating valve is set variable. It is also required to form, inside the balance piston, an inner hole for accommodating a load check valve body for the main circuit. In this prior art valve apparatus, therefore, the structure around the balance piston and the balance piston itself are increased in size as compared with the valve apparatus which includes only the load check valve and does not have the pressure compensating function, with the result that the length of the valve block is increased in an axial direction of the balance piston and so is the outer configuration of the valve block. Additionally, manufacture of the valve block becomes more complicated.

The hydraulic control valve apparatus described in (6) JP, A, 58-501781 employs the flow control valve of seat valve type instead of spool type. Thus, the flow control valve of spool type which has high reliability resulted from practical use for long years and is easy to design can not be employed in this prior art.

Moreover, in the hydraulic drive systems described in (1) JP, A, 60-5928 and (2) JP, A, 62-38496, the swing preference switch valve or the variable sequence valve operable in response to the swing pilot pressure is disposed between the arm flow control valve and the pump port, whereby the pressure of the hydraulic fluid supplied to the swing flow control valve is raised for improving operability during the combined operation of an arm and a swing. In any of these prior arts, however, because the swing preference switch valve or the variable sequence valve is disposed in a pump line shared by other flow control valves, the operation of the swing preference switch valve or the variable sequence valve affects the other flow control valves as well as the arm flow control valve. In other words, when the swing flow control valve is simultaneously driven with any other flow control valve, the combined operation is impeded by the operation of the swing preference switch valve or the variable sequence valve.

Additionally, in the hydraulic control valve apparatus described in (1) JP, A, 60-5928, (2) JP, A, 62-38496 and (3) JP, U, 59-51861, the swing preference switch valve, the variable sequence valve or the pilot-operated load check valve is not designed to carry out pressure compensating control for keeping a differential pressure across the flow control valve (main variable throttle) constant. For this reason, during the combined operation in which a plurality of actuators are simultaneously driven, a flow rate of the hydraulic fluid supplied to the actuator having a low load pressure cannot be precisely controlled.

A first object of the present invention is to provide a hydraulic control valve apparatus including a flow control valve of spool type and a hydraulic drive system having the hydraulic control valve incorporated therein with which the auxiliary flow control function with high control accuracy is effected without increasing the pressure loss and enlarging the structure.

A second object of the present invention is to provide a hydraulic control valve apparatus including a flow control valve of center bypass type and a hydraulic drive system having the hydraulic control valve apparatus incorporated therein with which, during the combined operation in which a plurality of actuators are simultaneously driven, a flow rate of the hydraulic fluid only supplied to the flow control valve of interest can be auxiliarily controlled to improve efficiency of the combined operation.

A third object of the present invention is to provide a hydraulic control valve apparatus including a flow control valve of center bypass type and a hydraulic drive system having the hydraulic control valve apparatus incorporated therein which can effect the pressure compensating function to improve efficiency of the combined operation.

A fourth object of the present invention is to provide a hydraulic control valve apparatus including a flow control valve of closed center type and a hydraulic drive system having the hydraulic control valve apparatus incorporated therein with which the pressure compensating function is effected without increasing the pressure loss and enlarging the structure.

To achieve the above first to fourth objects, according to a first aspect of the present invention, there is provided a hydraulic control valve apparatus comprising a housing, a pump passage formed in said housing, and at least one directional control valve means assembled in said housing, said directional control valve means comprising a main spool slidably disposed in said housing to form a pair of main variable throttles to constitute a flow control valve, a feeder passage formed in said housing for supplying a hydraulic fluid from said pump passage to said pair of main variable throttles, and a pair of load passages formed in said housing, into which load passages the hydraulic fluid having passed through said pair of main variable throttles flows respectively, wherein said directional control valve means further comprises auxiliary flow control means for restricting a flow rate of the hydraulic fluid supplied from said pump passage to said pair of main variable throttles through said feeder passage to auxiliarily control a flow rate of the hydraulic fluid flowing into said pair of load passages, said auxiliary flow control means including (a) a seat valve disposed in said feeder passage, said seat valve having a seat valve body movably disposed in said housing to form an auxiliary variable throttle in said feeder passage, and a control variable throttle formed in said seat valve body for changing an opening area in accordance with an amount of movement of said seat valve body; (b) a pilot line for communicating a portion of said feeder passage upstream of said auxiliary variable throttle with a downstream portion of said feeder passage through said control variable throttle to determine the amount of movement of said seat valve body in accordance with a flow rate of the hydraulic fluid passing through said pilot line; and (c) pilot flow control means having a pilot variable throttle disposed in said pilot line and input means for receiving a flow restricting signal whereby an opening area of said pilot variable throttle is changed in accordance with said received flow restricting signal to control a flow rate of the hydraulic fluid flowing through said pilot line.

In the above hydraulic control valve apparatus, preferably, said directional control valve means further comprises a fixed block for holding said seat valve body in said housing through a spring, and said pilot flow control means includes a pilot spool valve assembled in said fixed block. In this case, preferably, said pilot spool valve includes a pilot spool disposed parallel to said main spool.

Preferably, said seat valve is disposed perpendicularly to said main spool.

Also preferably, said feeder passage includes a first passage portion located upstream of said auxiliary variable throttle and communicating with said pump passage, and second and third passage portions located downstream of said auxiliary variable throttle on opposed sides of said first passage portion and communicating with said pair of main variable throttles, respectively, said seat valve being disposed at a junction between said first passage portion and said second and third passage portions.

Further preferably, an opening characteristic of said control variable throttle is set such that said control variable throttle is slightly opened at a fully closed position of said seat valve, and said directional control valve means further comprises a check valve disposed in said pilot line for preventing the hydraulic fluid from flowing reversely, said check valve being assembled in said seat valve body.

In the above hydraulic control valve apparatus, preferably, said apparatus comprises a plurality of directional control valve means of spool type assembled in said housing, at least one of these directional control valve means including said auxiliary flow control means.

Said input means of the pilot flow control means includes, for example, a passage through which a pressure signal created externally of said directional control valve means is input as said flow restricting signal. The input means of the pilot flow control means may include passages through which a differential pressure across each of said pair of main variable throttles is introduced as said flow restricting signal.

In the above hydraulic control valve apparatus, preferably, said pilot flow control means includes a pilot spool forming said pilot variable throttle, first urging means for applying a predetermined urging force to said pilot spool in the valve opening direction, and second urging means connected to said input means for applying an urging force in accordance with said flow restricting signal to said pilot spool in the valve closing direction.

Preferably, said first urging means includes a spring for urging said pilot spool with a predetermined preset force in the valve opening direction. In this case, preferably, said pilot flow control means further includes operating means capable of externally adjusting the preset force of said spring.

Also preferably, said first urging means includes at least one pressure receiving chamber for exerting a predetermined hydraulic force upon said pilot spool in the valve opening direction.

Further preferably, said second urging means includes at least one pressure receiving chamber for exerting a hydraulic force in accordance with said flow restricting signal to said pilot spool in the valve closing direction.

In the above hydraulic control valve apparatus, preferably, said input means includes a passage through which a signal created externally of said directional control valve means is introduced as said flow restricting signal to said second biasing means.

In this case, preferably, said first urging means includes a pressure receiving chamber to which an inlet pressure of each of said pair of main variable throttle is introduced.

Also preferably, said first urging means includes a pressure receiving chamber to which a pressure in said pump passage is introduced.

In the above hydraulic control valve apparatus, preferably, said input means includes passages through which a differential pressure across each of said pair of main variable throttles is introduced as said flow restricting signal to said second urging means, and the predetermined urging force applied by said first urging means sets a target compensated differential pressure for the differential pressure across each of said pair of main variable throttles.

In this case, usually, the predetermined urging force for setting said target compensated differential pressure is constant. However, the predetermined urging force for setting said target compensated differential pressure may be variable.

To achieve the above first and second objects, according to a second aspect of the present invention, there is provided a hydraulic drive system comprising a hydraulic pump; a plurality of hydraulic actuators driven by a hydraulic fluid delivered from said hydraulic pump; the hydraulic control valve apparatus according to the above first concept comprising at least first and second directional control valve means including flow control valves of spool type operated in accordance with respective operating signals for controlling respective flow rates of the hydraulic fluid supplied to said plurality of hydraulic actuators, at least said first directional control valve means being the directional control valve means including said auxiliary flow control means; and signal producing and transmitting means for producing said flow restricting signal externally of said first directional control valve means and introducing the produced signal to said input means of the pilot flow control means.

In the above hydraulic drive system, preferably, said signal producing and transmitting means comprises means for detecting an operating signal applied to said second directional control valve means, and means for introducing the detected operating signal as said flow restricting signal to the input means of said pilot flow control means.

Also preferably, said signal producing and transmitting means comprises setting means operated by an operator for outputting a set signal, means for producing a control signal in accordance with said set signal, and means for introducing said control signal as said flow restricting signal to the input means of said pilot flow control means.

Further preferably, said signal producing and transmitting means comprises means operated by an operator for outputting a set signal, means for producing a control signal in accordance with the operating signal applied to said second directional control valve means and said set signal, and means for introducing said control signal as said flow restricting signal to the input means of said pilot flow control means.

In the above hydraulic drive system, preferably, said flow control valve is a spool valve of center bypass type.

To achieve the above first and third objects, according to a third aspect of the present invention, there is provided a hydraulic drive system comprising a hydraulic pump; a plurality of hydraulic actuators driven by a hydraulic fluid delivered from said hydraulic pump; and the hydraulic control valve apparatus according to the above first aspect comprising at least first and second directional control valve means including flow control valves of spool type operated in accordance with respective operating signals for controlling respective flow rates of the hydraulic fluid supplied to said plurality of hydraulic actuators, at least said first directional control valve means being the directional control valve means including said auxiliary flow control means, said input means of the pilot flow control means including passages through which a differential pressure across each of said pair of main variable throttles of the flow control valve associated with said first directional control valve means is introduced as said flow restricting signal.

In the above hydraulic drive system, preferably, said flow control valve is a spool valve of center bypass type.

To achieve the above first and fourth objects, according to a fourth aspect of the present invention, there is provided a hydraulic drive system comprising a hydraulic pump; a plurality of hydraulic actuators driven by a hydraulic fluid delivered from said hydraulic pump; and the hydraulic control valve apparatus according to the above first aspect comprising at least first and second directional control valve means including flow control valves of spool type operated in accordance with respective operating signals for controlling respective flow rates of the hydraulic fluids supplied to said plurality of hydraulic actuators, said first and second directional control valve means each being the directional control valve means including said auxiliary flow control means, said input means of the pilot flow control means including passages through which a differential pressure across each of said pair of main variable throttles of the flow control valve associated with the corresponding directional control valve means is introduced as said flow restricting signal.

In the above hydraulic drive system, preferably, said flow control valve is a spool valve of closed center type.

In the above hydraulic drive system, preferably, said pilot flow control means includes a pilot spool forming said pilot variable throttle, first urging means for applying a predetermined urging force to said pilot spool in the valve opening direction, and second urging means connected to said input means for applying an urging force corresponding to s differential pressure across each of said pair of main variable throttles to said pilot spool in the valve closing direction.

In this case, preferably, said hydraulic drive system further comprises means for producing a variable pressure and introducing the variable pressure to said first urging means, and said first urging means includes a hydraulic chamber for exerting a hydraulic force corresponding to said variable pressure upon said pilot spool as said predetermined urging force.

The above hydraulic drive system may include means for detecting maximum one of load pressures of said plurality of actuators and means for introducing a delivery pressure of said hydraulic pump and said maximum load pressure to said first urging means, and said first urging means may include at least one hydraulic chamber for exerting a hydraulic force corresponding to the differential pressure between said delivery pressure and said maximum load pressure upon said pilot spool as said predetermined urging force.

The hydraulic control valve apparatus and the hydraulic drive system of the present invention thus constructed operate as follows.

In the hydraulic control valve apparatus of the present invention, when tile spool valve is moved from its neutral position, one of the main variable throttles is opened, whereupon most of the hydraulic fluid in the upstream side of the feeder passage is allowed to flow, as a main flow, to the downstream side of the feeder passage through the seat valve and, simultaneously, the remaining hydraulic fluid in the upstream side of the feeder passage is allowed to flow, as a pilot flow, to the downstream side of the feeder passage through the pilot line. The main flow and the pilot flow are joined with each other, and the joined hydraulic fluid is supplied to a load port through the main variable throttle. On the other hand, the seat valve operates on the basis of the principles described in the above-cited JP, A, 58-501781 such that the amount of movement of the seat valve body is determined depending on a pilot flow rate passing through the control variable throttle. The pilot flow rate is controlled by the pilot flow control means in accordance with the flow restricting signal. Thus, the amount of movement of the seat valve body is determined in accordance with the flow restricting signal, whereby a main flow rate passing through the seat valve is adjusted. In this way, a flow rate of the hydraulic fluid supplied to the main variable throttle is restricted and a flow rate of the hydraulic fluid supplied to the load passage is precisely auxiliarily controlled.

Also, when the load is increased to such an extent that the load pressure exceeds the supply pressure and the hydraulic fluid is forced to be about to flow reversely, the pilot flow rate becomes zero and the seat valve body is urged in the valve closing direction so that the seat valve is fully closed. Therefore, the hydraulic fluid is prevented from flowing reversely and the load check function is achieved.

Thus, in the hydraulic control valve apparatus of the present invention, the two functions of auxiliary flow control and load check are achieved by arranging the seat valve in the feeder passage in which the prior art load check valve has been disposed. As a result, the valve apparatus of the present invention provides the auxiliary flow control function, produces a pressure loss just comparable to that produced in the prior art hydraulic control valve apparatus without the auxiliary flow control function, and hence avoids an increase in the pressure loss due to the provision of the auxiliary flow control function.

Further, in the hydraulic control valve apparatus of the present invention, the seat valve carrying out the two functions of auxiliary flow control and load check is disposed in the feeder passage in which the prior art load check valve has been disposed, as explained above, enabling the pilot flow control means to be disposed in place other than the housing. Accordingly, the construction of the seat valve around the seat valve body is simplified and the length of a portion of the housing, in which the seat valve body is positioned, in the axial direction of the seat valve body (i.e., the size thereof in a direction perpendicular to the spool valve) is not increased, with the result that the housing becomes compact and manufacture of the housing is facilitated.

As is apparent from the foregoing, the first object of the present invention is achieved in that, in the hydraulic control valve apparatus including the flow control valve of spool type, the auxiliary flow control function with high control accuracy is effected without increasing the pressure loss and enlarging the structure.

Also, the second object of the present invention is achieved in that, by constructing the flow control valve comprising the main spool to be of center bypass type and introducing an external signal as the flow restricting signal, a flow rate of the hydraulic fluid only supplied to the flow control valve of interest can be auxiliarily controlled during the combined operation in which a plurality of actuators are simultaneously driven.

Further, the third object of the present invention is achieved in that, by constructing the flow control valve comprising the main spool to be of center bypass type and introducing a differential pressure across the main variable throttle as the flow restricting signal, the pressure compensating function is provided to the valve apparatus including the flow control valve of center bypass type.

Additionally, the fourth object of the present invention is achieved in that, by constructing the flow control valve comprising the main spool to be of closed center type and introducing a differential pressure across the main variable throttle as the flow restricting signal, the pressure compensating function is provided to the valve apparatus including the flow control valve of closed center type without increasing the pressure loss and enlarging the structure.

With the arrangement of providing a fixed block for holding the seat valve body in the housing through a spring and assembling a pilot spool valve of the pilot flow control means in the fixed block, the pilot flow control means can be installed by utilizing the fixed block as a part other than the housing, which renders the housing compact, as described above. In this case, by arranging the spool of the pilot spool valve parallel to the main spool, the fixed block itself becomes also compact.

By setting an opening characteristic of the control variable throttle such that the control variable throttle is slightly opened at a fully closed position of the seat valve, the pilot flow is stably produced and working of the control variable throttle is facilitated. In this case, by providing a check valve in the pilot line, the load check function is obtained with a high degree of liquid tightness. Since the check valve is disposed in the pilot line, the pressure loss in the main circuit (feeder passage) will not be increased by the provision of the check valve.

With the arrangement that the first urging means of the pilot flow control valve comprises a spring, a target compensated differential pressure is set by the preset force of the spring when pressure compensating control is performed through auxiliary flow control. By making the preset force of the spring adjustable from the outside, the target compensated differential pressure can be optionally adjusted. Where the first urging means comprises a pressure receiving chamber, the target compensated differential pressure is set by a hydraulic force provided by the pressure receiving chamber. In this case, the target compensated differential pressure can be optionally adjusted by introducing a variable pressure to the pressure receiving chamber. Since the pressure is easily adjusted by using a solenoid proportional reducing valve or the like, fine adjustment of the target compensated differential pressure can be realized.

By introducing an external hydraulic signal as the flow restricting signal to the second urging means, the operation concerned with the above second object is achieved. In other words, the flow rate of the hydraulic fluid only supplied to the flow control valve of interest can be auxiliarily controlled.

In this case, by introducing an operating signal given to the second directional control valve means, as the external signal (flow restricting signal), to the second urging means based on the second aspect of the present invention, the flow rate of the hydraulic fluid passing through the first directional control valve means can be automatically auxiliarily controlled in accordance with the magnitude of the operating signal for the second directional control valve means during the combined operation in which a plurality of actuators are simultaneously driven, thereby improving efficiency of the combined operation.

Also, by producing the flow restricting signal in accordance with a set signal from the setting means operated by an operator based on the second aspect of the present invention, the flow rate of the hydraulic fluid supplied to the actuator can be auxiliarily controlled at the discretion of the operator, thereby further improving efficiency of the combined operation.

Moreover, by producing the flow restricting signal in accordance with the set signal from the setting means operated by an operator and the operating signal given to the second directional control valve means based on the second aspect of the present invention, the flow rate of the hydraulic fluid supplied to the actuator can be auxiliarily controlled at the discretion of the operator and in accordance with the operating signal for the second directional control valve means, thereby further improving efficiency of the combined operation.

In this connection, by introducing inlet pressures of the pair of main variable throttles to the pressure receiving chamber of the first urging chamber, the pilot spool is operated to reduce the pilot flow rate only when the load pressure of the actuator is low, for selectively effecting the auxiliary flow control function. As a result, the satisfactory combined operation is ensured while the useless energy loss is avoided.

By introducing a pump pressure to the pressure receiving chamber of the first urging means, when the pump pressure increases to a predetermined value determined in relation to the flow restricting signal, an extent of control due to the pilot flow is so reduced that a pressure of the hydraulic fluid supplied to the second directional control valve means (i.e., a driving pressure of the corresponding actuator) is changed in accordance with the flow restricting signal, thereby further improving efficiency of the combined operation.

The operation concerned with the above third and fourth objects is achieved by introducing the differential pressure across the main variable throttle, as the flow restricting signal, to the second urging means. In other words, the pressure compensating function can be provided to the valve apparatus including the flow control valve of center bypass type, and the pressure compensating function can be provided to the valve apparatus including the flow control valve of closed center type without increasing the pressure loss and enlarging the structure.

In this case, by introducing a delivery pressure of the hydraulic pump and a maximum load pressure to the first urging means and exerting a hydraulic force corresponding to the differential pressure between the pump delivery pressure and the maximum load pressure upon the pilot spool base on the fourth aspect of the present invention, the plurality of directional control valves are all set to the same target compensated differential pressure depending on the above differential pressure. Therefore, when the delivery rate of the hydraulic pump is insufficient during the combined operation in which a plurality of actuators are simultaneously driven, the differential pressure between the pump delivery pressure and the maximum load pressure is reduced to render the target compensated differential pressure smaller. Consequently, the similar function to that obtainable with the hydraulic drive system described in the above-cited JP, A, 60-11706 is achieved, enabling the combined operation to be performed appropriately.

BEST MODE FOR CARRYING OUT THE INVENTION

Hereinafter, several embodiments of the present invention will be described with reference to the drawings. Of these embodiments, the first to ninth embodiments relate to cases where the present invention is applied to a valve apparatus including a flow control valve of center bypass type, and the tenth to fourteenth embodiments relate to cases where the present invention is applied to a valve apparatus including a flow control valve of closed center type. Also, in the first to fifth embodiments, an external signal is employed as a flow restricting signal applied to pilot flow control means, whereas in the sixth to fourteenth embodiments, a differential pressure across a main variable throttle is employed as the flow restricting signal to carry out pressure compensating control.

First Embodiment

To begin with, the first embodiment of the present invention will be described with reference to FIGS. 1 to 5. As mentioned above, the first to fifth embodiments are arranged to employ an external signal as the flow restricting signal in a valve apparatus including a flow control valve of center bypass type.

Figure 1:
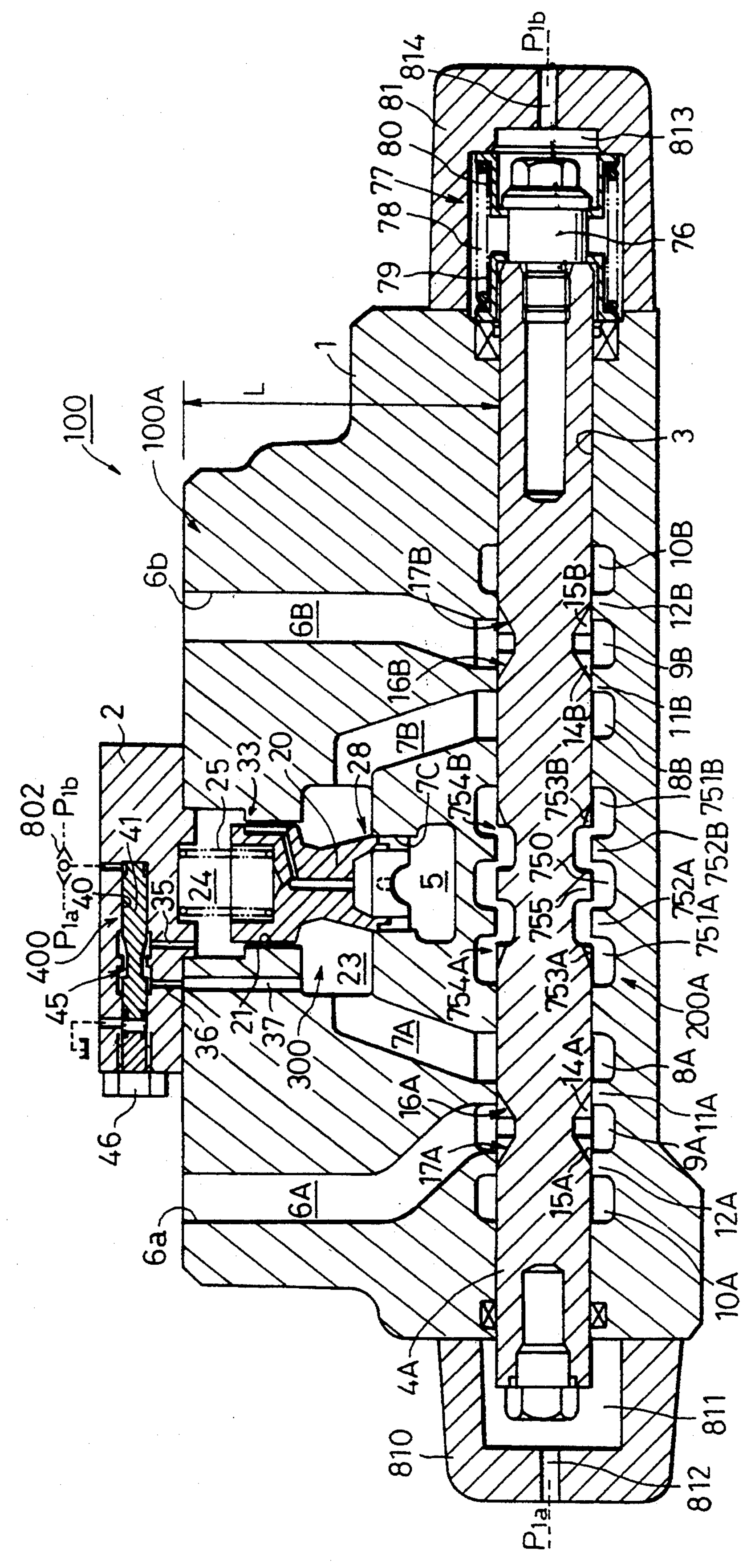
FIG. 1 is a sectional view of a hydraulic control valve apparatus according to a first embodiment of the present invention.
Figure 2:
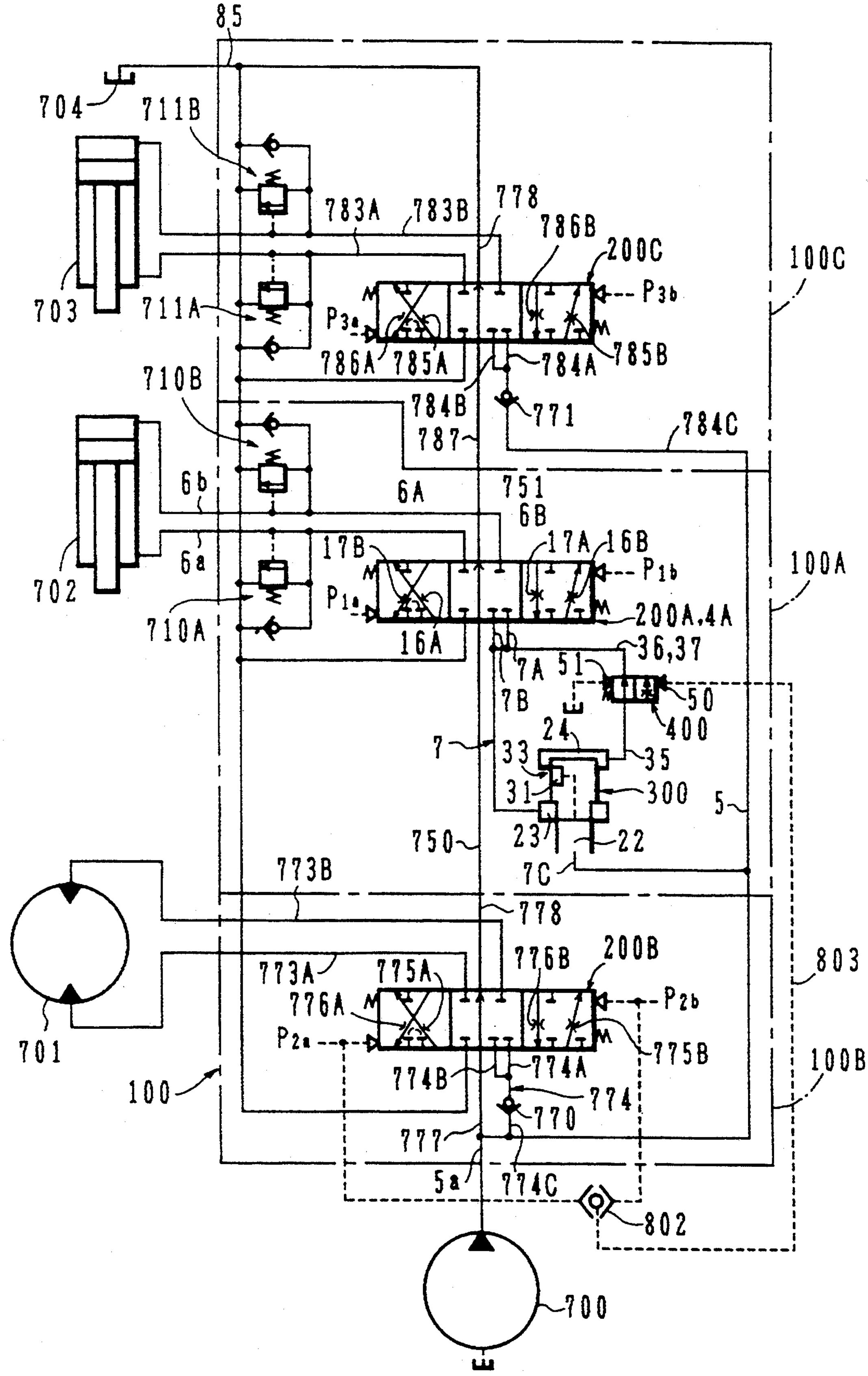
FIG. 2 is a circuit diagram of the hydraulic control valve apparatus shown in FIG. 1.

In FIGS. 1 and 2, a hydraulic control valve apparatus of this embodiment is generally denoted by reference numeral 100. The hydraulic control valve apparatus 100 comprises, as shown in FIG. 2, a first directional control valve device 100A for controlling a flow of the hydraulic fluid supplied to a hydraulic actuator 701, a second directional control valve device 100B for controlling a flow of the hydraulic fluid supplied to a hydraulic actuator 702, and a third directional control valve device 100C for controlling a flow of the hydraulic fluid supplied to a hydraulic actuator 703.

Also, the hydraulic control valve apparatus 100 comprises a housing 1 common to the first to third directional control valve devices, and a fixed block 2 associated with the first directional control valve device 100A and attached integrally to the housing 1. The first directional control valve device 100A comprises a main spool valve 200A assembled in "the housing 1 for constituting a flow control valve of center bypass type, a seat valve 300 assembled in the housing 1, and a pilot spool valve 400 assembled in the fixed block 2 for constituting a pilot flow control valve.

The main spool valve 200A, the seat valve 300 and the pilot spool valve 400 are constructed as follow.

A bore 3 is formed to penetrate through the housing 1, and a main spool 4A of the main spool valve 200A is slidably inserted in the bore 3. In the housing 1, there are also formed a pump passage 5 having a pump port 5*a* (see FIG. 2) connected to a hydraulic pump 700, load passages 6A, 6B having load ports 6*a*, 6*b* connected to the hydraulic actuator 702 (see FIG. 2), and a feeder passage 7 branched from the pump passage 5 and being able to communicate with the load passages 6A, 6B. The feeder passage 7 comprises a passage portion 7C communicating with the pump passage 5, a pair of passage portions 7A, 7B positioned on opposed sides of the passage portion 7C, and an annular passage portion 23 communicating with the passage portion 7C with the passage portions 7A, 7B. Hereinafter, these passage portions 7A to 7C and 23 will be each referred to simply as a feeder passage.

Formed near the center of the bore 3 are an annular inlet-side center bypass passage 750 communicating with the pump port 5*a* and annular outlet-side center bypass passages 751A, 751B communicating with an outlet-side center bypass passage 751 (see FIG. 2). Land portions 752A, 752B are formed respectively between the inlet-side center bypass passages 750 and the outlet-side center bypass passages 751A, 751B. The bore 3 is also formed with annular feeder passages 8A, 8B serving as parts of the feeder passages 7A, 7B, annular load passages 9A, 9B serving as parts of the load passages 6A, 6B, and annular drain passages 10A, 10B communicating with a reservoir port 85 (see FIG. 2). Lands 11A, 12A are formed respectively between the feeder passage 8A and the load passage 9A and between the load passage 9A and the drain passage 10A. Further, lands 11B, 12B are formed respectively between the feeder passage 8B and the load passage 9B and between the load passage 9B and the drain passage 10B. The reservoir port 85 is connected to a reservoir 704.

The main spool 4A is formed with notches 753A, 753B and a cylindrical portion 755. The notch 753A and the cylindrical portion 755 cooperate with the lands 752A, 752B to form a bleed-off variable throttle 754A positioned between the inlet-side center bypass passage 750 and the outlet-side center bypass passages 751A, 751B. The variable throttle 754A is changed from a fully opened position to a fully closed position in its opening area, as indicated by P-T in FIG. 3, depending on the amount of movement of the main spool 4A (i.e., spool stroke) in the direction toward the right as viewed in FIG. 1. The notch 753B and the cylindrical portion 755 cooperate with the lands 752B, 752A to form a bleed-off variable throttle 754B positioned between the inlet-side center bypass passage 750 and the outlet-side center bypass passages 751B, 751A. The variable throttle 754B is changed from a fully opened position to a fully closed position in its opening area, as indicated by P-T in FIG. 3, depending on the amount of movement of the main spool 4A in the direction toward the left in FIG. 1.

The main spool 4A is further formed with notches 14A, 14B and notches 15A, 15B. The notch 14A cooperates with the land 11A to form a meter-in main variable throttle 16A positioned between the feeder passage 8A and the load passage 9A. The variable throttle 16A is changed from a fully closed position to a predetermined maximum position in its opening area, as indicated by P-A in FIG. 3, depending on the amount of movement of the main spool 4A in the direction toward the right in FIG. 1. The notch 14B cooperates with the land 11B to form a meter-in main variable throttle 16B positioned between the feeder passage 8B and the load passage 9B. The variable throttle 16B is changed from a fully closed position to a predetermined maximum position in its opening area, as indicated by P-A in FIG. 3, depending on the amount of movement of the main spool 4A in the direction toward the left in FIG. 1. Also, the notch 15B cooperates with the land 12B to form a meter-out main variable throttle 17B positioned between the load passage 9B and the drain passage 10B. The variable throttle 17B is changed from a fully closed position to a predetermined maximum position in its opening area, as indicated by B-T in FIG. 3, depending on the amount of movement of the main spool 4A in the direction toward the left in FIG. 1. The notch 15A cooperates with the land 12A to form a meter-out main variable throttle 17A positioned between the load passage 9A and the drain passage 10A. The variable throttle 17A is changed from a fully closed position to a predetermined maximum position in its opening area, as indicated by B-T in FIG. 3, depending on the amount of movement of the main spool 4A in the direction toward the right in FIG. 1.

Figure 4:
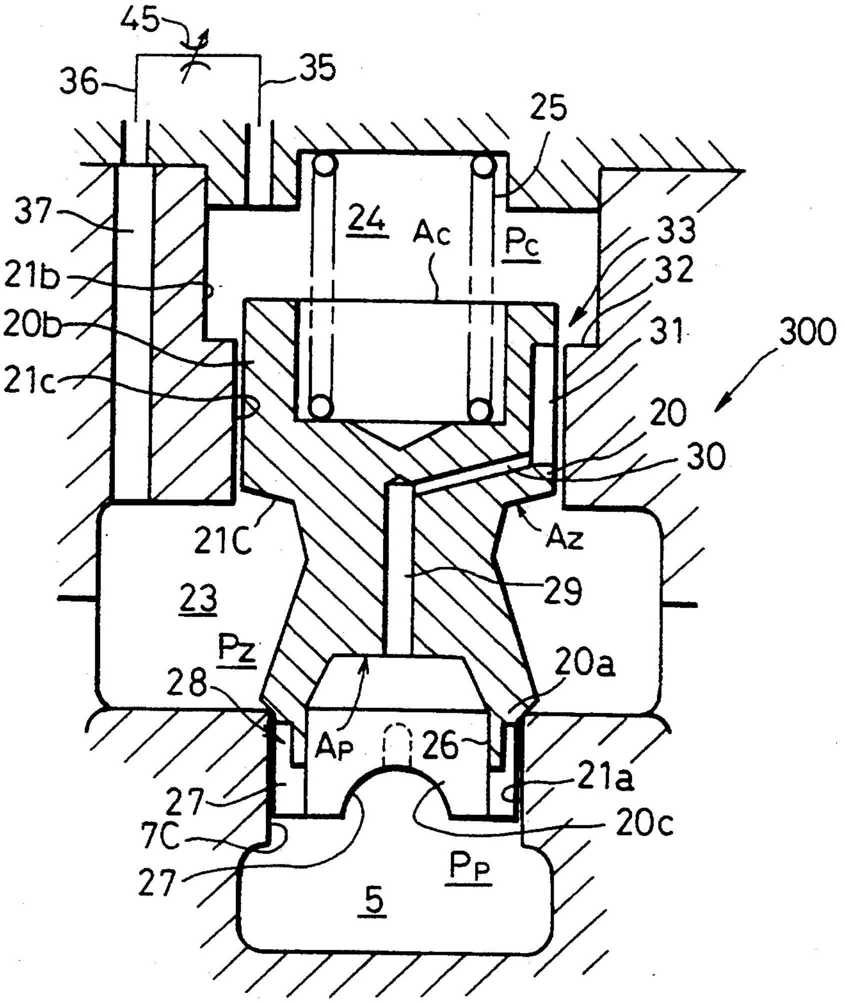
FIG. 4 is an enlarged view of a seat valve in the hydraulic control valve apparatus shown in FIG. 1.

In the annular feeder passage 23 at the junction between the feeder passage 7C and the feeder passages 7A, 7B, a valve body (hereinafter referred to as a seat valve body) 20 of the seat valve 300 is disposed. The seat valve body 20 is slidably fitted in a bore 21 formed in the housing 1 perpendicularly to the bore 3. The bore 21 includes, as shown in FIG. 4 in an enlarged scale, a bore portion 21*a* serving also as a part of the feeder passage 7C, a bore portion 21*b* being open to an outer wall surface of the housing 1 and having a larger diameter than the bore portion 21*a*, and a bore portion 21*c* positioned adjacent to the bore portion 21*b* and having a larger diameter than the bore portion 21*a*, with the annular feeder passage 23 positioned between the bore portions 21*a* and 21*c*. The open end of the bore portion 21*b* is closed by the fixed block 2 to form a hydraulic chamber 24 defined by the bore portion 21*b*. A spring 25 for urging the seat valve body 20 in the valve closing direction is disposed in the hydraulic chamber 24. The spring 25 is provided for the purpose of absorbing vibrations, and an urging force of the spring 25 acting upon the seat valve body 20 is as small as negligible.

The seat valve body 20 comprises a seat portion 20*a* capable of contacting with and seating on an edge between the bore portion 21*a* and the annular feeder passage 23, a sliding portion 20*c* positioned below the seat portion 20*a* and within the bore portion 21*a*, and a sliding portion 20*b* positioned within the bore portions 21*b*, 21*c*. Corresponding to the above-explained relationship between the diameters of the bore portion 21*a* and the bore portion 21*c*, the sliding portion 20*b* has a larger diameter than the sliding portion 20*c*. The sliding portion 20*c* is cylindrical in shape with a recess 26 formed at the center, as shown. A plurality of semicircular notches 27 are formed to penetrate through a cylindrical side wall of the sliding portion 20*c*, and cooperate with a seat portion of the housing 1 for constituting an auxiliary variable throttle 28 positioned between the feeder passage 7C and the feeder passage 23. The auxiliary variable throttle 28 is changed from a fully closed position to a predetermined maximum position in its opening area, as indicated by F—F in FIG. 5, depending on the amount of movement (stroke) of the seat valve body 20.

In an outer peripheral surface of the sliding portion 20*b* of the seat valve body 20, a pilot flow groove 31 is formed to be communicated with the feeder passage 7C through passages 29, 30 formed inside the seat valve body 20. The pilot flow groove 31 cooperates with a land 32, which is formed by a step between the bore portion 21*c* and the bore portion 21*b*, for constituting a control variable throttle 33 positioned between the feeder passage 7C and the hydraulic chamber 24. The control variable throttle 33 is located at such a position that it is completely closed by the land 23 when the seat valve body 20 is in its fully closed position. Then, the control variable throttle 33 is changed from a fully closed position to a predetermined maximum position in its opening area, as indicated by F-C in FIG. 5, depending on the amount of movement (stroke) of the seat valve body 20.

Returning to FIG. 1, the fixed block 2 is formed with a passage 35 communicating with the hydraulic chamber 24, and a passage 36 communicating with the feeder passage 23 through a passage 37 defined in the housing 1. The pilot spool valve 400 is disposed to stride between the passages 35 and 36. The passages 35 to 37, the hydraulic chamber 24, the passages 29, 30, and the pilot flow groove 31 jointly serve to communicate the feeder passage 7C with the feeder passages 23, 7A, 7B through the control variable throttle 33, and hence form a pilot line for determining the amount of movement of the seat valve body 20, i.e., the seat valve stroke, depending on the flow rate of the hydraulic fluid passing therethrough.

The fixed block 2 has a bore 40 formed therein, the bore 40 having a bottom 40*a* (see FIG. 6) at one end and being open at the other end to an outer surface of the fixed block. A spool 41 of the pilot spool valve 400 is slidably fitted in the bore 40. As shown, the bore 40 is formed parallel to the bore 3 of the main spool valve 200A and, correspondingly, the pilot spool 41 is arranged parallel to the main spool 4A.

Figure 6:
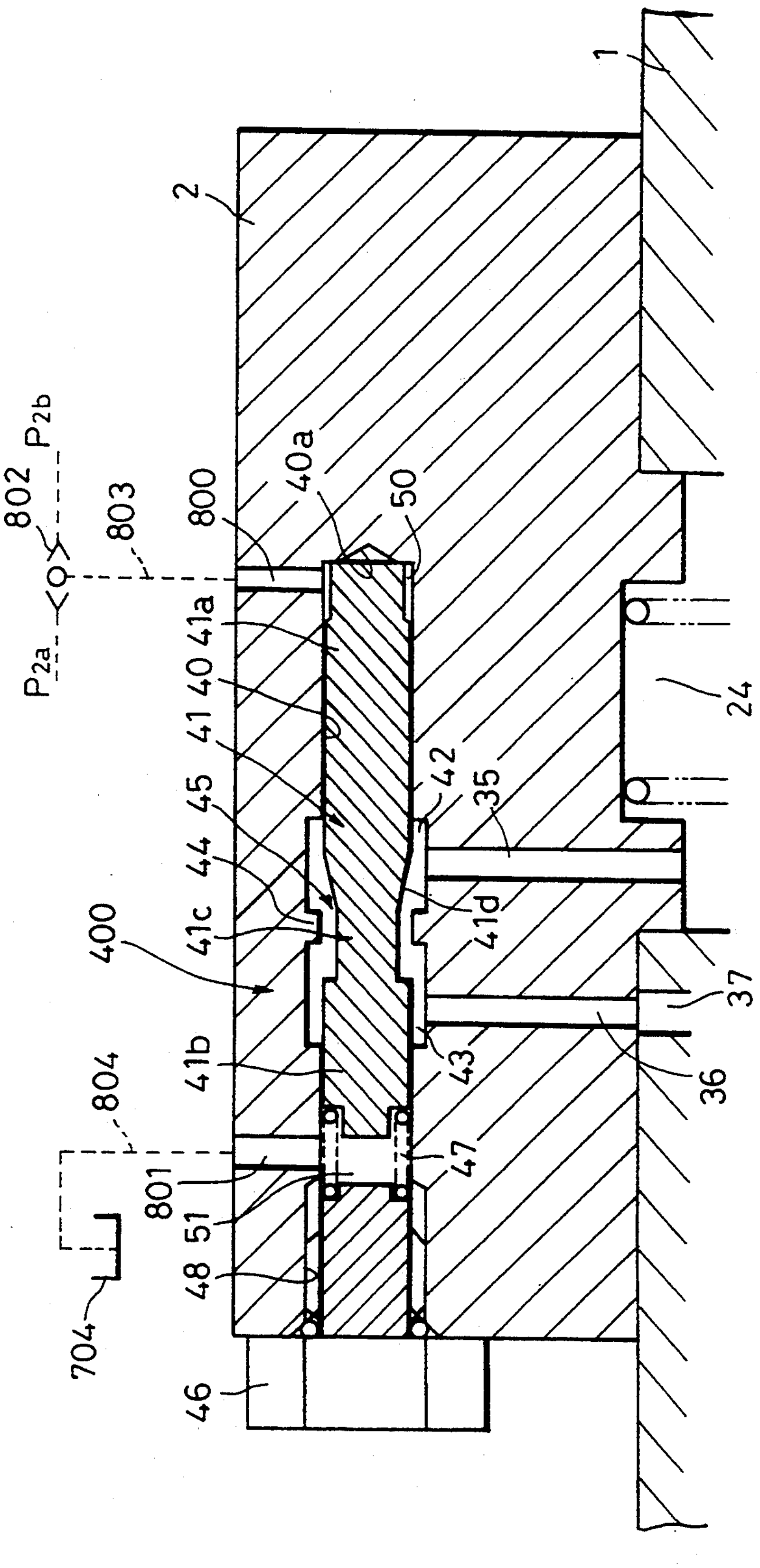
FIG. 6 is an enlarged view of a pilot spool valve in the hydraulic control valve apparatus shown in FIG. 1.
Figure 7:
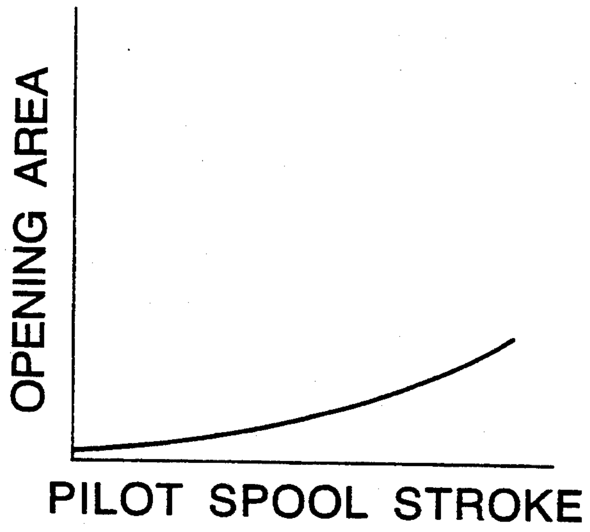
FIG. 7 is a graph showing an opening characteristic of a pilot variable throttle shown in FIG. 6.

The bore 40 is formed near the center with, as shown in FIG. 6 in enlarged scale, an annular inlet passage 42 to which the passage 35 is open and an annular outlet passage 43 to which the passage 36 is open. An annular land 44 is positioned between the inlet passage 42 and the outlet passage 43. The inlet passage 42 and the outlet passage 43 also constitute a part of the aforesaid pilot line. The pilot spool 41 comprises a spool portion 41*a* positioned near the bore bottom 40*a*, a spool portion 41*b* positioned near the open end of the bore 40, a small-diameter portion 41*c* positioned in the vicinity of the land 44, and a sloped portion 41*d* connecting between the small-diameter portion 41*c* and the spool portion 41*a*. The sloped portion 41*d* cooperates with the land 44 for constituting a pilot variable throttle 45 positioned between the inlet passage 42 and the outlet passage 43. The pilot variable throttle 45 changes its opening area from a predetermined minimum opening to a predetermined maximum opening, as shown in FIG. 7, depending on the amount of movement (stroke) of the pilot spool 41.

The open end of the bore 40 is closed by a screw 46. Disposed between the screw 46 and the pilot spool 41 is a spring 47 of which opposite ends are held in abutment against the pilot spool 41 and the screw 46, respectively, for urging the pilot spool 41 in the valve closing direction. The screw 46 is fastened to a threaded hole 48 formed in an open end portion of the bore 40, and serves to apply a preset force to the spring 47.

A pressure receiving chamber 50 is defined between the bottom 40*a* of the bore 40 and the end of the spool portion 41*a*, and a pressure receiving chamber 51 is defined by a space between the screw 46 and the spool portion 41*b* in which space the spring 47 is disposed. The fixed block 2 is formed with passages 800, 801 being open to the pressure receiving chambers 50, 51, respectively. The passage 800 is connected via a line 803 to a shuttle valve 802 for taking out a pilot pressure P2*a* or P2*b* as an operating signal for a main spool valve 200B of a second directional control valve device 100B, whereby the pilot pressure P2*a* or P2*b* is introduced to the pressure receiving chamber 50 and is applied to the pilot spool 41 in the valve closing direction. The passage 801 is connected to the reservoir 704 via a line 804 so that the pressure receiving chamber 51 is held at the reservoir pressure. With such an arrangement, the pilot spool valve 400 controls a pilot flow rate passing through the pilot line in accordance with the pilot pressure P2*a* or P2*b* for the main spool valve 200B.

Returning to FIG. 1 again, both ends of the main spool 4A are projecting out of end faces of the housing 1. The end of the main spool 4A on the left side in FIG. 1 is positioned in a pressure receiving chamber 811 defined by a cover 810 which is attached to the housing 1. The cover 810 is formed with a passage 812 for introducing a pilot pressure P1*a*, as an operating signal for the main spool valve 200A, to the pressure receiving chamber 811. The end of the main spool 4A on the right side in FIG. 1 is coupled to a centering spring mechanism 77 through a plug 76. The centering spring mechanism 77 comprises, as well known in the art, one spring 78 and two washers 79, 80 for the purpose of holding the main spool 4A at its neutral position when a control lever is not operated. The centering spring mechanism 77 is positioned in a pressure receiving chamber 813 defined by a cover 81 attached to the housing 1. The cover 81 is formed with a passage 814 for introducing a pilot pressure P1*b*, as an operating signal for the main spool valve 200A, to the pressure receiving chamber 813. The main spool 4A is moved to the right in FIG. 1 with the pilot pressure P1*a* introduced to the pressure receiving chamber 811, and is moved to the left in FIG. 1 with the pilot pressure P1*b* introduced to the pressure receiving chamber 813.

In FIG. 2, the second and third directional control valve device 100B, 100C are each of the same construction as the conventional flow control valve of center bypass type. More specifically, the second directional control valve device 100B includes a main spool valve 200B and a load check valve 770 which are assembled in the common housing 1 to constitute a flow control valve. The third directional control valve device 100C includes a main spool valve 200C and a load check valve 771 which are assembled in the common housing 1 to constitute a flow control valve.

As with the first embodiment described above, the main spool valve 200B comprises a main spool 4B which is slidably inserted in a bore formed through the housing 1. In relation to the main spool 4B, there are formed load passages 773A, 773B, feeder passages 774 (774A, 774B, 774C), meter-in main variable throttles 775A, 775B, meter-out main variable throttles 776A, 776B, and so on. There are also formed an inlet-side center bypass passage 777 and an outlet-side center bypass passage 778 which are connected to the pump port 5*a* and the inlet-side center bypass passage 750 of the first directional control valve device 100A in series, respectively, and bleed-off variable throttles (not shown). The feeder passage 774 is branched from the pump passage 5 and the load check valve 770 is disposed between the feeder passage 774C and the feeder passages 774A, 774B.

As with the main spool valve 200B described above, the main spool valve 200C comprises a main spool 4C which is slidably inserted in a bore formed through the housing 1. In relation to the main spool 4C, there are formed load passages 783A, 783B, feeder passages 784 (784A, 784B, 784C), meter-in main variable throttles 785A, 785B, meter-out main variable throttles 786A, 786B, and so on. There are also formed an inlet-side center bypass passage 787 and an outlet-side center bypass passage 788 which are positioned downstream of the outlet-side center bypass passage 751 of the first directional control valve device 100A and is connected thereto in series, and bleed-off variable throttles (not shown). The feeder passage 784 is branched from the pump passage 5 and the load check valve 771 is disposed between the feeder passage 784C and the feeder passages 784A, 784B.

The inlet-side center bypass passage 750 and the outlet-side center bypass passage 751, the inlet-side center bypass passage 777 and the outlet-side center bypass passage 778, as well as the inlet-side center bypass passage 787 and the outlet-side center bypass passage 788 jointly form one center bypass line. The most downstream center bypass passage 788 is connected to the reservoir 704 through the reservoir port 85.

Further, in FIG. 2, the first and third directional control valve devices 100A, 100C incorporate respectively relief valves 710A, 710B and 711A, 711B for preventing the load pressures of the actuators 702, 703 from rising in excess of the set values. The relief valves 710A, 710B of the first directional control valve device 100A are not shown in FIG. 1.

In the hydraulic control valve apparatus 100 of this embodiment constructed as described above, the seat valve 300 of the first directional control valve device 100A is operated based on the principles described in the above-cited JP, A, 58-501781. More specifically, the opening area of the pilot flow groove 31 formed in the seat valve body 20 with respect to the land 32 (i.e., the opening area of the control variable throttle 33) is changed depending on the amount of movement (stroke) of the seat valve body 20. The amount of movement of the seat valve body 20 is determined depending on the pilot flow rate passing through the pilot flow groove 31 (the control variable throttle 33). Also, the pilot flow rate is determined by the opening area of the variable throttle 45 of the pilot spool valve 400. As a result, the main flow rate passing from the feeder passage 7C to the feeder passage 23 through the auxiliary variable throttle 28 of the seat valve body 20 is in proportion to the pilot flow rate and, therefore, is determined by the opening area of the variable throttle 45 of the pilot spool valve 400.

Further, in the pilot spool valve 400, the opening area of the variable throttle 45 is controlled such that it is changed in accordance with the external signal, i.e., the pilot pressure P2*a* or P2*b*, as a flow restricting signal.

Consequently, in combination with the pilot lines 24, 29 to 31 and 35 to 37 and the pilot spool valve 400, the seat valve 300 restricts the flow rate of the hydraulic fluid supplied from the pump passage 5 to the main variable throttle 16A or 16B through the feeder passage 7 in accordance with the pilot pressure P2*a* or P2*b* (i.e., the flow restricting signal), thereby carrying out the auxiliary flow control function with which the flow rate of the hydraulic fluid flowing into each of the pair of load passages 6A, 6B is auxiliarily controlled. This function will be described in more detail below.

First, assuming that, in FIG. 4, the effective pressure receiving area of an end face of the sliding portion 20*c* of the seat valve 20 positioned in the feeder passage 7C is Ap, the effective pressure receiving area of an annular portion of the seat valve 20 positioned in the annular feeder passage 23 is Az, the effective pressure receiving area of an end face of the sliding portion 20*b* positioned in the hydraulic chamber 24 is Ac, the pressure in the feeder passage 7C (i.e., the supply pressure in the pump passage 5) is Pp, the pressure in the feeder passage 23 is Pz, and the pressure in the hydraulic chamber 24 i Pc, $$Ac = Az + Ap \quad (1)$$

is held from the balance among the pressure receiving areas Ap, Az and Ac of the seat valve body 20, and $$Ap \cdot Pp + Az \cdot Pz = Ac \cdot Pc \quad (2)$$

is held from the balance among the pressures exerted on the valve seat body 20. Putting Ap/Ac=K in Equation (1) leads to Az/Ac=1−K. Then, Equation (2) is rearranged to:

$$Pc = K \cdot Pp + (1-K) \cdot Pz \quad (3)$$

Assuming now that the width of the pilot flow groove 31 is constant w, the opening area of the control variable throttle 33 is given by wx when the amount of movement of the seat valve body 20 is x. Given the pilot flow rate being qs at this time, the following equation is held:

$$qs = C1 \cdot wx \cdot (Pp - Pc)^{\frac{1}{2}} \quad (4)$$

where C1: flow rate factor of control variable throttle 33

Putting Equation (3) in Equation (4) results in $qs = C1 \cdot wx\ \{(1-K)(Pp-Pz)\}^{\frac{1}{2}}$. *Accordingly, the amount x of movement of the seat valve body* 20 *is given by:*

$$x = (qs/C1 \cdot w)/\{(1-K)(Pp-Pz)\}^{\frac{1}{2}} \quad (5)$$

From Equation (5), it is seen that the movement amount x is determined by qs if the differential pressure between the pressure Pp and the pressure Pz is constant.

Further, assuming that the opening area of the variable throttle 45 of the pilot spool valve 400 is a, since the pilot flow rate qs passes through the opening area a, the following equation is held:

$$qs=C2\cdot a\cdot(Pp-Pz)^{\frac{1}{2}} \qquad (6)$$

where C2: flow rate factor of variable throttle 45
Equation (6) is modified to:

$$\begin{aligned} qs &= C2\cdot a\cdot\{K\cdot Pp+(1-K)Pz-Pz\}^{\frac{1}{2}} \\ &= C2\cdot a\cdot K^{\frac{1}{2}}\cdot(Pp-Pz)^{\frac{1}{2}} \end{aligned} \qquad (7)$$

Putting Equation (7) in Equation (5) results in:

$$\begin{aligned} x &= (C2\cdot a/C1\cdot w)\{K/(1-K)\}^{\frac{1}{2}} \\ &= (C2/C1\cdot w)\{K/(1-K)\}^{\frac{1}{2}}\cdot a \end{aligned} \qquad (8)$$

As seen from Equation (8), the amount x of movement of the seat valve body 20 is controlled in accordance with the opening area a of the variable throttle 45 of the pilot spool valve 400 provided in the pilot line.

On the other hand, assuming that the main flow rate passing from the feeder passage 7C to the feeder passage 23 through the auxiliary variable throttle 28 at the sliding portion 20*c* of the seat valve 300 is Qs and the outer diameter of the sliding portion 20*c* is L, the opening area of the auxiliary variable throttle 28 at the sliding portion 20*c* is given by the product of the outer diameter L and the movement amount x, the following equation is held:

$$Qs=C3\cdot L\cdot x\cdot(Pp-Pz)^{\frac{1}{2}} \qquad (9)$$

where C3: flow rate factor of variable throttle 28
Putting Equation (5) in Equation (9) results in:

$$Qs=\{(C3\cdot L/C1\cdot w)/(1-K)^{\frac{1}{2}}\}\cdot qs \qquad (10)$$

Given $\alpha=(C3\cdot L/C1\cdot w)/(1-K)^{\frac{1}{2}}$ here, Equation (10) is modified to:

$$Qs=\alpha\cdot qs \qquad (11)$$

It is therefore seen that the main flow rate Qs is in proportion to the pilot flow rate qs. Consequently, the total flow rate Qv of the hydraulic fluid passing through the seat valve 300 is expressed by:

$$Qv=Qs+qs=(1+\alpha)qs \qquad (12)$$

In the pilot spool valve 400 shown in FIG. 6, the preset force of the spring 47 is applied to the spool 41 as an urging force in the valve opening direction, and the pilot pressure P2*a* or P2*b* as an operating signal for the main spool valve 200B of the second directional control valve device 100B is applied to the pressure receiving chamber 50 to act in the valve closing direction. Therefore, assuming that the pressure-converted value of the preset force of the spring 47 is F, the pressure-converted value of the spring constant of the spring 47 is K, the pilot pressure P2*a* or P2*b* is Pi, and the amount of movement of the pilot spool 41 in the valve closing direction is X, the balance among the forces exerted on the pilot spool 41 is expressed by:

$$Pi=F+K\cdot X \qquad (13)$$

Thus, the amount X of movement of the pilot spool 41 is determined by the pilot pressure Pi such that as the pilot pressure Pi increases, the amount X of movement of the pilot spool 41 is increased and the opening area of the pilot variable throttle 45 is reduced.

Accordingly, since the amount x of movement of the seat valve body 20 is controlled in accordance with the opening area of the pilot variable throttle 45 as described above, the flow rate Qv of the hydraulic fluid passing from the feeder passage 7C to the feeder passage 23 can be controlled in accordance with the pilot pressure P2*a* or P2*b*. In other words, the flow rate of the hydraulic fluid supplied from the pump passage 5 to each of the pair of the main variable throttles 16A, 16B via the feeder passage 7 is restricted through the seat valve 300, the pilot lines 24, 29 to 31, 35 to 37, etc. and the pilot spool valve 400 in accordance with the pilot pressure P2*a* or P2*b* (i.e., the flow restricting signal), whereby the flow rate of the hydraulic fluid flowing into each of the pair of load passages 6A, 6B is auxiliarily controlled.

In addition, when the load pressure exceeds the supply pressure with an increase in the load and the hydraulic fluid is forced to be about to flow reversely, the pressure in the hydraulic chamber 24 is also increased to move the seat valve body 20 in the valve closing direction, whereupon the auxiliary variable throttle 28 is fully closed and so is the control variable throttle 33. Accordingly, the hydraulic fluid is prevented from flowing reversely from the feeder passage 7A or 7B to the feeder passage 7C, meaning that the seat valve 300 carries out the load check function.

With this embodiment, as described above, the combination of the seat valve 300 with the pilot lines 24, 29 to 31 and 35 to 37 and the pilot spool valve 400 enables both the auxiliary flow control function and the load check function to be achieved in the first directional control valve device 100A. As a result, the following operating advantages are obtained.

First, since the first directional control valve device 100A has the auxiliary flow control function, a flow rate of the hydraulic fluid only supplied to the flow control valve of interest can be auxiliarily controlled during the combined operation in which a plurality of actuators are simultaneously driven, whereby efficiency of the combined operation is improved.

More specifically, supposing that, in FIG. 2, the hydraulic control valve apparatus 100 of this embodiment is used in a hydraulic drive system for a hydraulic excavator, the hydraulic actuator 701 is a swing motor for driving a swing to rotate, and the hydraulic actuator 702 is an arm cylinder for ascending and descending an arm, the case of simultaneously operating the arm cylinder 702 which has a low load pressure and the swing motor 701 which has a high load pressure at the start-up is considered. In this case, while the hydraulic fluid from the hydraulic pump 700 is simultaneously supplied from the pump port 5*a* to the arm main spool valve 200A and the swing main spool valve 200B in parallel, the pilot pressure P2*a* or P2*b* for the swing main spool valve 200B is applied as the flow restricting signal to the pilot spool valve 400 of the first directional control valve device 100A, causing the seat valve 300 to move the seat valve body 20 in the throttling direction in accordance with the pilot pressure P2*a* or P2*b*. Thereby, the flow rate of the hydraulic fluid supplied to the main variable throttle 16A or 16B is controlled so as to reduce. As a result, the pressure of the hydraulic fluid supplied to the swing main spool valve 200 is raised so that the hydraulic fluid is supplied to the swing motor 701 at a required flow rate, making it possible to perform the proper combined operation as per the intention of the operator.

Further, the seat valve 300 is assembled at the position along the feeder passage 7 of the main spool valve 200A where the load check valve has been disposed in the prior art valve apparatus. Therefore, the seat valve 300 functions to auxiliarily control a flow rate of the hydraulic fluid only supplied to the main spool valve 200A of interest, and will never affect the other main spools 200B, 200C. Accordingly, when simultaneously driving the actuator 701 and the actuator 703, the combined operation of these two actuators can be performed as usual. The provision of the seat valve 300 causes no limitations upon the arrangement of the spool valves, leading to an advantage of increasing the degree of freedom in design.

Secondly, the first directional control valve device 100A of the hydraulic control valve apparatus 100 of this embodiment includes only two valves, i.e., the seat valve 300 and the main spool valve 200A, in the feeder passage 7 and the load passages 6A, 6B constituting the main circuit, the pressure loss produced when the hydraulic fluid passes through the main circuit is smaller than produced in the prior art hydraulic control valve apparatus including three valves, i.e., flow control valve, load check valve and pressure compensating valve, in the main circuit. This enables the actuator to be operated with smaller energy loss.

Thirdly, in the prior art hydraulic control valve apparatus provided with a pressure compensating valve, a number of pressure receiving chambers, passages, etc., which have complex configurations, must be formed in a balance piston of the pressure compensating valve. More specifically, it is required to form pressure receiving chambers in both ends of the balance piston independently of the pump passage for thereby introducing inlet and outlet pressures of the main variable throttle to those chambers, and to form two additional pressure receiving chambers in the case where a target compensating differential pressure of the pressure compensating valve is set variable. It is also required to form, inside the balance piston, an inner hole for accommodating a load check valve body for the main circuit. In this type prior art valve apparatus, therefore, the structure around the balance piston and the balance piston itself are increased in size as compared with another type prior art valve apparatus which includes only the load check valve and does not have the pressure compensating function, with the result that the length of the valve block is increased in an axial direction of the balance piston, i.e., in a direction perpendicular to the main spool, and so is the outer configuration of the valve block. Additionally, manufacture of the valve block becomes more complicated.

In this embodiment, the seat valve 300 is disposed instead of the load check valve at the position along the feeder passage 7 where the load check valve has been disposed in the prior art hydraulic control valve apparatus having no pressure compensating function, and the pilot spool valve 400 can be installed by utilizing the fixed block 2 which is separate from the housing 1 and serves to hold the seat valve body 20. Therefore, the height L of a portion of the housing 1 where the seat valve 300 is positioned is as small as comparable to the height of a portion of the housing where the load check valve is positioned in the prior art valve apparatus having no pressure compensating function (i.e., the height of a portion of the housing where the load check valve 770, 771 is positioned in each of the second and third directional control valve devices 100B, 100C), resulting in the smaller dimensions of the entire housing 1. Further, by arranging the pilot spool 41 parallel to the main spool 4A, the fixed block 2 itself can also be reduced in size. Accordingly, the valve apparatus becomes compact in its entirety and less costly, while increasing the degree of freedom in design of mounting it on construction machines.

Fourthly, housings of valve apparatus for use in this art are generally formed of castings. Since the configuration of the housing around the bore 21, in which the seat valve body 20 is slidably fitted, is simplified in the valve apparatus of this embodiment, the complicated core structure can be made simpler and this embodiment is more cost effective in this point.

Figure 3:
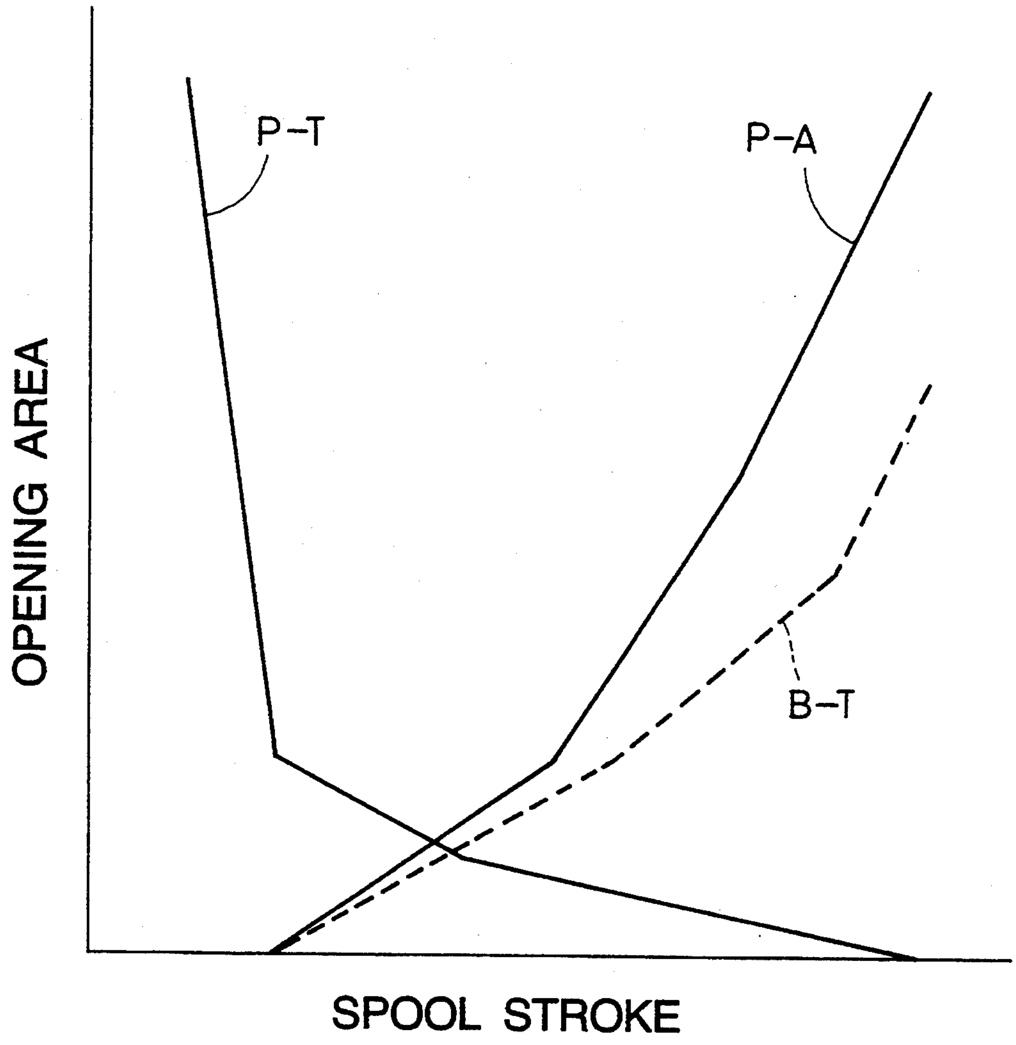
FIG. 3 is a graph showing opening characteristics of a bleed-off variable throttle, a meter-in variable throttle and a meter-out variable throttle shown in FIG. 1.

Moreover, in the valve apparatus of this embodiment, the pilot flow groove 31 is formed in the outer peripheral surface of the seat valve body 20 slidably received in the housing 1, thereby providing the control variable throttle 33 which changes its opening area depending on the amount of movement of the seat valve body 20. The position of the land 32 in the housing 1, which determines a flow control characteristic of the control variable throttle 33, is defined by a stepped portion facing the hydraulic chamber 24, as shown in FIG. 3, hence the land 32 can be easily manufactured.

As described above, according to this embodiment, the auxiliary flow control function with high control accuracy can be achieved in the hydraulic control valve apparatus 100 provided with the spool valve 200A as a flow control valve of spool type. Also, the pressure loss is not increased even with the provision of the auxiliary flow control function, and the actuator can be driven with smaller energy loss. Further, it is possible to make the housing compact, to more easily manufacture the valve apparatus and mount it on construction machines, and to reduce the production cost of the valve apparatus. Additionally, since the auxiliary flow control function is provided by the use of a flow control valve of center bypass type, a flow rate of the hydraulic fluid only supplied to the flow control valve of interest can be auxiliarily controlled during the combined operation in which a plurality of actuators are simultaneously driven, whereby efficiency of the combined operation can be improved.

Second Embodiment

A second embodiment of the present invention will be described with reference to FIGS. 8 to 10. In these figures, similar members to those in FIGS. 1 to 7 are denoted by the same reference numerals. This embodiment is intended to further facilitate manufacture of the control variable throttle and to provide the seat valve with the load check function.

Figure 8:
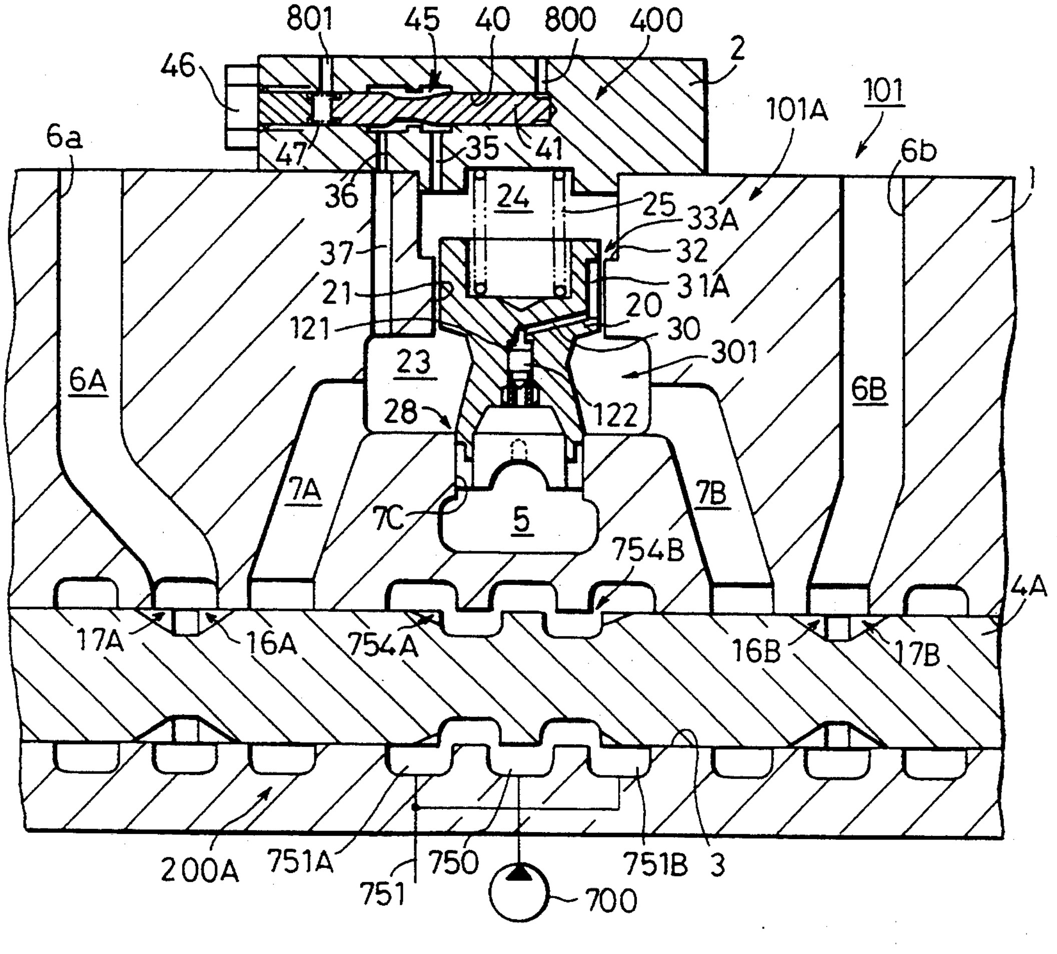
FIG. 8 is a sectional view of a hydraulic control valve apparatus according to a second embodiment of the present invention.
Figure 9:
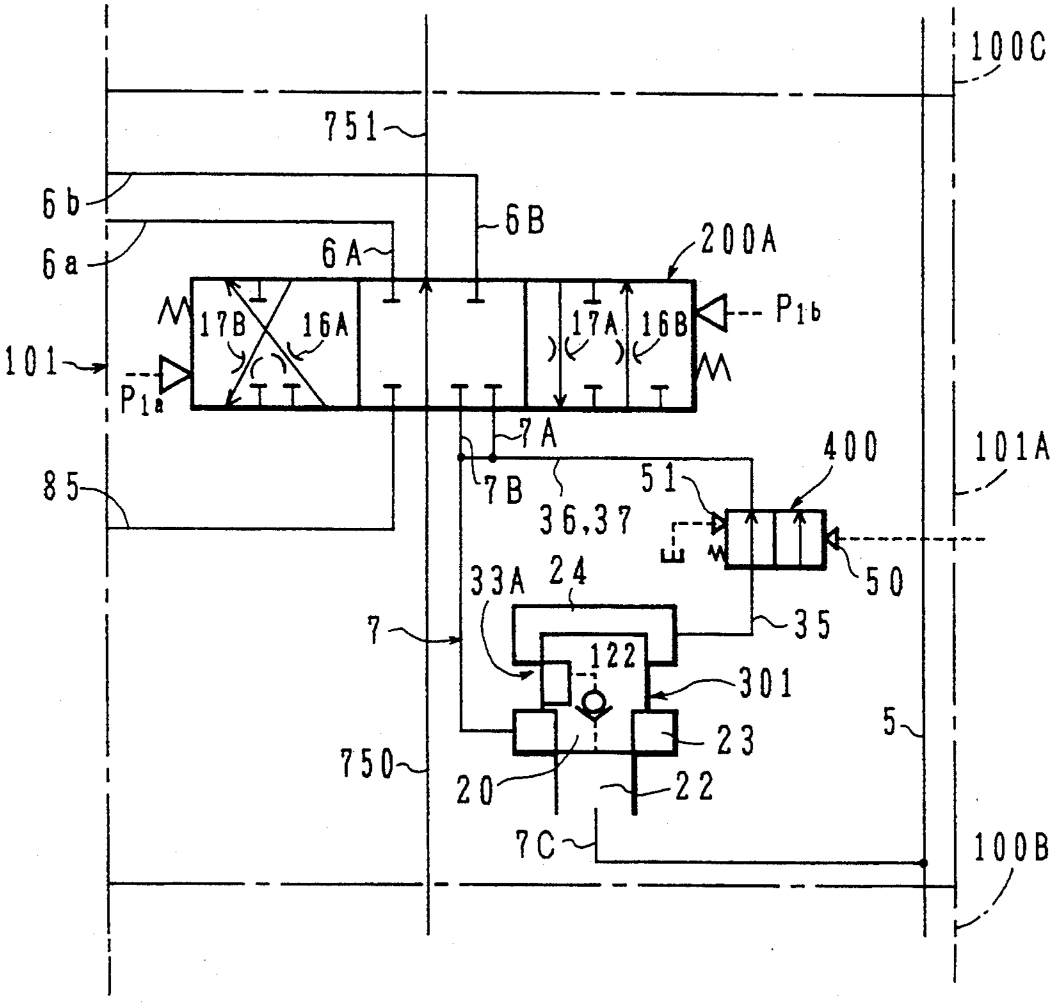
FIG. 9 is a circuit diagram of a primary part of the hydraulic control valve apparatus shown in FIG. 8.

In FIGS. 8 and 9, a first directional control valve device 101A of a hydraulic control valve apparatus 101 of this embodiment includes a seat valve 301 and, instead of the passage 29 shown in FIG. 4, a passage 121 is formed in the seat valve body 20 of the seat valve 301.

A check valve 122 for allowing the hydraulic fluid to flow from the feeder passage 7C toward the hydraulic chamber 24 but for blocking it to flow in the reversed direction is disposed in the passage 121. Also, a pilot flow groove 31A formed in the seat valve body 20 is set in the positional relationship with respect to the land 32 such that, as indicated by F-C in FIG. 10, a control variable throttle 33A is slightly opened when the seat valve body 20 is in its closed position.

In the first embodiment shown in FIGS. 1 to 7, as described above, when the load pressure exceeds the supply pressure and the hydraulic fluid is forced to be about to flow reversely, the seat valve body 20 is moved to its fully closed position, whereupon the control variable throttle 33 formed by the pilot flow groove 31 is also fully closed, enabling the seat valve 300 to carry out the load check function. However, if the control variable throttle 33 is not opened at once when the seat valve body 20 is moved from the fully closed position in the valve opening direction, the pilot flow becomes instable immediately after the opening of the seat valve. In the construction of the first embodiment, therefore, the positional relationship between the upper end of the pilot flow groove 31 and the land 32 must be finished with high-precise working in order to that the control variable throttle 33 is also opened at once when the seat valve body 20 is moved in the valve opening direction.

In this embodiment, on the other hand, the positional relationship between the upper end of the pilot flow groove 31A and the land 32 is set, as explained above, such that the control variable throttle 33.A is not completely closed when the seat valve body 20 is moved to the closed position. Accordingly, it is possible to produce the stable pilot flow, improve the accuracy in flow control, and to more easily manufacture the control variable throttle 33A.

Further, in this embodiment, since the check valve 122 is disposed in the passage 121 which is formed inside the seat valve body 20 and serves as a part of the pilot line, any leak of the hydraulic fluid through the pilot line is completely prevented and the load check function with a high degree of liquid tightness can be achieved, even with the arrangement that the control variable throttle 33A is slightly opened when the seat valve body 20 is in the closed position. As the check valve 122 is disposed in the pilot line, there is no fear that the provision of the check valve 122 may increase the pressure loss of the main flow rate passing from the feeder passage 7C to the feeder passage 7A or 7B.

It should be noted that while the check valve 122 is disposed in the seat valve body 20 in this embodiment, the check valve may be installed at any position along the pilot line and, by way of example, it may be disposed at a junction of the passages 36 and 37 between the fixed member and the housing 1.

Third Embodiment

A third embodiment of the present invention will be described with reference to FIGS. 8 and 9. In these figures, identical members to those in FIGS. 1, 2, 4, 6, 8 and 9 are denoted by the same reference numerals. This embodiment is intended to make the supply pressure of the valve apparatus itself act upon the pilot spool valve for selectively effecting the auxiliary flow control function.

Figure 11:
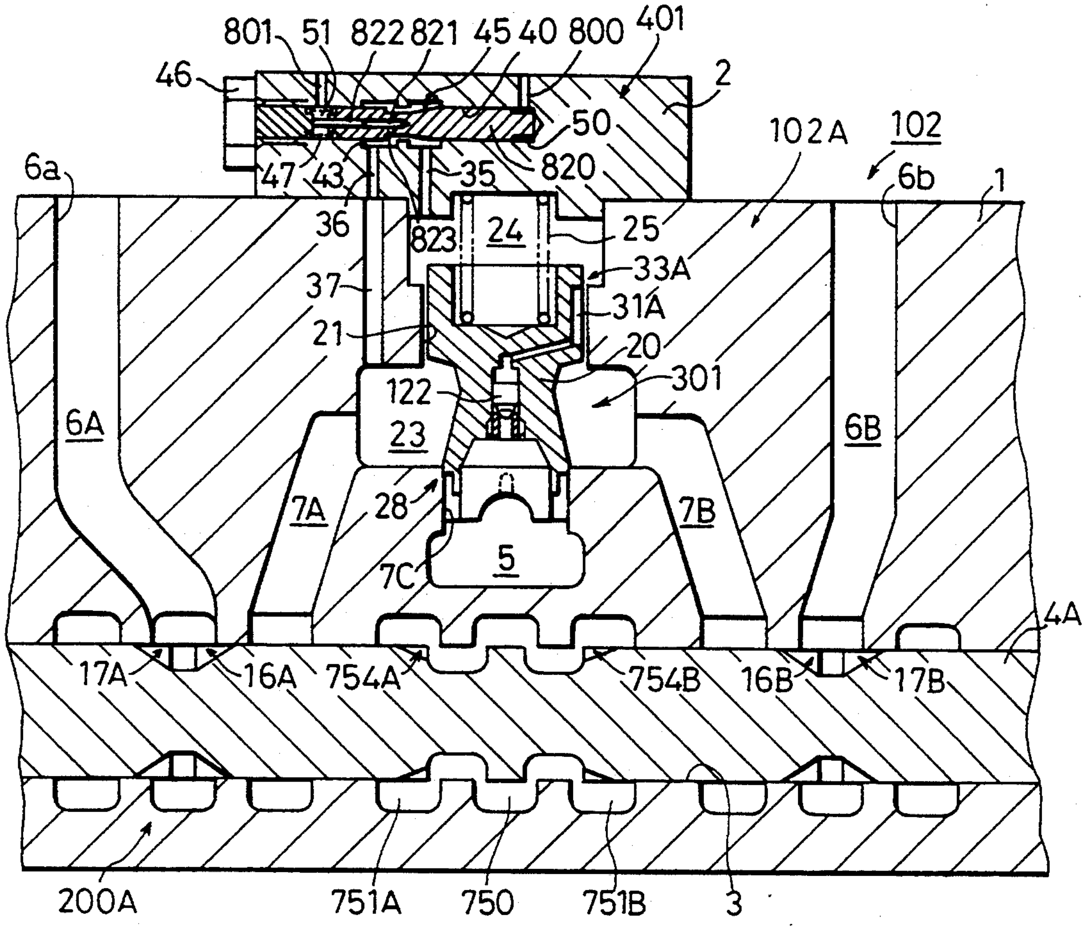
FIG. 11 is a sectional view of a hydraulic control valve apparatus according to a third embodiment of the present invention.
Figure 12:
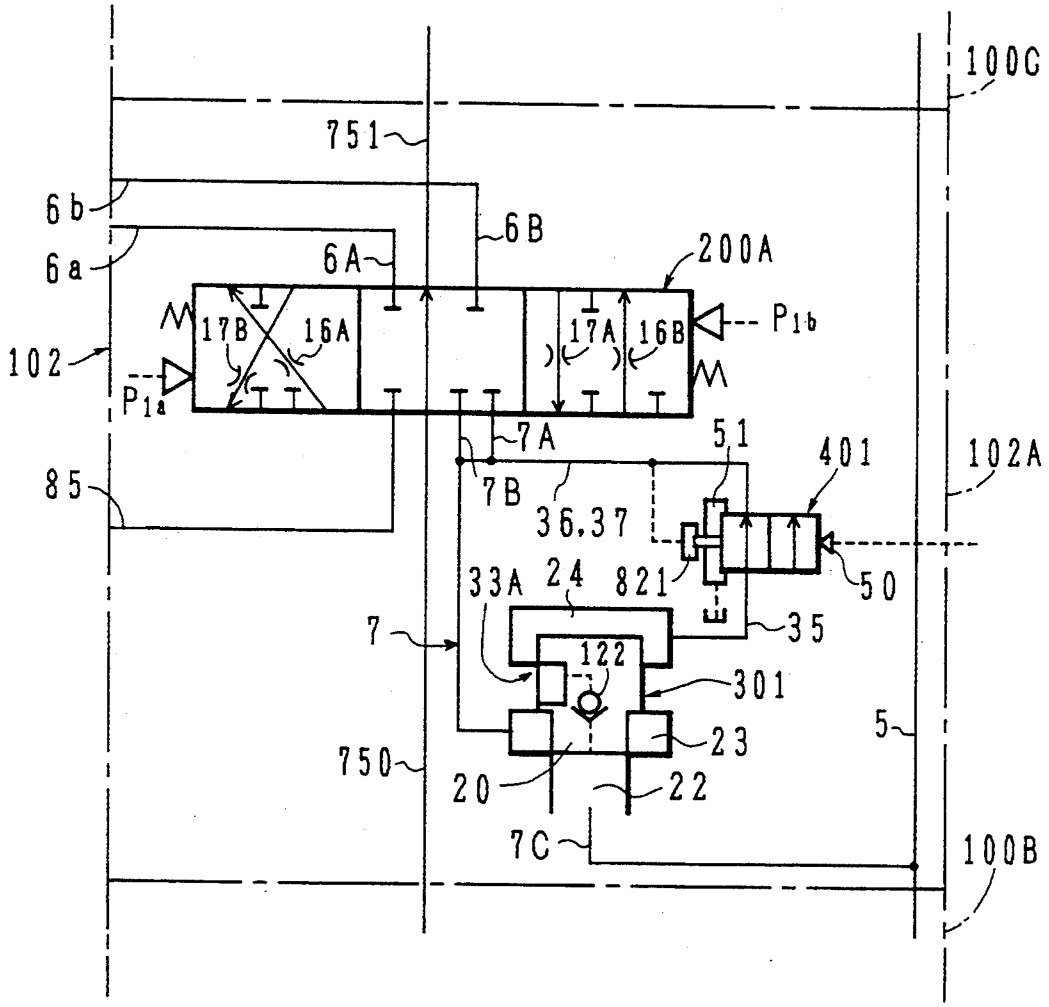
FIG. 12 is a circuit diagram of a primary part of the hydraulic control valve apparatus shown in FIG. 11.

In FIGS. 11 and 12, a first directional control valve device 102A of a hydraulic control valve apparatus 102 of this embodiment includes a pilot spool valve 401. A pressure receiving chamber 821 extending in the axial direction and being open to the pressure receiving chamber 51 is additionally formed in a pilot spool 820 of the pilot spool valve 401, and a piston 822 held at its one end in abutment against the screw 46 is slidably fitted in the pressure receiving chamber 821 on the open end side thereof. Also, the pilot spool 820 is formed with a radial passage 823 for communicating the pressure receiving chamber 821 with the outlet passage 43, so that the pressure in the feeder passage 7A or 7B is introduced to "the pressure receiving chamber 821 via the feeder passage 23 and the passages 36, 43, 823, and is then applied the pilot spool 820 in the valve opening direction.

In this embodiment thus constructed, the seat valve 301 functions as follows in combination with the pilot spool valve 401.

Assuming, as with the case of the first embodiment, that the pressure-converted value of the preset force of the spring 47 is F, the pressure-converted value of the spring constant of the spring 47 is K, the swing pilot pressure P2*a* or P2*b* is Pi, the amount of movement of the pilot spool 820 in the valve closing direction is X, and the urging force due to the pressure in the feeder passage 7A or 7B introduced to the pressure receiving chamber 821 is Fz, the balance among the forces exerted on the pilot spool 820 is expressed by;

$$Pi = F + K \cdot X + Fz \quad (14)$$

similarly to above Equation (13) for the first embodiment. Thus, the amount X of movement of the pilot spool 820 is determined by the pilot pressure Pi and the urging force Fz such that as the pilot pressure Pi increases, the amount X of movement of the pilot spool 41 is increased and the opening area of the pilot variable throttle 45 is reduced, while as the urging force Fz increases, the pilot spool 820 is moved in the valve opening direction to reduce the movement amount X and the opening area of the pilot variable throttle 45 is increased.

Accordingly, in the above-described exemplary combined operation of simultaneously driving the swing motor 701 and the arm cylinder 702, when the load pressure of the arm cylinder 702 is high, the pilot spool 820 is automatically moved in the valve opening direction to increase the opening area of the pilot variable throttle 45 and hence the amount x of movement of the seat valve body 20, whereby useless energy loss can be avoided in actual digging work.

As a result, according to this embodiment, the auxiliary flow control function can be effected only when the load pressure of the actuator 702 is low and, therefore, the satisfactory combined operation can be ensured while avoiding useless energy loss and improving economical efficiency.

Fourth Embodiment

A fourth embodiment of the present invention will be described with reference to FIGS. 13 to 15. In these figures, identical members to those in FIGS. 1, 2, 4, 6, 8 and 9 are denoted by the same reference numerals. This embodiment is intended to introduce a control signal, as the flow limiting signal, to the pilot spool valve instead of the pilot pressure for another flow control valve.

Figure 13:
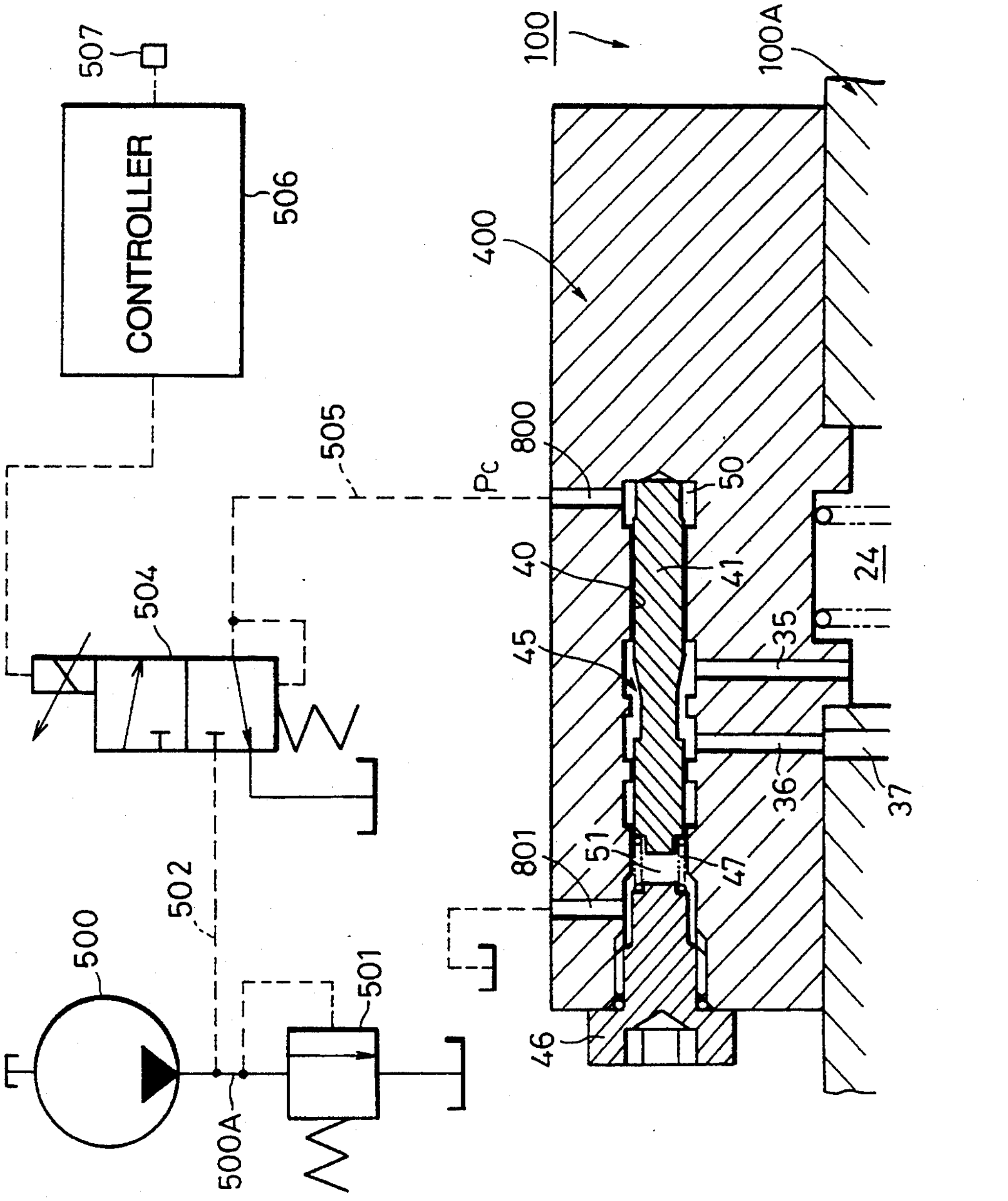
FIG. 13 is a sectional view of a pilot spool valve section of a hydraulic control valve apparatus according to a fourth embodiment of the present invention and a diagram showing a system for generating a flow restricting signal.

In FIG. 13, denoted by 500 is a pilot pump having a delivery line **500*a* to which a relief valve 501 is connected for holding the pressure in a pilot line 502 at a constant pressure. The pilot line 502 is connected to the primary side of a solenoid proportional reducing valve 504, and the secondary side of the solenoid proportional reducing valve 504 is connected to the passage 800 of the pilot spool valve 400 via a pilot line 505. The solenoid proportional reducing valve 504 is controlled by a control signal from a controller 506 to produce a control pressure Pc depending on the control signal, the control pressure Pc being introduced as the flow restricting signal to the pressure receiving chamber 50 via the line 505 and the passage 800. The controller 506 receives a set signal from a setting device 507** operable by an operator, and creates the control signal in accordance with the set signal.

Figure 14:
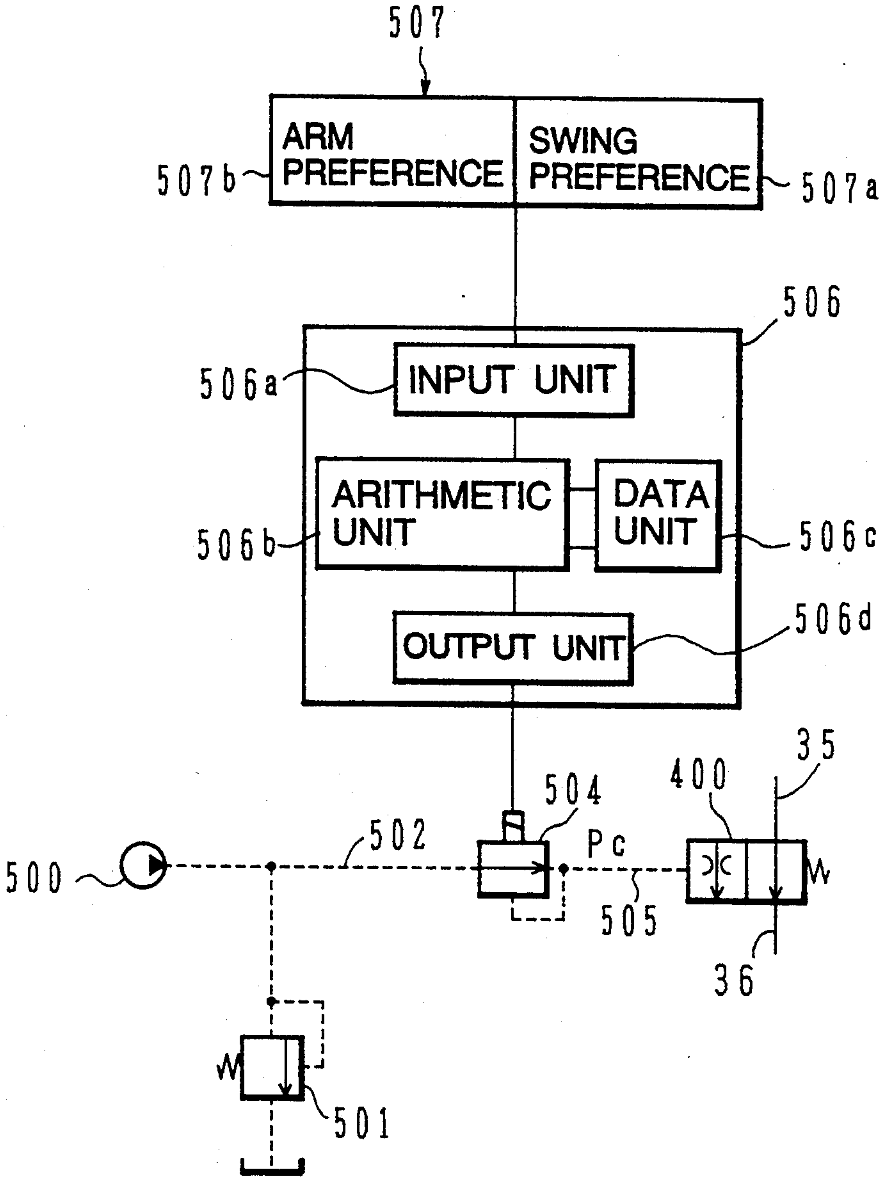
FIG. 14 is a diagram showing an exemplary configuration of the system for generating the flow restricting signal in the embodiment shown in FIG. 13.

The configuration of the controller 506 and the setting device 507 is shown in FIG. 14. The controller 506 comprises an input unit 506*a*, an arithmetic unit 506*b*, a data unit 506*c* and an output unit 506*d*. The setting device 507 comprises a swing preference switch 507*a* and an arm preference switch 507*b*.

In the above-described exemplary combined operation of simultaneously driving the swing motor 701 and the arm cylinder 702, when the swing is to be given with priority, the operator turns on the swing preference switch 507*a* for outputting a swing preference signal, as the set signal, to the controller 506. The controller 506 receives the swing preference signal via the input unit 506*a*, computes a flow control amount in the arithmetic unit 506*b* based on the swing preference signal and the data stored in the data unit 506*c*, and further outputs a corresponding control signal to the solenoid proportional reducing valve 504 from the output unit 506*d*. The solenoid proportional reducing valve 504 is controlled by that control signal from the controller 506 to produce a corresponding control pressure Pc which is introduced as the flow restricting signal to the pressure receiving chamber 50 of the pilot spool valve 400. As with the case of the pilot pressure Pi in the first embodiment, the pilot spool valve 400 controls the opening area of the pilot variable throttle 45 in accordance with the pilot pressure Pc, thereby controlling the pilot flow rate. On this occasion, the relatively large control pressure Pc is produced in response to the swing preference signal so that the opening area of the pilot variable throttle 45 is reduced to a relatively large extent. Correspondingly, the seat valve is relatively strongly throttled and the pressure of the hydraulic fluid supplied to the swing main spool valve 200B is relatively greatly raised, enabling the swing preference combined operation to be performed at a relatively high swing speed.

When the arm is to be given with priority, the operator turns on the arm preference switch 507*b*, whereupon, similarly to the above case, an arm preference signal is output to the controller 506, a corresponding control signal is output to the solenoid proportional reducing valve 504, and further a corresponding control pressure Pc is introduced to the pressure receiving chamber 50 of the pilot spool valve 400. On this occasion, the relatively large control pressure Pc is produced to reduce the opening area of the pilot variable throttle 45 to a relatively small extent. Correspondingly, the seat valve is relatively largely opened and the pressure of the hydraulic fluid supplied to the swing main spool valve 200B is raised a little, enabling the arm preference combined operation to be performed at a relatively slow swing speed and a relatively high arm-up speed.

According to this embodiment, as described above, the degree of preference of the swing or arm can be adjusted at the discretion of the operator, whereby efficiency of the combined operation is further improved.

Figure 15:
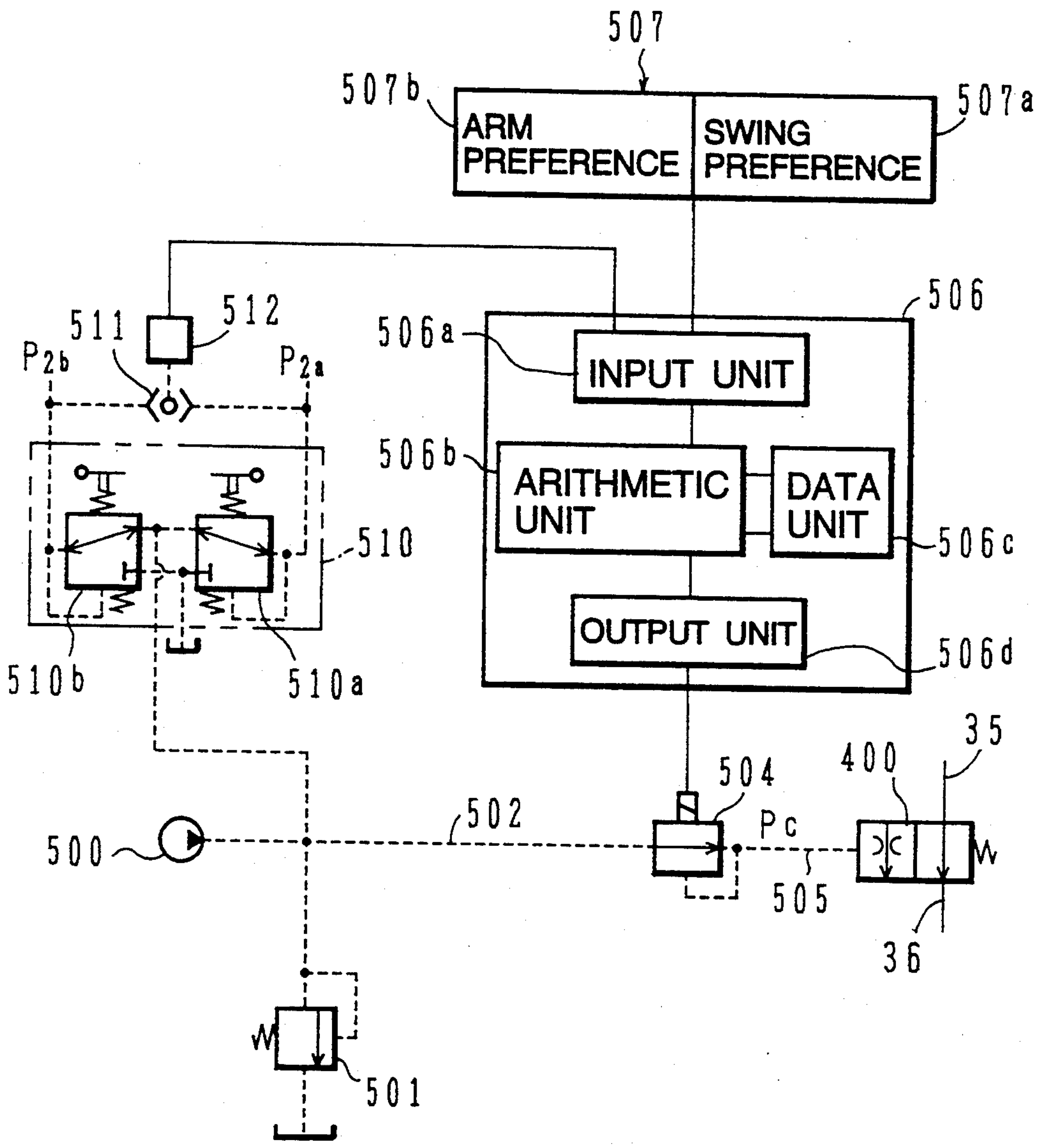
FIG. 15 is a diagram showing another exemplary configuration of the system for generating the flow restricting signal in the embodiment shown in FIG. 13.

FIG. 15 shows another exemplary configuration of a system for producing the control pressure. In FIG. 15, denoted by 510 is a pilot valve device for producing the pilot pressure P2*a* or P2*b* as an operating signal for the swing main spool valve 200B. The valve apparatus 510 comprises pilot valves 510*a*, 510*b* for producing the pilot pressures P2*a*, P2*b* depending on respective input amounts. A shuttle valve 511 is connected to pilot lines of the pilot valves 510*a*, 510*b*, and a pressure sensor 512 is connected to an output line of the shuttle valve 511. A signal indicating the pilot pressure detected by the pressure sensor 512 is input to the controller 506 in addition to the set signal from the setting device 507. The controller 506 computes a flow control amount by using the formula stored in the data unit 506 beforehand based on both the set signal from the setting device 507 and the detection signal of the pilot pressure P2*a* or P2*b* as an operating signal for the swing main spool valve 200B, followed by outputting a corresponding control signal. With this control system, therefore, the degree of preference of the seat swing or arm can be adjusted in accordance with the intention of the operator and the magnitude of the operating signal for the swing main spool valve 200B, whereby efficiency of the combined operation is further improved.

Fifth Embodiment

A fifth embodiment of the present invention will be described with reference to FIGS. 16 and 17. In these figures, identical members to those in FIGS. 1, 2, 4, 6, 8 and 9 are denoted by the same reference numerals. This embodiment is intended to provide the pilot spool valve with the variable relief function.

Figure 16:
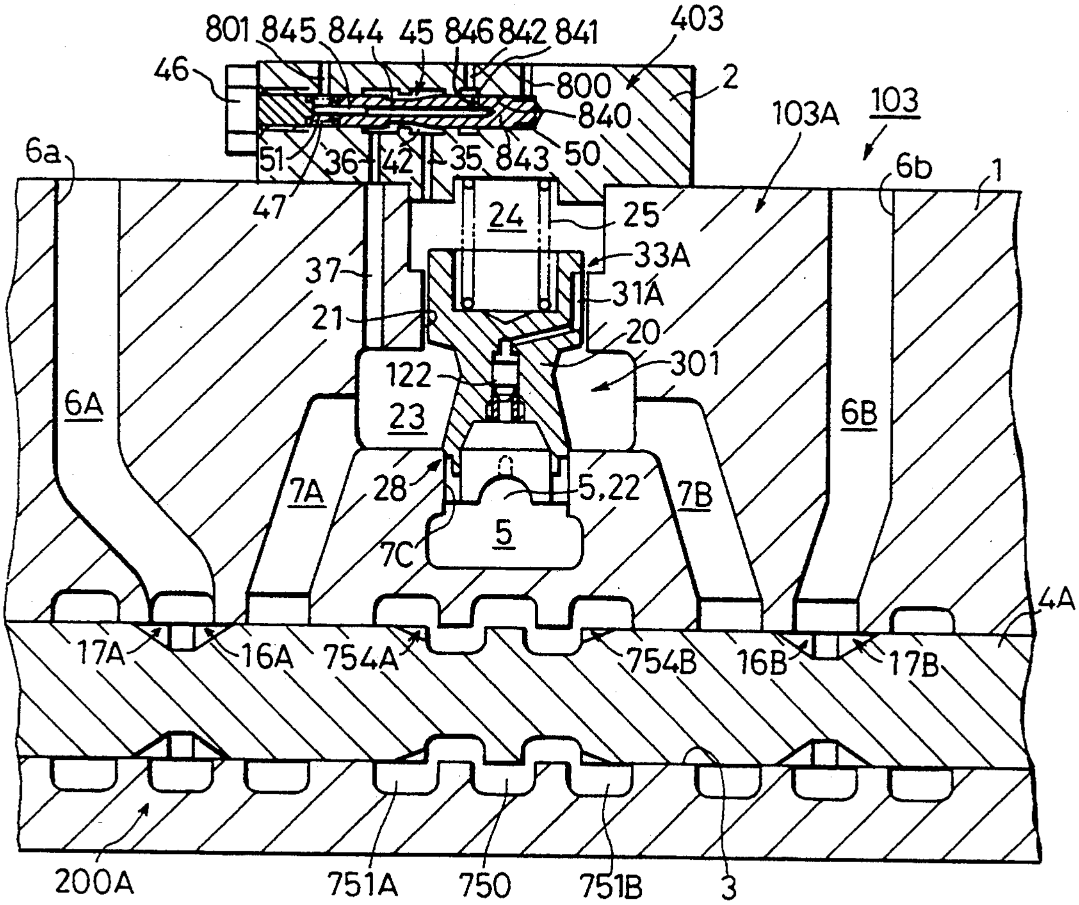
FIG. 16 is a sectional view of a hydraulic control valve apparatus according to a fifth embodiment of the present invention.
Figure 17:
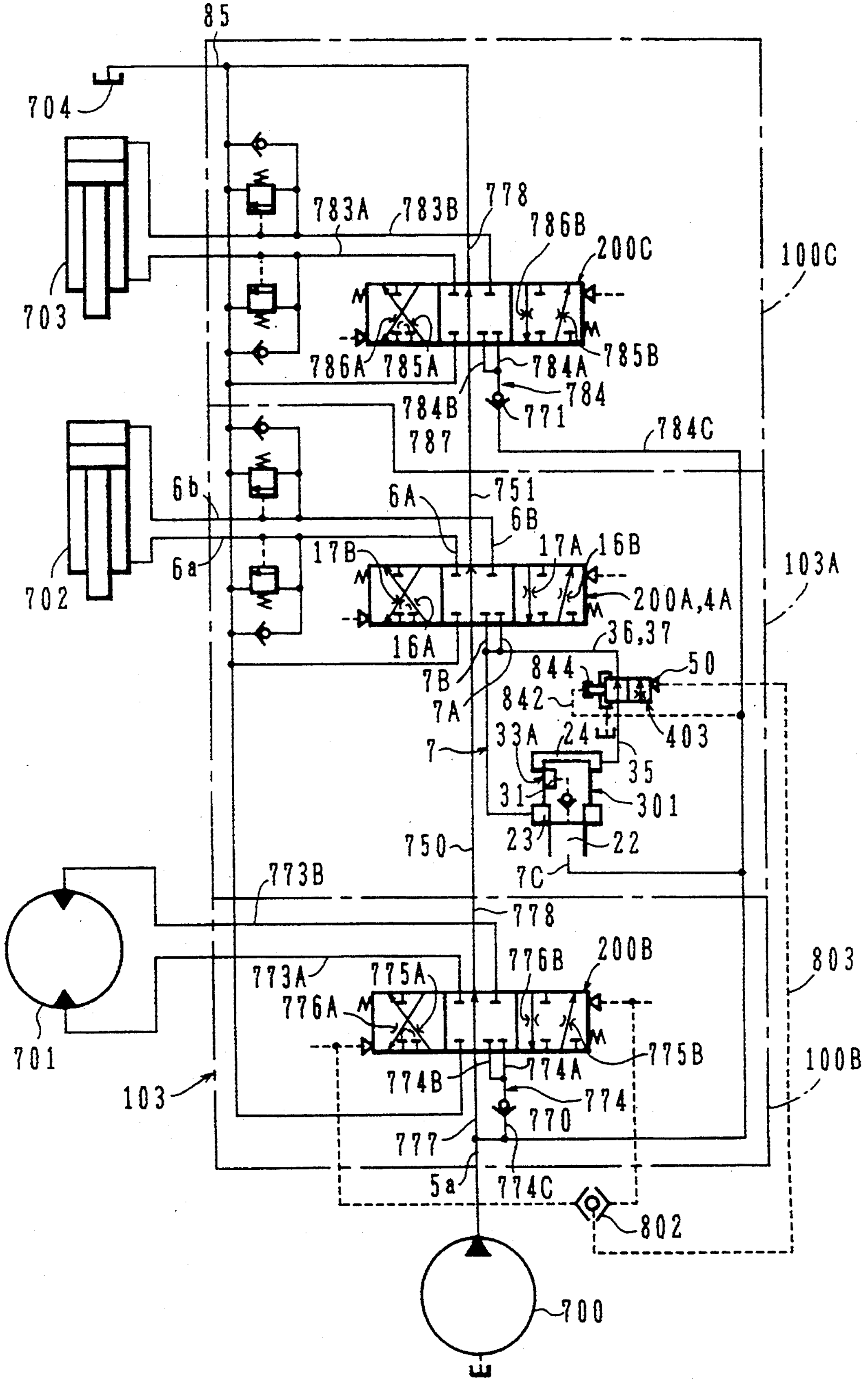
FIG. 17 is a circuit diagram of the hydraulic control valve apparatus shown in FIG. 16.

In FIGS. 16 and 17, a first directional control valve device 103A of a hydraulic control valve apparatus 103 of this embodiment includes a pilot spool valve 403. A bore 840 in the pilot spool valve 403 is additionally formed with an annular passage 841 between the pressure receiving chamber 50 and the inlet passage 42, and the fixed block 2 is formed with a passage 842 being open to the annular passage 841. A pressure receiving chamber 844 extending in the axial direction and being open to the pressure receiving chamber 51 is additionally formed in a pilot spool 843, and a piston 845 held at its one end in abutment against the screw 46 is slidably fitted in the pressure receiving chamber 844 on the open end side thereof. Also, the pilot spool 843 is formed with a radial passage 846 for communicating the pressure receiving chamber 841 with the passage 841. On the other hand, the passage 842 is connected to the pump port 5, as shown in FIG. 17. Accordingly, the supply pressure at the pump port 5 is introduced to the pressure receiving chamber 844 via the passages 842, 841, 846 and is then applied to the pilot spool 843 in the valve opening direction.

In this embodiment thus constructed, the seat valve 301 functions as follows in combination with the pilot spool valve 403.

Assuming, as with the case of the first embodiment, that the pressure-converted value of the preset force of the spring 47 is F, the pressure-converted value of the spring constant of the spring 47 is K, the swing pilot pressure P2*a* or P2*b* is Pi, the amount of movement of the pilot spool 820 in the valve closing direction is X, and the urging force due to the supply pressure at the pump port 5 introduced to the pressure receiving chamber 844 is Fp, the balance among the forces exerted on the pilot spool 843 is expressed by;

$$Pi=F+K\cdot X+Fp \quad (15)$$

similarly to above Equation (13) for the first embodiment. Thus, the amount X of movement of the pilot spool 843 is determined by the pilot pressure Pi and the urging force Fp such that as the pilot pressure Pi increases, the amount X of movement of the pilot spool 41 is increased and the opening area of the pilot variable throttle 45 is reduced, while as the urging force Fp (i.e., the pump port pressure) increases, the pilot spool 843 is moved in the valve opening direction to reduce the movement amount X and the opening area of the pilot variable throttle 45 is increased.

Accordingly, in the above-described exemplary combined operation of simultaneously driving the swing motor 701 and the arm cylinder 702, when the pressure of the hydraulic fluid supplied to the swing main spool valve 200B is raised with the throttling action of the seat valve 301 and the pump port pressure is raised until the relation between the swing pilot pressure Pi and the pump port pressure becomes corresponding to a ratio of pressure receiving area between the pressure receiving chambers 50 and 844, the pilot spool 843 starts moving in the valve opening direction to increase the opening area of the pilot variable throttle 45, thereby reducing the throttling action of the seat valve 301. Therefore, the pressure of the hydraulic fluid supplied to the swing main spool valve 200B takes a value corresponding to the swing pilot pressure Pi, meaning that the driving pressure of the swing motor 701 can be adjusted depending on the pilot pressure Pi.

As described above, according to this embodiment, the driving pressure of the swing motor 701 can be adjusted depending on the swing pilot pressure Pi, whereby efficiency of the combined operation is further improved.

It should be noted that while the foregoing embodiments are arranged to provide one of the plurality of directional control valve devices constituting the hydraulic control valve apparatus with the auxiliary flow control function by combination of the seat valve and the pilot spool valve, other one or all of the directional control valve devices may be arranged similarly so as to have the auxiliary flow control function. This enables that one or all of the directional control valve devices to have improved flow control characteristics, with the result of similar advantages.

Sixth Embodiment

A sixth embodiment of the present invention will be described with reference to FIGS. 18 to 20. The sixth to ninth embodiments are intended to implement pressure compensating control in a valve apparatus provided a flow control valve of center bypass type by using, as the flow restricting signal, a differential pressure across the main variable throttle in itself. In those figures, identical members to those in FIGS. 1, 2, 4 and 6 are denoted by the same reference numerals and will not be described here.

Figure 18:
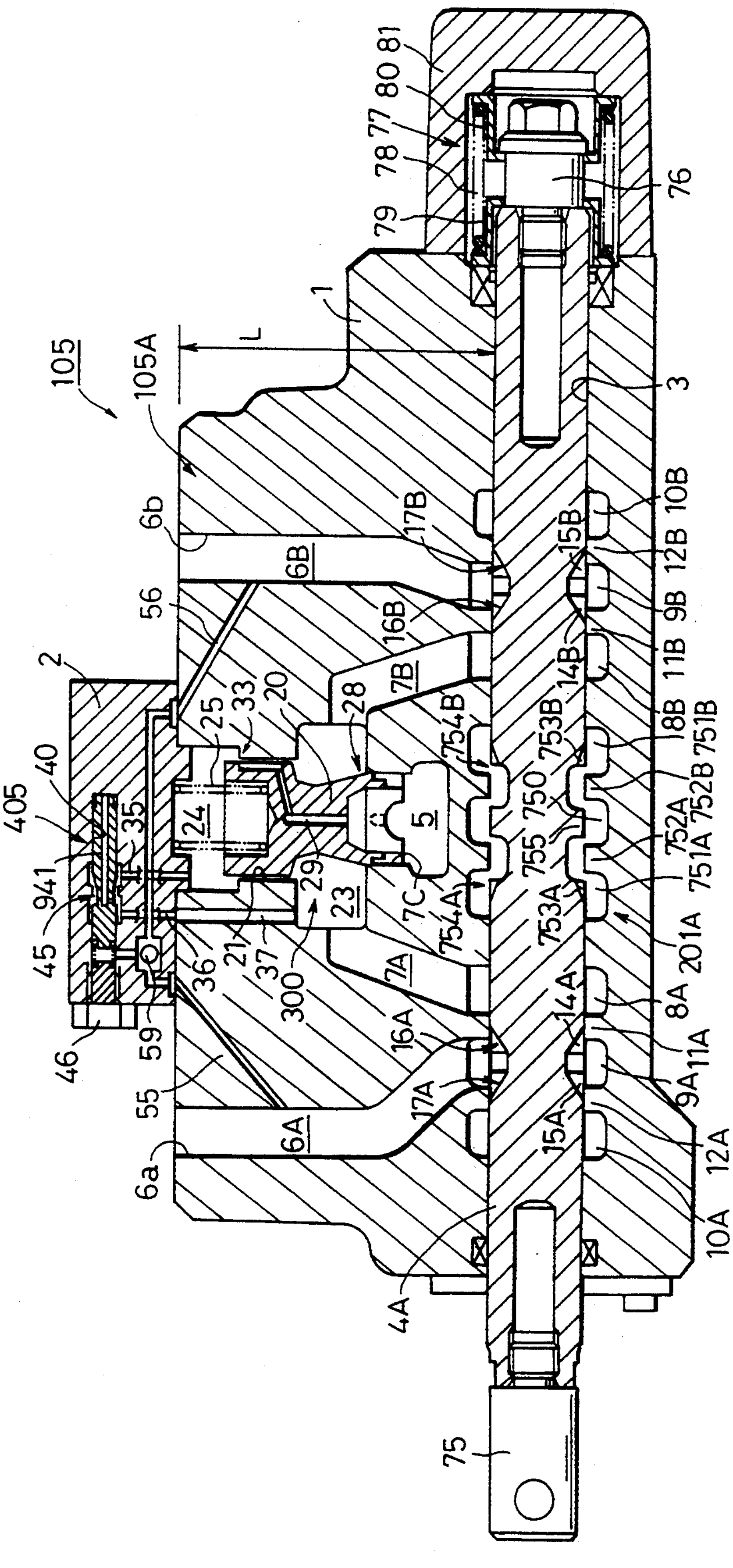
FIG. 18 is a sectional view of a hydraulic control valve apparatus according to a sixth embodiment of the present invention.
Figure 19:
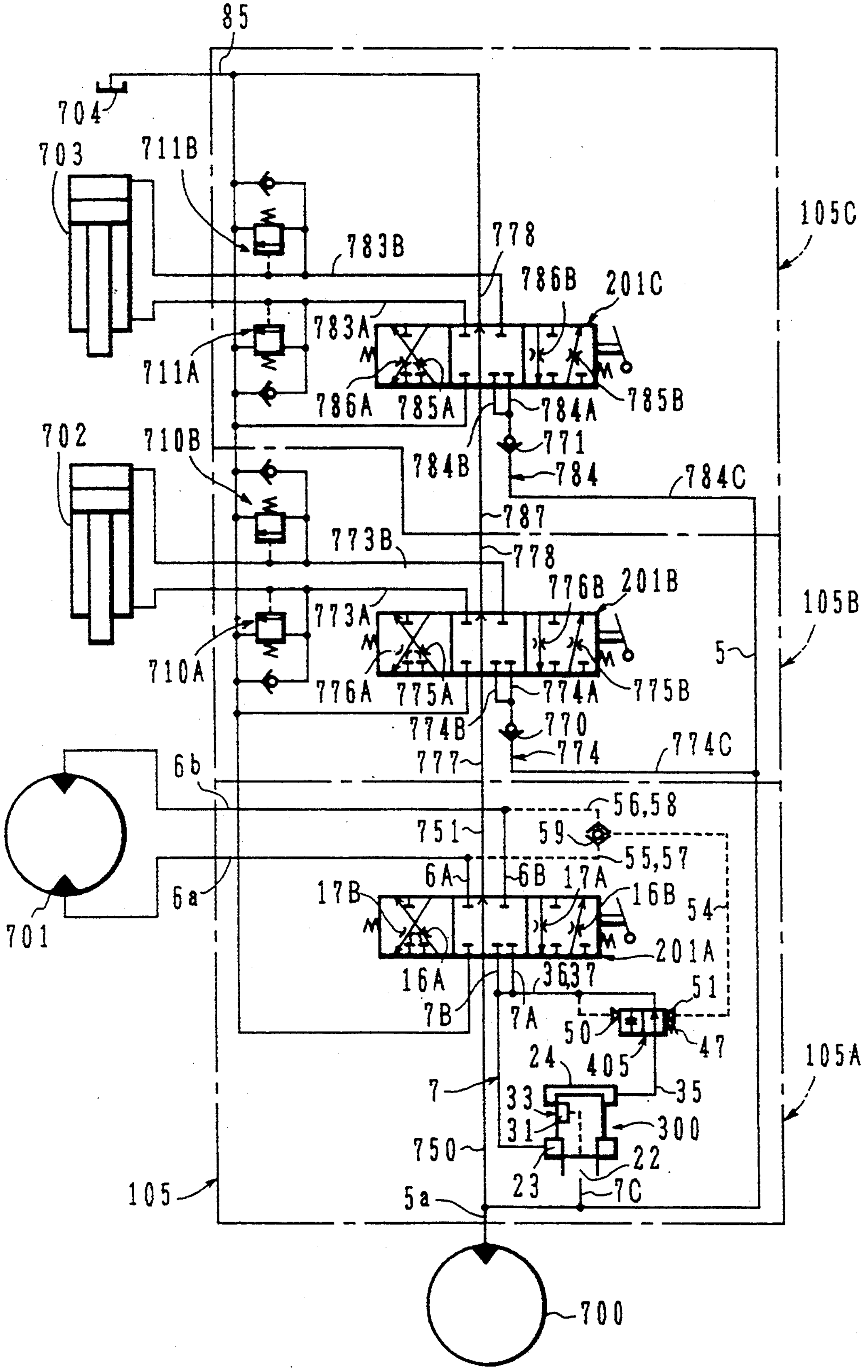
FIG. 19 is a circuit diagram of the hydraulic control valve apparatus shown in FIG. 18.
Figure 20:
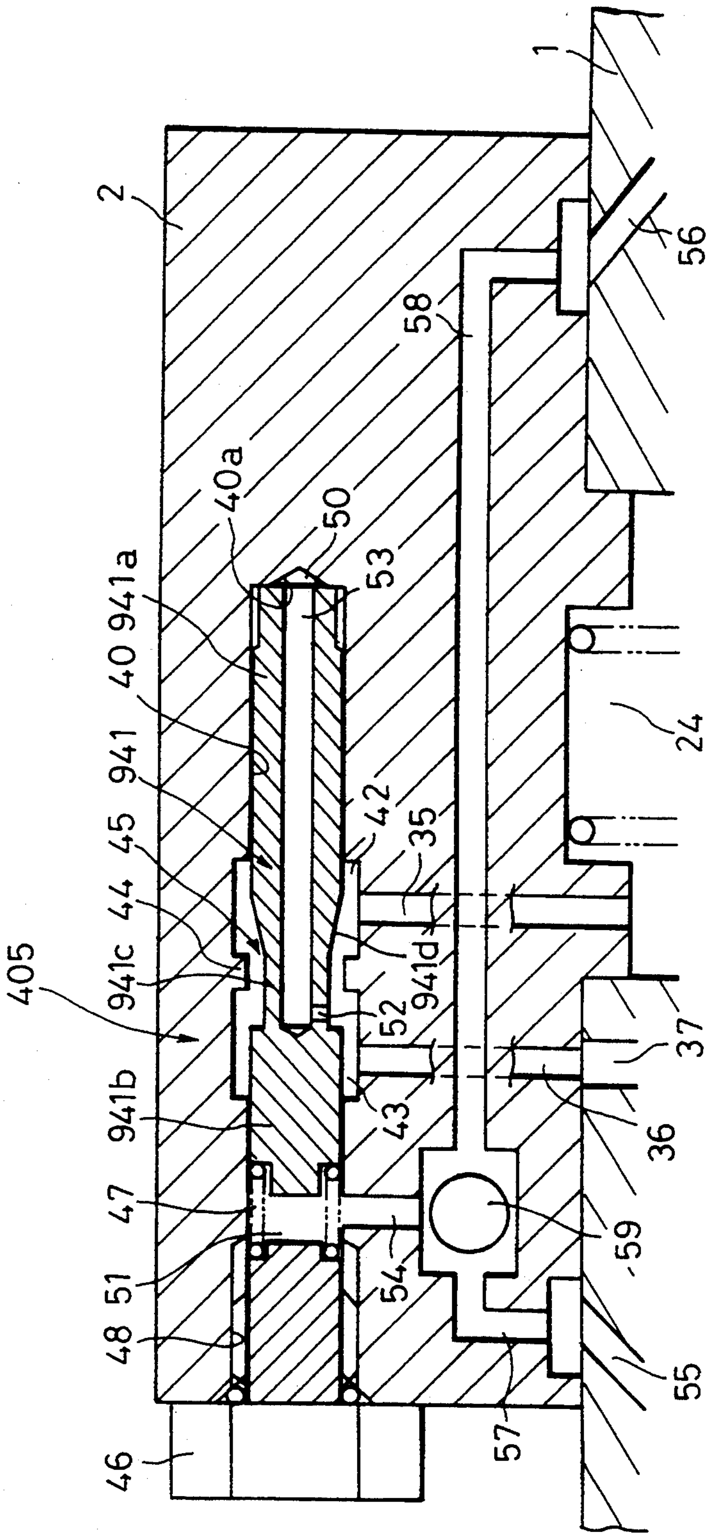
FIG. 20 is an enlarged view of a pilot spool valve in the hydraulic control valve apparatus shown in FIG. 18.

In FIGS. 18 and 19, a hydraulic control valve apparatus of this embodiment is generally denoted by reference numeral 105. The hydraulic control valve apparatus 105 comprises, as shown in FIG. 19, a first directional control valve device 105A for controlling a flow of the hydraulic fluid supplied to the hydraulic actuator 701, a second directional control valve device 105B for controlling a flow of the hydraulic fluid supplied to the hydraulic actuator 702, and a third directional control valve device 105C for controlling a flow of the hydraulic fluid supplied to the hydraulic actuator 703.

Also, the hydraulic control valve apparatus 105 comprises a housing 1 common to the first to third directional control valve devices, and a fixed block 2 associated with the first directional control valve device 105A and attached integrally to the housing 1. The first directional control valve device 105A comprises a main spool valve 201A assembled in the housing 1 for constituting a flow control valve of center bypass type, a seat valve 300 assembled in the housing 1, and a pilot spool valve 405 assembled in the fixed block 2 for constituting a pilot flow control valve.

The main spool valve 201A is the same as the main spool valve 200A in the first embodiment except that the former is manually operated. The seat valve 300 is exactly the same as the seat valve 300 in the first embodiment including the associated pilot lines.

Figure 5:
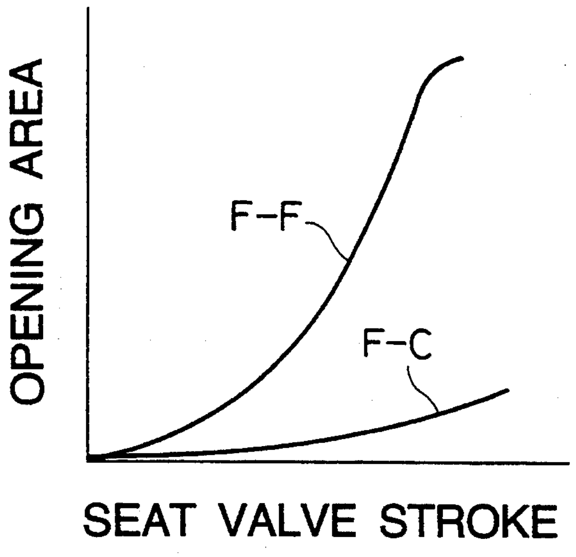
FIG. 5 is a graph showing opening characteristics of a seat valve and a control variable throttle shown in FIG. 4.

The pilot spool valve 405 is the same as the pilot spool valve 400 in the first embodiment except that a differential pressure across each of the pair of main variable throttles 16A, 16B is introduced as the flow restricting signal to the former valve. Specifically, as shown in FIG. 5 in enlarged scale, a pilot spool 941 comprises a spool portion 941*a* positioned near the bore bottom 40*a*, a spool portion 941*b* positioned near the open end of the bore 40, a small-diameter portion 941*c* positioned in the vicinity of the land 44, and a sloped portion 941*d* connecting between the small-diameter portion 941*c* and the spool portion 941*a*. The sloped portion 941*d* cooperates with the land 44 for constituting the pilot variable throttle 45 positioned between the inlet passage 42 and the outlet passage 43. The pilot variable throttle 45 changes its opening area from a predetermined minimum opening to a predetermined maximum opening, as shown in FIG. 7, depending on the amount of movement of the pilot spool 941.

The preset force of the spring 47 disposed between the screw 46 and the pilot spool 941 sets a target value of the differential pressure across each of the meter-in main variable throttles 16A, 16B of the main spool valve 201A, i.e., a target compensated differential pressure, gas described later. Thus, the spring 47 functions as target compensated differential pressure setting means.

The pilot spool 941 is formed with passages 52, 53 for communicating the outlet passage 43 with the pressure receiving chamber 50. The pressure in the feeder passages 7A, 7B is introduced to the pressure receiving chamber 50 via the feeder passage 23, the passages 36, 37, the outlet passage 43 and the passages 52, 53, and is then applied to the pilot spool 941 in the valve closing direction. Also, the fixed block 2 is formed with a passage 54 being open to the pressure receiving chamber 51, and passages 57, 58 respectively communicating with the load passages 6A, 6B via passages 55, 56 formed in the housing 1. Between the passage 54 and the passages 57, 58, a shuttle valve 59 is disposed for taking out higher one of the pressures in the passages 57, 58 to the passage 54. The higher one of the pressures in the load passages 6A, 6B is introduced to the pressure receiving chamber 51 via the passage 54 or 56, the passage 57 or 58, the shuttle valve 59 and the passage 54, and is then applied to the pilot spool 941 in the valve opening direction. With the above construction of the pressure receiving chambers 50, 51, the pilot spool valve 405 control the pilot flow rate passing through the pilot line constituted by the passages 29 to 31, 35 to 37, etc. by using the differential pressure across each of the main variable throttles 16A, 16B as the flow restricting signal.

Returning to FIG. 18 again, both ends of the main spool 4A are projecting out of end faces of the housing 1. The end of the main spool 4A on the left side in FIG. 18 is coupled to a control lever (not shown) through a plug 75, whereas the end of the main spool 4A on the right side in FIG. 18 is coupled to the centering spring mechanism 77 through the plug 76. The centering spring mechanism 77 is covered by a cover 81 attached to the housing 1.

In FIG. 19, the second and third directional control valve devices 105B, 105C is of the same construction as the prior art flow control valve of center bypass type, and is also of the same construction as the directional control valve devices 100B, 100C of the first embodiment except that main spool valves 201B, 201C of the former is manually operated.

In the hydraulic control valve apparatus 105 of this embodiment constructed as described above, the seat valve 300 of the first directional control valve device 105A is operated based on the principles described in the above-cited JP, A, 58-501781 as with the first embodiment. More specifically, the opening area of the pilot flow groove 31 formed in the seat valve body 20 with respect to the land 32 (i.e., the opening area of the control variable throttle 33) is changed depending on the amount of movement (stroke) of the seat valve body 20. The amount of movement of the seat valve body 20 is determined depending on the pilot flow rate passing through the pilot flow groove 31 (the control variable throttle 33). Also, the pilot flow rate is determined by the opening area of the variable throttle 45 of the pilot spool valve 405. As a result, the main flow rate passing from the feeder passage 7C to the feeder passage 23 through the auxiliary variable throttle 28 of the seat valve body 20 is in proportion to the pilot flow rate and, therefore, is determined by the opening area of the variable throttle 45 of the pilot spool valve 405.

Further, in the pilot spool valve 405, the opening area of the variable throttle 45 is controlled such that it is changed in accordance with the differential pressure across the main variable throttle 16A or 16B as the flow restricting signal.

Consequently, in combination with the pilot lines 24, 29 to 31 and 35 to 37 (see FIG. 4) and the pilot spool valve 405, the seat valve 300 restricts the flow rate of the hydraulic fluid supplied from the pump passage 5 to the main variable throttle 16A or 16B through the feeder passage 7 in accordance with the differential pressure across the main variable throttle 16A or 16B (i.e., the flow restricting signal), thereby carrying out the auxiliary flow control function with which the flow rate of the hydraulic fluid flowing into each of the pair of load passages 6A, 6B is controlled in an auxiliary manner. This function will be described in more detail below.

First, for the seat valve 300, above Equations (1) to (12) are held as described in connection with the first embodiment.

Then, in the pilot spool valve 405, the preset force of the spring 47 as target compensated differential pressure setting means is applied to the pilot spool 941 as an urging force in the valve opening direction, the pressure in the feeder passage 7A or 7B is applied to the pressure receiving chamber 50 to act in the valve closing direction, and further the load pressure in the load passage 6A or 6B is applied to the pressure receiving chamber 51 to act in the valve opening direction. Therefore, assuming that the load pressure is PL, the pressure-converted value of the preset force of the spring 47 is F, and the pilot spool 941 has the same pressure receiving area in the pressure receiving chambers 50, 51, the balance among the forces exerted on the pilot spool 941 is expressed by;

$$PL+F=Pz \tag{16}$$

because the pressure in the feeder passage 7A or 7B is equal to the pressure Pz in the feeder passage 23 of the seat valve 300. Equation (16) is rewritten to:

$$Pz-PL=F \tag{17}$$

Further, assuming now that the opening area of the main variable throttle 16A or 16B provided by the main spool 4A is A, the flow rate Qv having passed through the seat valve 300 is related to the differential pressure across the main variable throttle 16A or 16B by the following equation, when the flow rate Qv passes through the main variable throttle;

$$Qv=C4 \cdot A \cdot (Pz-PL)^{\frac{1}{2}} \tag{18}$$

By using Equations (12) and (17), Equation (18) is modified to:

$$qs=C4 \cdot A/(1+\alpha) \cdot F^{\frac{1}{2}} \tag{19}$$

Also, by using Equation (17), Equation (18) is modified to:

$$Qv=C4 \cdot A \cdot F^{\frac{1}{2}} \tag{20}$$

Equation (20) means that the flow rate passing through the main variable throttle 16A or 16B of the main spool valve 201A (i.e., the flow rate supplied from the pump passage 5 to the load passage 6A or 6B) is determined by the preset force F and the opening area A of the main variable throttle 16A or 16B irrespective of the supply pressure in the pump passage 5 and the load pressure in the load passage 6A or 6B. The target value of the differential pressure Pz - PL across the main variable throttle 16A or 16B at this time is set as a value provided by the preset force F, as seen from Equation (17).

Consequently, in combination with the pilot lines 24, 29 to 31, 35 to 37 (see FIG. 4) and the pilot spool valve 405, the seat valve 300 carries out the auxiliary flow control function of restricting the flow rate of the hydraulic fluid supplied to the main variable throttle 16A or 16B in accordance with the differential pressure across the main variable throttle 16A or 16B (i.e., the flow restricting signal). On this occasion, the differential pressure Pz - PL across the main variable throttle 16A or 16B is subjected to pressure compensating control so that it is held at the target compensated differential pressure set by the preset force F of the spring 47 regardless of variations in the load pressure or the supply pressure.

Thus, since the first directional control valve device 105A of the hydraulic control valve apparatus 105 of this embodiment has the pressure compensating function, the accuracy in flow control by the first directional control valve device 105A is improved and the operability at transition from the sole operation to the combined operation is also improved.

More specifically, supposing that, in FIG. 19, the hydraulic control valve apparatus 105 of this embodiment is used in a hydraulic circuit system for a hydraulic excavator, the hydraulic actuator 701 is a swing motor for driving a swing to rotate, and the hydraulic actuator 702 is a boom cylinder for ascending and descending a boom, the case of transition from the sole swing operation in which only the swing motor 701 is driven to the combined operation of swing and boom-up in which the swing motor 701 and the boom cylinder 702 are simultaneously driven is considered. In this case, the load pressure of the swing motor 701 during the sole swing operation is relatively low, and the input amount to the directional control valve device 105A (i.e., the amount of movement of the main spool 4A) is relatively small, hence the swing motor 701 is rotated at a fine speed. When the load pressure of the boom cylinder 702 is higher than the load pressure of the swing motor 701 during the combined operation, a larger amount of the hydraulic fluid is going to flow into the swing motor 701 which is an actuator having a low load pressure, because the feeder passages 7, 774 of the directional control valve devices 105A, 105B for both the actuators are connected in parallel. At this time, if the first directional control valve device 105A has no pressure compensating function and the first directional control valve device 105A is of the same construction as the second directional control valve device 105B, the swing motor 701 would start speeding-up unexpectedly when coming into the combined operation. Such a behavior would occur at the time the second directional control valve device 105B is operated with an intention of ascending the boom during the craning work in which a load is suspended while being swung. Thus, the flow rate supplied to the swing motor 701 would be quickly increased to cause abrupt change in the swing speed, giving rise to a very risky condition.

In this embodiment, since the first directional control valve device 105A has the pressure compensating function, the flow rate Qv passing through the main variable throttle 16A or 16B is determined by the preset force F and the opening area A of the main variable throttle 16A or 16B irrespective of the supply pressure in the pump passage 5 and the load pressure in the load passage 6A or 6B. Therefore, it is possible to avoid the above quick increase in the flow rate supplied to the swing motor 701 and hence abrupt change in the swing speed, allowing the sole swing operation to be safely transited to the combined operation of swing and boom-up.

Further, other features that the seat valve 300 has the load check function, the height L of the housing 1 is not increased, and the structure is simple, are obtained similarly to the first embodiment.

Consequently, according to this embodiment, the auxiliary flow control function (pressure compensating function) with high control accuracy can be achieved in the hydraulic control valve apparatus 105 provided with the spool valve 201A as a flow control valve of spool type. Also, the pressure loss is not increased even with the provision of the auxiliary flow control function, and the actuator can be driven with smaller energy loss. Further, it is possible to make the housing compact, to more easily mount the valve apparatus on construction machines and manufacture it, and to reduce the production cost of the valve apparatus. Additionally, since the auxiliary flow control function is provided by the use of a flow control valve of center bypass type, the accuracy in flow control can be improved and the operability at transition from the sole operation to the combined operation can also be improved.

Seventh Embodiment

Figure 21:
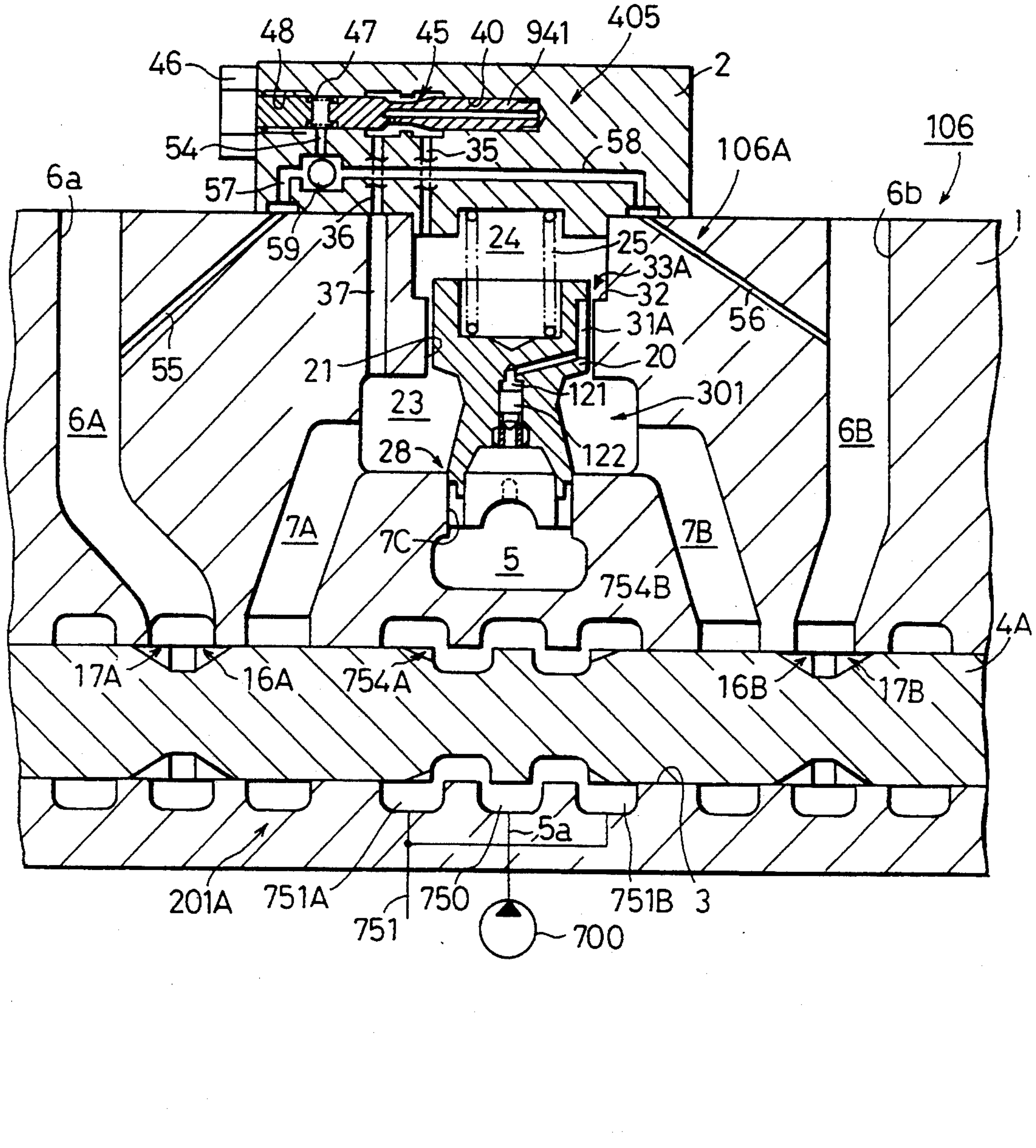
FIG. 21 is a sectional view of a hydraulic control valve apparatus according to a seventh embodiment of the present invention.
Figure 22:
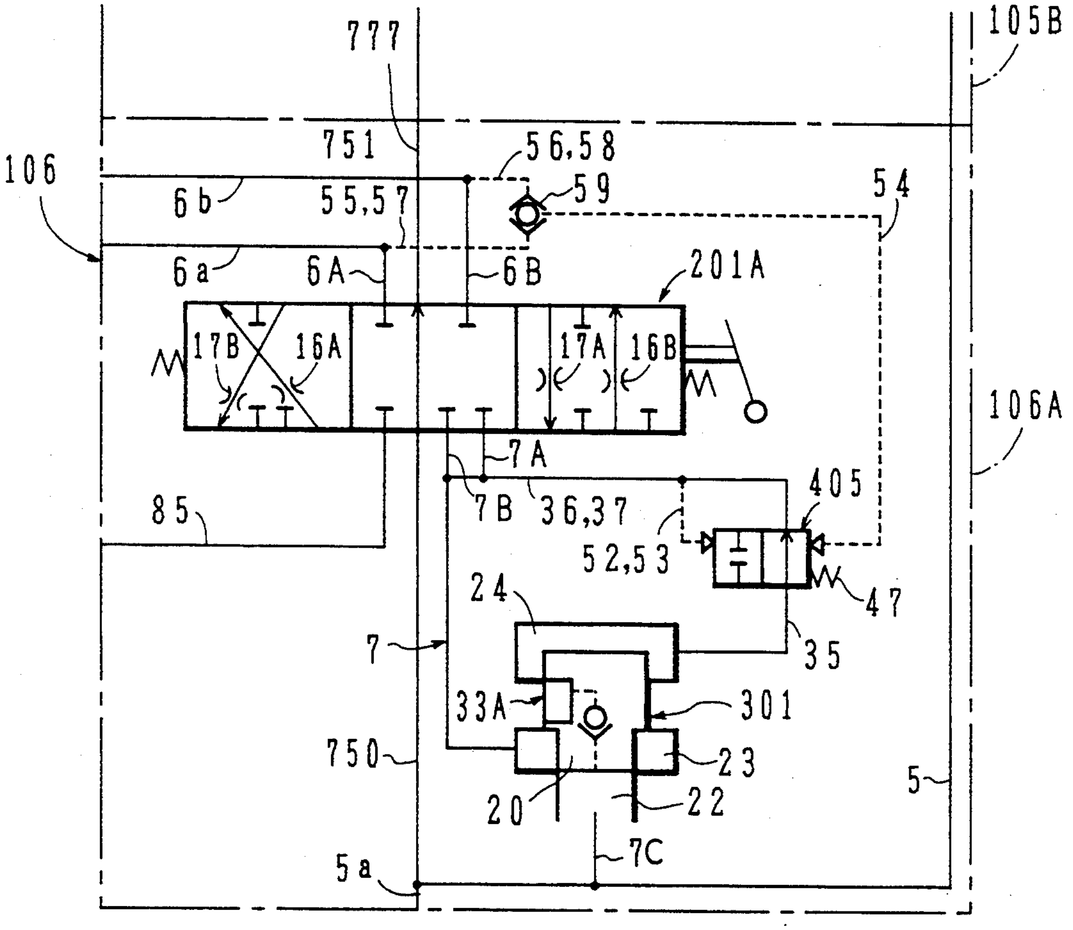
FIG. 22 is a circuit diagram of a primary part of the hydraulic control valve apparatus shown in FIG. 21.

A seventh embodiment of the present invention will be described with reference to FIGS. 21 and 22. In these figures, identical members to those in FIGS. 8, 9 and 18 to 20 are denoted by the same reference numerals. This embodiment is intended to modify the sixth embodiment in a like manner to the second embodiment. In a first directional control valve device 106A of a hydraulic control valve apparatus 106, a passage 121 is formed in the seat valve body 20 of the seat valve 301 instead of the passage 29 shown in FIG. 18, and a check valve 122 for allowing the hydraulic fluid to flow from the feeder passage 7C toward the hydraulic chamber 24 but for blocking it to flow in the reversed direction is disposed in the passage 121. Also, a pilot flow groove 31A formed in the seat valve body 20 is set in the positional relationship with respect to the land 32 such that, as indicated by F-C in FIG. 10, a control variable throttle 33A is slightly opened when the seat valve body 20 is in its closed position. Note that the check valve may be installed at any position along the pilot line.

As with the second embodiment, according to this embodiment, it is possible to produce the stable pilot flow, improve the accuracy in flow control, and to more easily manufacture the control variable throttle 33A. Further, any leak of the hydraulic fluid through the pilot line is completely prevented and the load check function with a high degree of liquid tightness can be achieved.

Eighth Embodiment

An eighth embodiment of the present invention will be described with reference to FIGS. 23 and 24. In these figures, identical members to those in FIGS. 18 to 20 and 21 are denoted by the same reference numerals. This embodiment is intended to make the preset force of the spring in the pilot spool valve adjustable from the outside.

Figure 23:
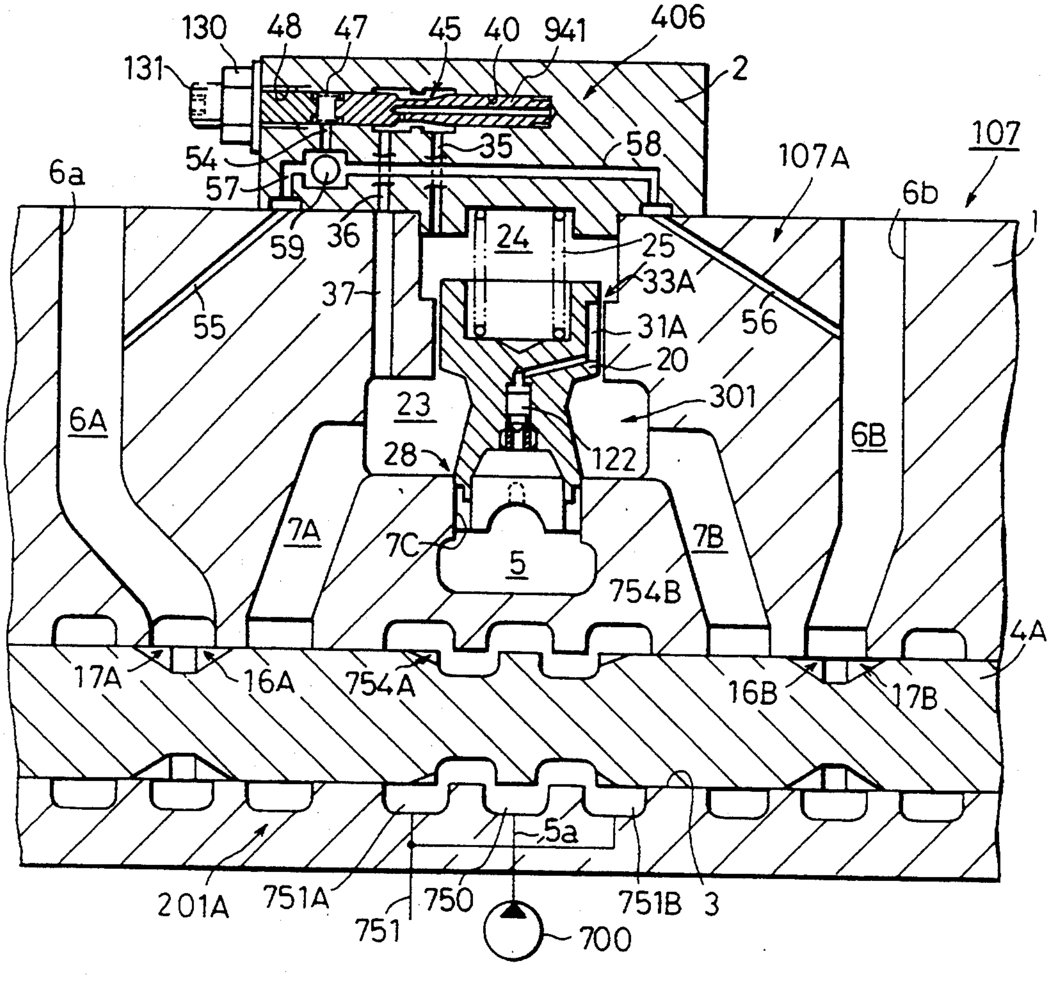
FIG. 23 is a sectional view of a hydraulic control valve apparatus according to an eighth embodiment of the present invention.
Figure 24:
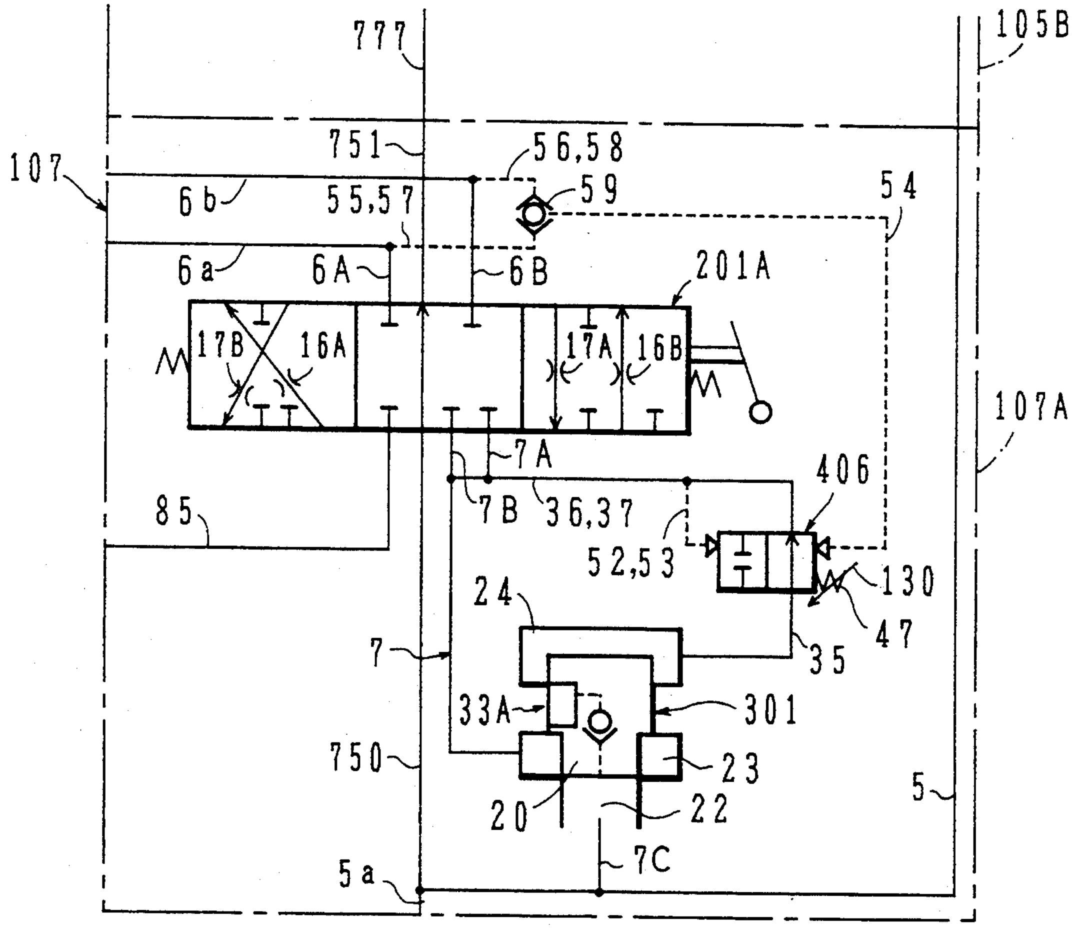
FIG. 24 is a circuit diagram of a primary part of the hydraulic control valve apparatus shown in FIG. 23.

In FIGS. 23 and 24, a first directional control valve device 107A of a hydraulic control valve apparatus 107 of this embodiment includes a pilot spool valve 406. A bore 40 of the pilot spool valve 406 is closed at its open end by an adjuster screw 130, and the adjuster screw 130 is fastened to a threaded hole 48 formed in the open end of the bore 40. Also, the adjuster screw 130 is integrally provided at its head with an operating portion 131 into which a hexagonal wrench can be inserted for turning the screw head. Between the adjuster screw 130 and the pilot spool 941, as with the sixth embodiment, there is disposed a spring 47 of which opposite ends are held in abutment against the pilot spool 941 and the screw 130. The preset force of the spring is applied as an urging force to the pilot spool 941 in the valve closing direction.

In this embodiment, turning the operating portion 131 changes the depth by which the adjuster screw 130 is inserted into the pilot spool valve and, correspondingly, the preset force of the spring 47 is also changed. As previously described, the preset force of the spring 47 sets the target value of the differential pressure across each of the main variable throttles 16A, 16B of the main spool valve 201A (i.e., the target compensated differential pressure), and hence sets the pressure compensating characteristic of the seat valve 301 with which the flow rate passing through each of the main variable throttles 16A, 16B is controlled. Therefore, by operating the adjuster screw 130, the target compensated differential pressure is adjusted, whereupon the pressure compensating characteristic of the seat valve 301 is adjusted to enable adjustment of the flow characteristic of the first directional control valve device 107A.

Consequently, according to this embodiment, the optimum pressure compensating characteristic and flow characteristic can be set depending on the type of actuator to be driven by the first directional control valve 100A, the type of actuator load and so on, whereby the operability is further improved.

Ninth Embodiment

A ninth embodiment of the present invention will be described with reference to FIGS. 25 and 26. In these figures, identical members to those in FIGS. 18 to 20 and 21 are denoted by the same reference numerals. This embodiment is intended to provide hydraulic force generating means instead of the spring as target compensated differential pressure setting means for the pilot spool valve, and to vary a pressure introduced to the hydraulic force generating means, thereby making the target compensated differential pressure adjustable.

Figure 25:
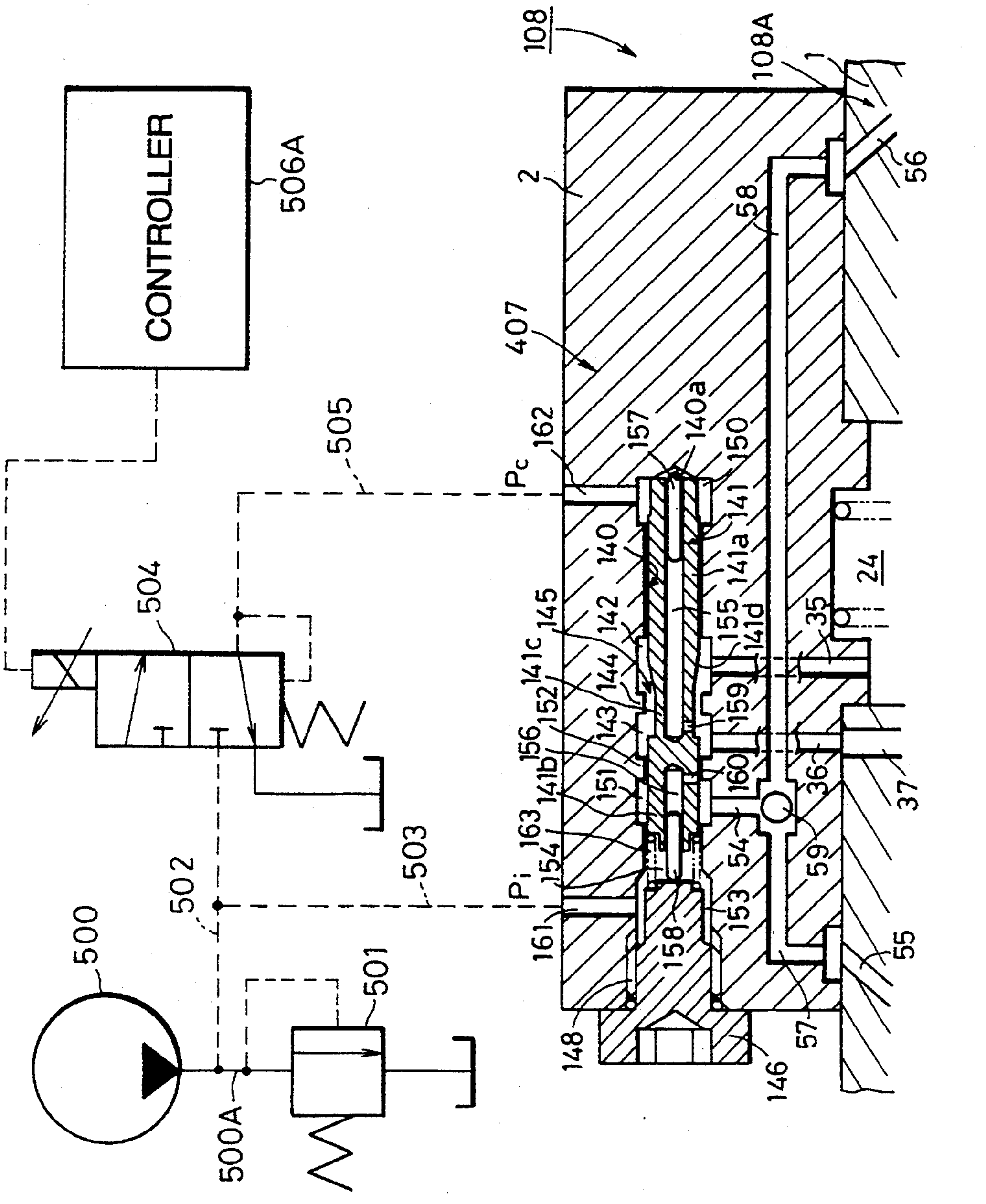
FIG. 25 is a sectional view of a pilot spool valve section of a hydraulic control valve apparatus according to a ninth embodiment of the present invention and a circuit diagram showing an associated circuit configuration.
Figure 26:
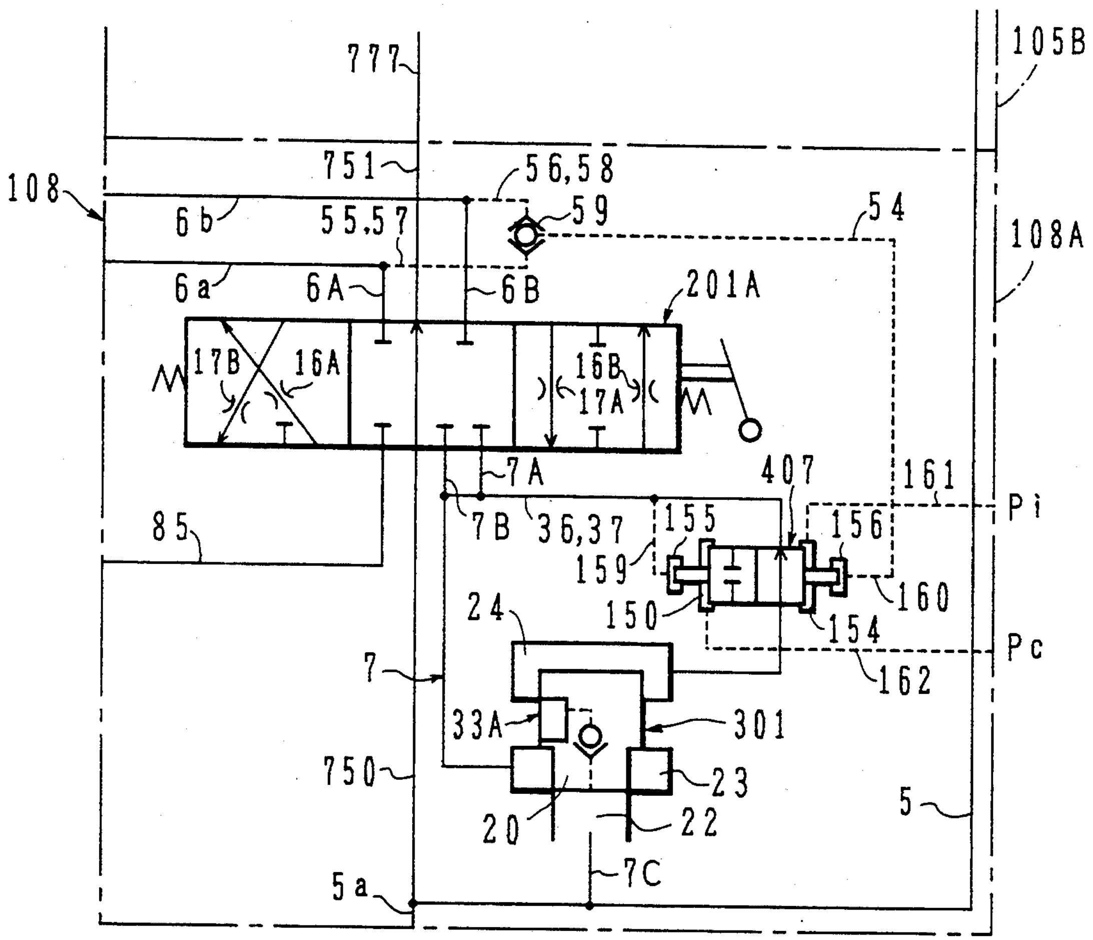
FIG. 26 is a circuit diagram of a primary part of the hydraulic control valve apparatus shown in FIG. 25.

In FIGS. 25 and 26, a first directional control valve device 108A of a hydraulic control valve apparatus 108 of this embodiment includes a pilot spool valve 407 which is constructed as follows.

The fixed block 2 has a bore 140 formed therein, the bore 140 having a bottom 40*a* at one end and being open at the other end to an outer surface of the fixed block. A spool valve body (hereinafter referred to as a pilot spool) 141 of the pilot spool valve 407 is slidably fitted in the bore 140. As with the foregoing embodiments, the bore 140 is also formed parallel to the bore 3 of the main spool valve 201A (see FIG. 1) and, correspondingly, the pilot spool 141 is also arranged parallel to the main spool 4A (see FIG. 18).

The bore 140 has an annular pressure receiving chamber 150 defined adjacent to the bottom 140*a* thereof. The bore 140 is also formed near the center with an annular inlet passage 142 to which the passage 35 is open, an annular outlet passage 143 to which the passage 36 is open, and an annular passage 151 to which tile passage 54 is open. Annular lands 144, 152 are thereby provided respectively between the inlet passage 142 and the outlet passage 143 and between the outlet passage 143 and the passage 151. Further, an annular passage 153 is formed in the open end side of the bore 140, and a threaded hole 148 is formed in an open end portion of the bore 140. A screw 146 is fastened to the threaded hole 148 for closing the open end of the bore 140. A pressure receiving chamber 154 communicating with the passage 153 is defined between the screw 146 and the pilot spool 141.

The pilot spool 141 comprises a spool portion 141*a* positioned near the bore bottom 140*a*, a spool portion 141*b* positioned near the open end of the bore 140, a small-diameter portion 141*c* positioned in the vicinity of the land 144, and a sloped portion 141*d* connecting between the small-diameter portion 141*c* and the spool portion 141*a*. The sloped portion 141*d* cooperates with the land 144 for constituting a pilot variable throttle 145 positioned between the inlet passage 142 and the outlet passage 143, the pilot variable throttle 145 changing its opening area from a predetermined minimum opening to a predetermined maximum opening, as shown in FIG. 7, depending on the amount of movement of the pilot spool 141.

Formed inside the pilot spool 141 are a pressure receiving chamber 155 extending in the axial direction and being open to the bore bottom 140*a*, and a pressure receiving chamber 156 extending in the axial direction and being open to the pressure receiving chamber 154. A piston 157 held at its one end in abutment against the bore bottom 140*a* is slidably inserted in the pressure receiving chamber 155 on the open end side thereof, and a piston 158 held at its one end in abutment against the screw 148 is slidably inserted in the pressure receiving chamber 156 on the open end side thereof. Also, the pilot spool 141 is formed with a radial passage 159 for communicating the pressure receiving chamber 155 with the outlet passage 143, and a radial passage 160 for communicating the pressure receiving chamber 156 with the passage 151. The pressure in the feeder passage 7A or 7B is introduced to the pressure receiving chamber 155 via the feeder passage 23 and the passages 36, 37 in the seat valve, the outlet passage 143 and the passage 159, and is then applied to the pilot spool 141 in the valve closing direction. Higher one of the pressures in the load passages 6A, 6B is introduced to the pressure receiving chamber 156 via the passage 54 or 56, the passage 57 or 58, the shuttle valve 59 and the passage 54, and is then applied to the pilot spool 141 in the valve opening direction. The pressure receiving chambers 155, 156 are set to have the same inner diameter and the pistons 157, 158 are set to have the same outer diameter so that the pressure receiving areas of the pressure receiving chambers 155, 156 are equal to each other and the pressure receiving areas of the pistons 157, 158 are equal to each other.

Further, the fixed block 2 is formed with a passage 161 for introducing a pressure-constant hydraulic fluid to the pressure receiving chamber 154, and a passage 162 for introducing a pressure-variable hydraulic fluid to the passage 150. The constant pressure introduced to the pressure receiving chamber 154 is applied to the pilot spool 141 in the valve opening direction, and the pressure introduced to the pressure receiving chamber 150 is applied to the pilot spool 141 in the valve closing direction.

It should be noted that while a spring 163 held at one end in abutment against the pilot spool 141 and at the other end in abutment against the screw 146 is disposed in the pressure receiving chamber 154, the spring 163 is provided for the purpose of absorbing vibrations and an urging force of the spring 163 acting upon the pilot spool 141 is as small as negligible.

Accordingly, the difference between a hydraulic force due to the constant pressure introduced to the pressure receiving chamber 154 to act in the valve opening direction and a hydraulic force due to the variable pressure introduced to the pressure receiving chamber 150 acts as an urging force instead of the preset force of the spring 47 as target compensated differential pressure setting means in the embodiment shown in FIG. 18. The urging force is adjustable by controlling the pressure introduced to the pressure receiving chamber 150.

Figure 10:
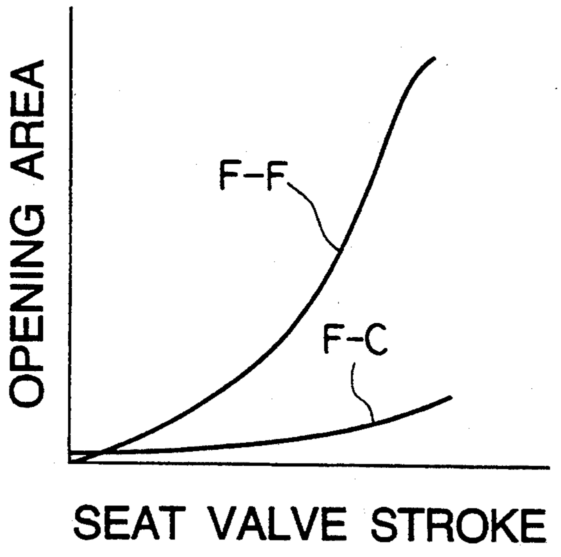
FIG. 10 is a graph showing opening characteristics of a seat valve and a control variable throttle shown in FIG. 8.

One exemplary configuration for producing the constant pressure introduced to the pressure receiving chamber 154 and the variable pressure introduced to the pressure receiving chamber 150 is shown in FIG. 10 together. In FIG. 25, denoted by 500*a* is a pilot pump having a delivery line 507 to which a relief valve 501 is connected for holding the pressure in a pilot line 502 at a constant pressure Pi. The pilot line 502 is connected to the passage 161 via the pilot line 503 so that the constant pressure Pi is introduced to the pressure receiving chamber 154. Also, the pilot line 502 is connected to the primary side of a solenoid proportional reducing valve 504, and the secondary side of the solenoid proportional reducing valve 504 is connected to the passage 162 via a pilot line 505. The solenoid proportional reducing valve 504 is controlled by a control signal from a controller 506A to produce a variable pressure Pc depending on the control signal, the variable pressure Pc being introduced to the pressure receiving chamber 150.

In this embodiment thus constructed, the seat valve 301 (FIG. 26) functions as follows in combination with the pilot spool valve 407.

Assuming that the pressure in the feeder passage 7A or 7B and the load pressure are respectively Pz, PL as with the case of the first embodiment, and the urging force due to the difference between the constant pressure Pi introduced to the pressure receiving chamber 154 and the variable pressure Pc introduced to the pressure receiving chamber 150 is Fh, the balance among the forces exerted on the pilot spool 141 is expressed by;

$$PL+Fh=Pz \qquad (21)$$

similarly to above Equation (16) for the first embodiment. Equation (21) is rewritten to:

$$Pz-PL=Fh \qquad (22)$$

By using above Equation (12) and this Equation (22), above Equation (18) representing the relationship between the flow rate passing through the main variable throttle 16A or 16B and the differential pressure across the same is modified to:

$$qs=C4\cdot A/(1+\alpha)\cdot Fh^{\frac{1}{2}} \qquad (23)$$

Also, by using Equation (b 22), Equation (18) is modified to:

$$Qv=C4\cdot A\cdot Fh^{\frac{1}{2}} \qquad (24)$$

Thus, similarly to the sixth embodiment, the flow rate Qv passing through the main variable throttle 16A or 16B of the main spool valve 201A is determined by the urging force Fh and the opening area A of the main variable throttle 16A or 16B irrespective of the supply pressure and the load pressure. The differential pressure Pz - PL across the main variable throttle at this time is set as a value specified by the urging force Fh, as seen from Equation (22).

Consequently, in this embodiment, the seat valve 301 also functions as the auxiliary flow control means for restricting the flow rate of the hydraulic fluid supplied to the main variable throttle 16A or 16B and, on this occasion, the differential pressure Pz - PL across the main variable throttle 16A or 16B is subjected to pressure compensating control so that it is held at the target compensated differential pressure set by the urging force Fh regardless of variations in the load pressure or the supply pressure. Thus, the seat valve 301 can be given with both the pressure compensating function and the load check function.

Furthermore, in this embodiment, the urging force Fd is adjustable by adjusting the pressure Pc, and the pressure Pc can be adjusted with ease and good controllability by using the controller 506A, the solenoid proportional reducing valve 504, etc. Accordingly, it is possible to more finely adjust the target compensated differential pressure and to more appropriately control the flow rate Qv passing through the main variable throttle 16A or 16B of the main spool valve 201A, whereby the operability of actuators is further improved.

It should be noted that while the foregoing embodiments are arranged to provide one of the plurality of directional control valve devices constituting the hydraulic control valve apparatus with the auxiliary flow control function by combination of the seat valve and the pilot spool valve, other one or all of the directional control valve devices may be arranged similarly so as to have the auxiliary flow control function. This enables that one or all of the directional control valve devices to have improved flow control characteristics, with the result of similar advantages.

Tenth Embodiment

A tenth embodiment of the present invention will be described with reference to FIGS. 27 and 28. The tenth to fourteenth embodiments are intended to implement pressure compensating control in a valve apparatus provided with a flow control valve of center closed type by using, as the flow restricting signal, a differential pressure across a main variable throttle in itself. In those figures, identical members to those in FIGS. 1, 2, 4, 6 and 18 to 20 are denoted by the same reference numerals and will not be described here.

Figure 27:
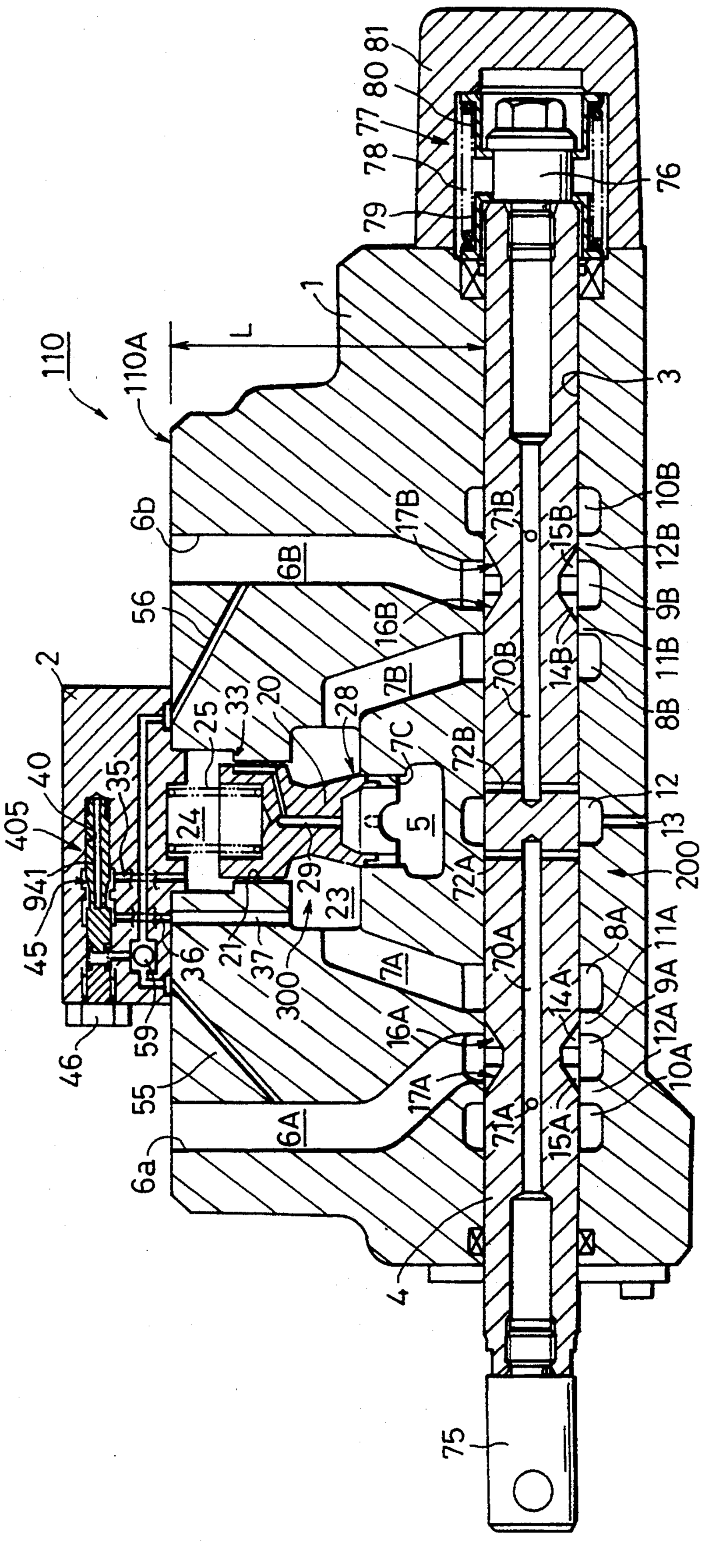
FIG. 27 is a sectional view of a hydraulic control valve apparatus according to a tenth embodiment of the present invention.
Figure 28:
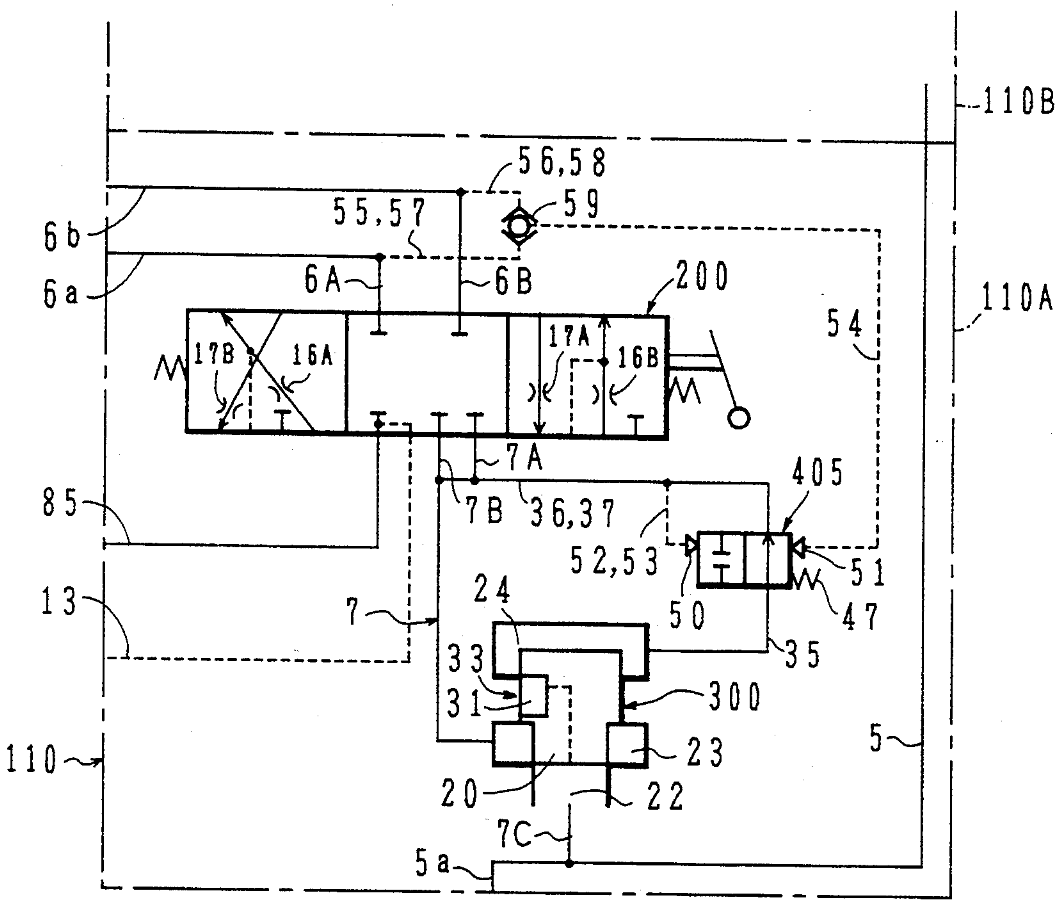
FIG. 28 is a circuit diagram of the hydraulic control valve apparatus shown in FIG. 27.

In FIGS. 27 and 28, a hydraulic control valve apparatus of this embodiment is generally denoted by reference numeral 110. The hydraulic control valve apparatus 110 comprises, as shown in FIG. 28, a plurality of directional control valve devices including first and second directional control valve devices 110A, 110B. Also, the hydraulic control valve apparatus 110 comprises a housing 1 common to the plurality of directional control valve devices, and a fixed block 2 associated with each of the plurality of directional control valve devices and attached integrally to the housing 1. The first directional control valve device 110A comprises a main spool valve 200 assembled in the housing 1 for constituting a flow control valve of closed center type, a seat valve 300 assembled in the housing 1, and a pilot spool valve 405 assembled in the fixed block 2 for constituting a pilot flow control valve.

The main spool valve 200 is constructed as follows. A bore 3 is formed to penetrate through the housing 1, and a main spool 4 of the main spool valve 200 is slidably inserted in the bore 3. In the housing 1, there are also formed a pump passage 5 having a pump port 5*a* (see FIG. 28) connected to a hydraulic source (not shown), load passages 6A, 6B having load ports 6*a*, 6*b* connected to a not-shown actuator, and a feeder passage 7 (7A, 7B, 7C) branched from the pump passage 5 and being able to communicate with the load passages 6A, 6B.

The bore 3 is also formed with annular feeder passages 8A, 8B serving as parts of the feeder passages 7A, 7B, annular load passages 9A, 9B serving as parts of the load passages 6A, 6B, and annular drain passages 10A, 10B communicating with a reservoir port 85 (see FIG. 28). Lands 11A, 12A are formed respectively between the feeder passage 8A and the load passage 9A and between the load passage 9A and the drain passage 10A. Lands 11B, 12B are formed respectively between the feeder passage 8B and the load passage 9B and between the load passage 9B and the drain passage 10B. Further, the bore 3 is formed near the center with a load sensing passage 12 for detecting the load pressure, and the housing 1 is formed with a load sensing port 13 for taking out the load pressure detected in the load sensing passage 12 to the outside.

The main spool 4 is formed with notches 14A, 14B and notches 15A, 15B. The notch 14A cooperates with the land 11A to form a meter-in main variable throttle 16A positioned between the feeder passage 8A and the load passage 9A. The variable throttle 16A is changed from a fully closed position to a predetermined maximum position in its opening area depending on the amount of movement of the main spool 4 in the direction toward the right in FIG. 27. The notch 14B cooperates with the land lib to form a meter-in main variable throttle 16B positioned between the feeder passage 8B and the load passage 9B. The variable throttle 16B is changed from a fully closed position to a predetermined maximum position in its opening area depending on the amount of movement of the main spool 4 in the direction toward the left in FIG. 27. Also, the notch 15B cooperates with the land 12B to form a meter-out main variable throttle 17B positioned between the load passage 9B and the drain passage 10B. The variable throttle 17B is changed from a fully closed position to a predetermined maximum position in its opening area depending on the amount of movement of the main spool 4 in the direction toward the left in FIG. 27. The notch 15A cooperates with the land 12A to form a meter-out main variable throttle 17A positioned between the load passage 9A and the drain passage 10A. The variable throttle 17A is changed from a fully closed position to a predetermined maximum position in its opening area depending on the amount of movement of the main spool 4 in the direction toward the right in FIG. 27.

The seat valve 300 is the same as the seat valve 300 in the first embodiment. The pilot spool valve 405 and the associated pilot lines are the same as the pilot spool valve 405 and the associated pilot lines in the sixth embodiment.

Also, the second directional control valve device 110B and other directional control valve devices are of the same construction as the first directional control valve device 110A.

In the hydraulic control valve apparatus 110 of this embodiment constructed as described above, above Equations (1) to (12) described in connection with the first embodiment and above Equations (16) to (20) described in connection with the sixth embodiment are held for the seat valve 300 similarly to the sixth embodiment. More specifically, in the seat valve 300 of the first directional control valve device 110A, the opening area of the pilot flow groove 31 formed in the seat valve body 20 with respect to the land 32 (i.e., the opening area of the control variable throttle 33) is changed depending on the amount of movement (stroke) of the seat valve body 20. The amount of movement of the seat valve body 20 is determined depending on the pilot flow rate passing through the pilot flow groove 31 (the control variable throttle 33). Also, the pilot flow rate is determined by the opening area of the variable throttle 45 of the pilot spool valve 405. As a result, the main flow rate passing from the feeder passage 7C to the feeder passage 23 through the auxiliary variable throttle 28 of the seat valve body 20 is in proportion to the pilot flow rate and, therefore, is determined by the opening area of the variable throttle 45 of the pilot spool valve 405.

Further, in the pilot spool valve 405, the opening area of the variable throttle 45 is controlled such that it is changed in accordance with the differential pressure across the main variable throttle 16A or 16B as the flow restricting signal.

Consequently, in combination with the pilot lines 24, 29 to 31 and 35 to 37 (see FIG. 4) and the pilot spool valve 405, the seat valve 300 restricts the flow rate of the hydraulic fluid supplied from the pump passage 5 to the main variable throttle 16A or 16B through the feeder passage 7 in accordance with the differential pressure across the main variable throttle 16A or 16B (i.e., the flow restricting signal), thereby carrying out the auxiliary flow control function with which the flow rate of the hydraulic fluid flowing into each of the pair of load passages 6A, 6B is auxiliarily controlled.

Further, other features that the seat valve 300 has the load check function, the height L of the housing 1 is not increased, and the structure is simple, are obtained similarly to the first and sixth embodiments.

Consequently, according to this embodiment, the auxiliary flow control function (pressure compensating function) with high control accuracy can be achieved in the hydraulic control valve apparatus 110 provided with the spool valve 200 as a spool type flow control valve of closed center type. Also, the pressure loss is not increased even with the provision of the pressure compensating function and the load check function, and the actuator can be driven with smaller energy loss. Further, it is possible to make the housing compact, to more easily mount the valve apparatus on construction machines and manufacture it, and to reduce the production cost of the valve apparatus.

Eleventh Embodiment

Figure 29:
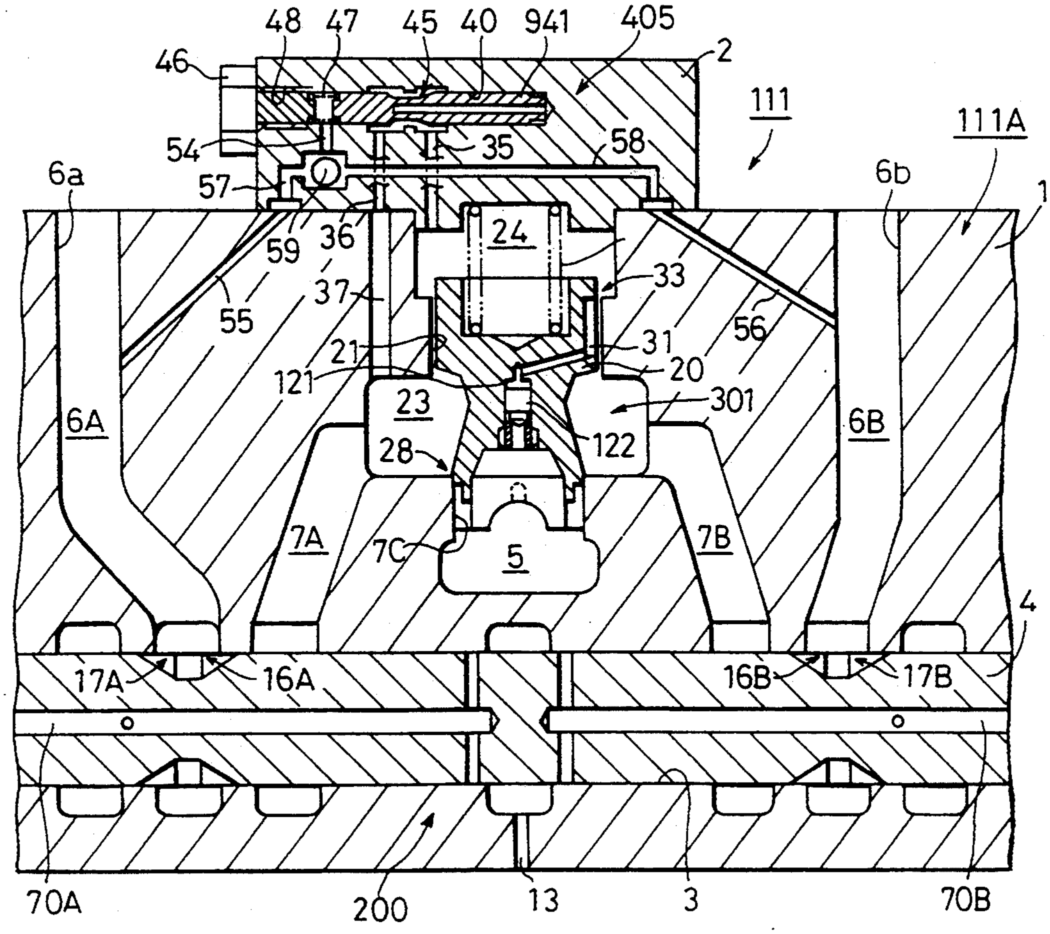
FIG. 29 is a sectional view of a hydraulic control valve apparatus according to an eleventh embodiment of the present invention.
Figure 30:
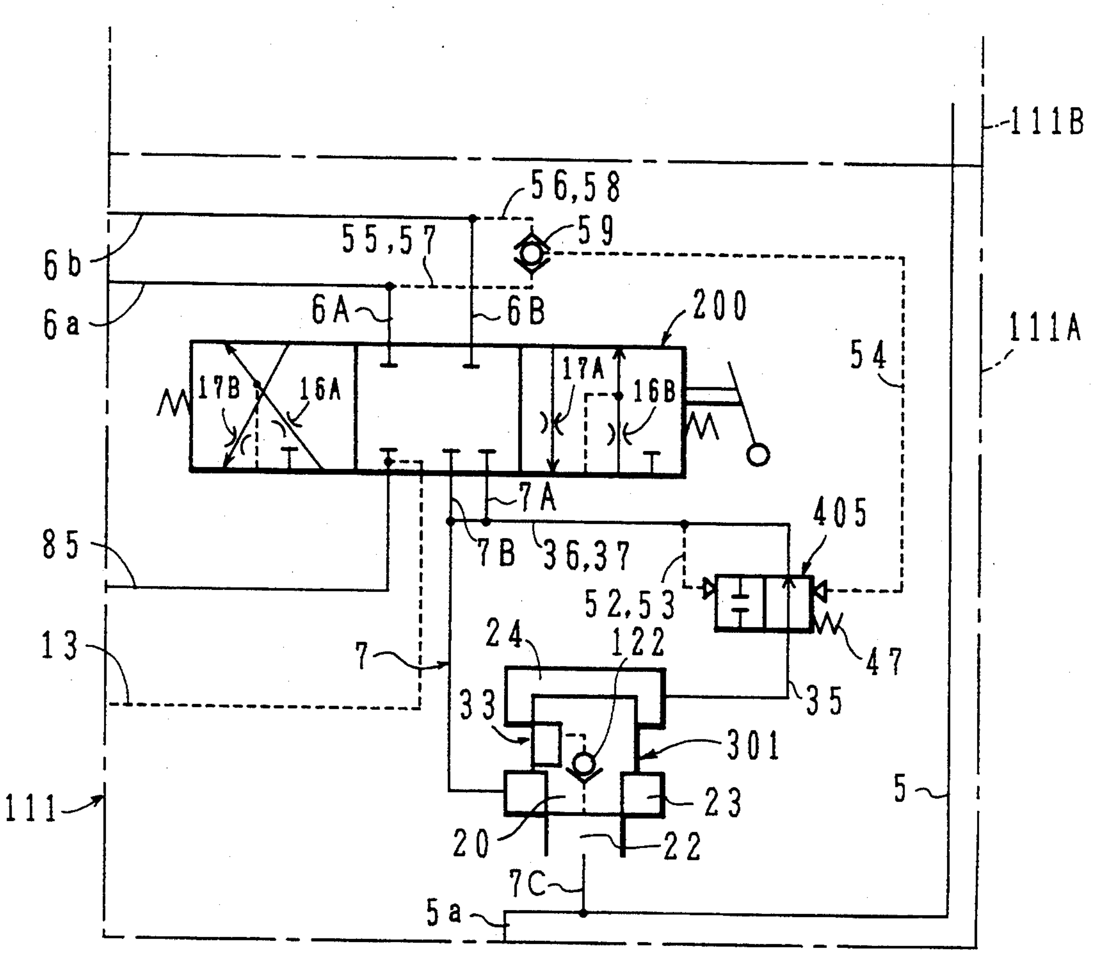
FIG. 30 is a circuit diagram of the hydraulic control valve apparatus shown in FIG. 29.

An eleventh embodiment of the present invention will be described with reference to FIGS. 29 and 30. In these figures, identical members to those in FIGS. 8, 9, 27 and 28 are denoted by the same reference numerals. This embodiment is intended to modify the tenth embodiment in a like manner to the second embodiment such that, in a first directional control valve device 111A of a hydraulic control valve apparatus 111, a check valve 122 is disposed in a passage 121 of the seat valve 301. Also, a pilot flow groove 31A formed in the seat valve body 20 is set in the positional relationship with respect to the land 32 such that, as indicated by F-C in FIG. 10, a control variable throttle 33A is slightly opened when the seat valve body 20 is in its closed position. Note that the check valve may be installed at any position along the pilot line. As with the second embodiment, according to this embodiment, it is possible to produce the stable pilot flow, improve the accuracy in flow control, and to more easily manufacture the control variable throttle 33A. Further, any leak of the hydraulic fluid through the pilot line is completely prevented and the load check function with a high degree of liquid tightness can be achieved.

Twelfth Embodiment

Figure 31:
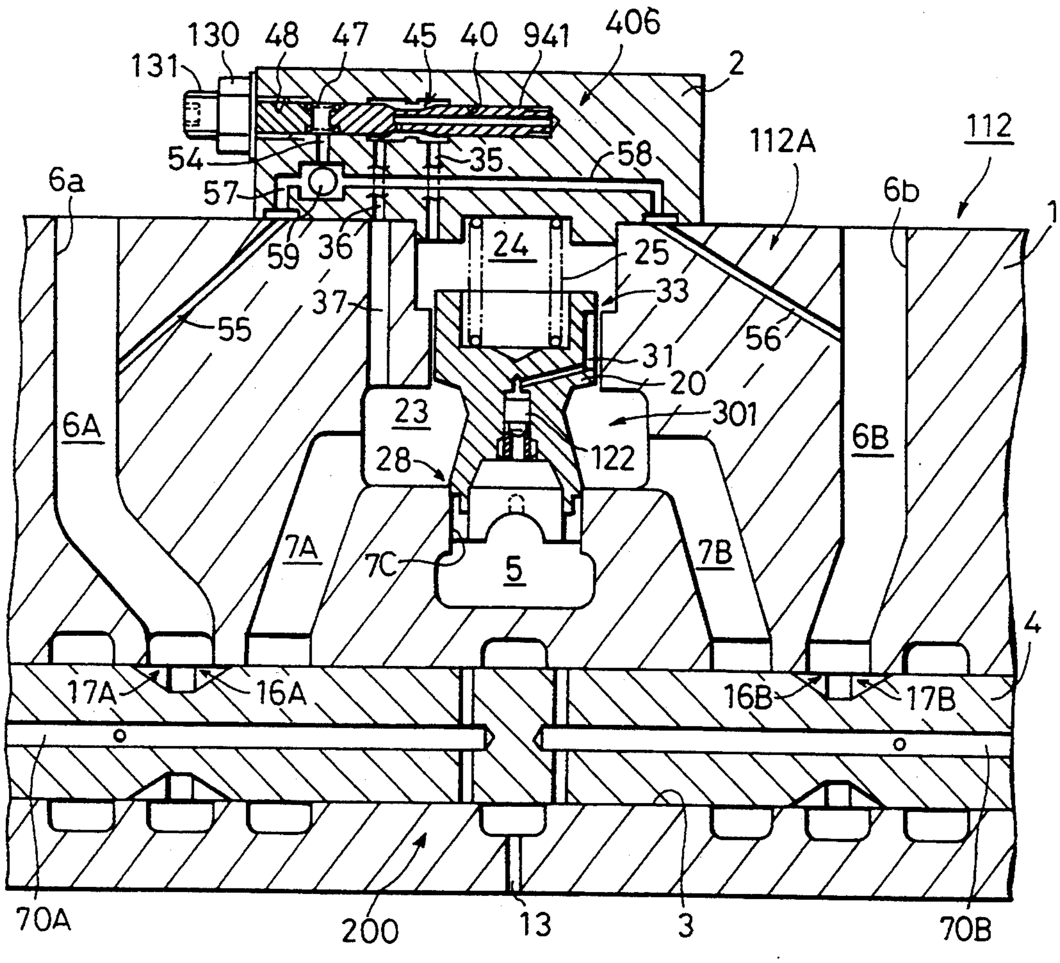
FIG. 31 is a sectional view of a hydraulic control valve apparatus according to a twelfth embodiment of the present invention.
Figure 32:
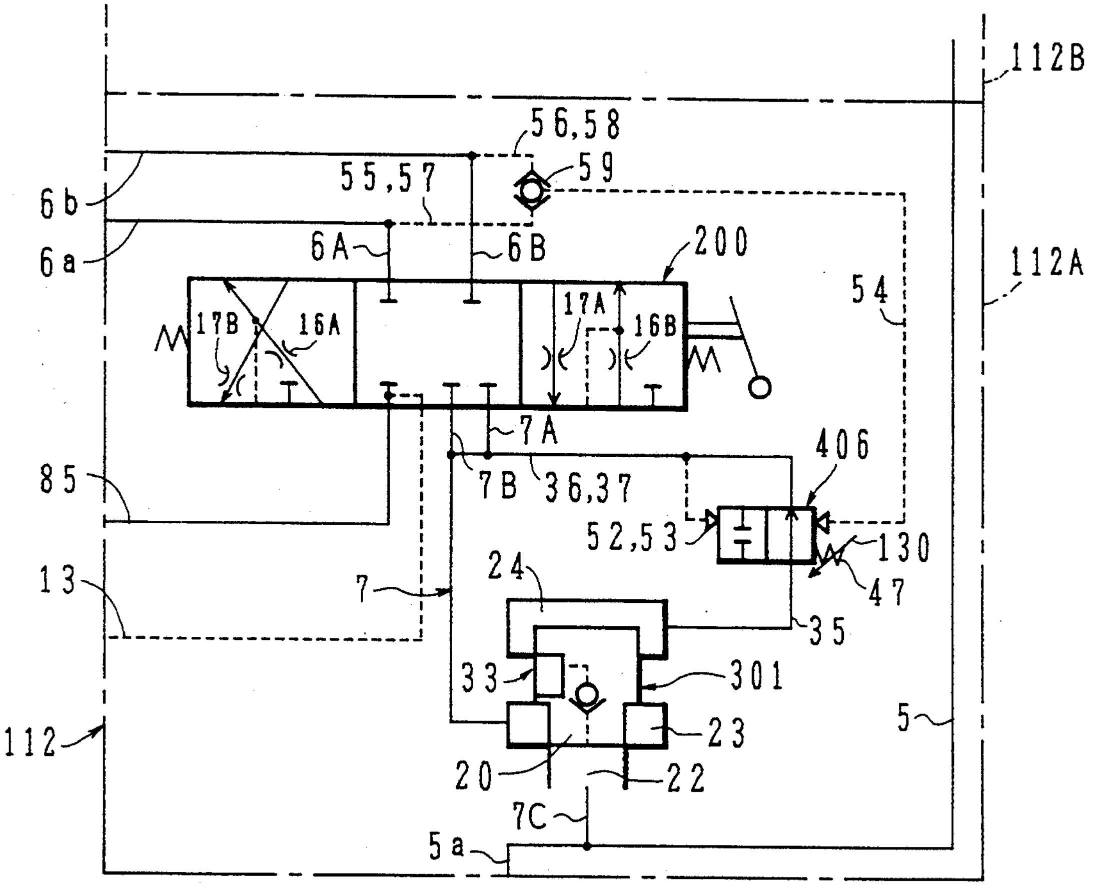
FIG. 32 is a circuit diagram of the hydraulic control valve apparatus shown in FIG. 31.

A twelfth embodiment of the present invention will be described with reference to FIGS. 31 and 32. In these figures, identical members to those in FIGS. 23, 24, 27, 28 and 29 are denoted by the same reference numerals. This embodiment is intended to modify the tenth embodiment in a like manner to the eighth embodiment such that, in a pilot spool valve 406 of a hydraulic control valve apparatus 112, the open end of the bore 40 is closed by an adjuster screw 130 and an operating portion 131 is provided on the head of the adjuster screw 130.

As with the eighth embodiment, according to this embodiment, the optimum pressure compensating characteristic and flow characteristic can be set depending on the type of actuator to be driven by the hydraulic control valve apparatus 112, the type of actuator load and so on, whereby the operability is improved.

Thirteenth Embodiment

A thirteenth embodiment of the present invention will be described with reference to FIG. 33. In this figure, identical members to those in FIGS. 25, 26, 27, 28 and 29 are denoted by the same reference numerals. This embodiment is intended to modify the tenth embodiment in a like manner to the ninth embodiment such that hydraulic force generating means is provided instead of the spring as target compensated differential pressure setting means for the pilot spool valve, and a pressure introduced to the hydraulic force generating means is varied to make the target compensated differential pressure adjustable.

Figure 33:
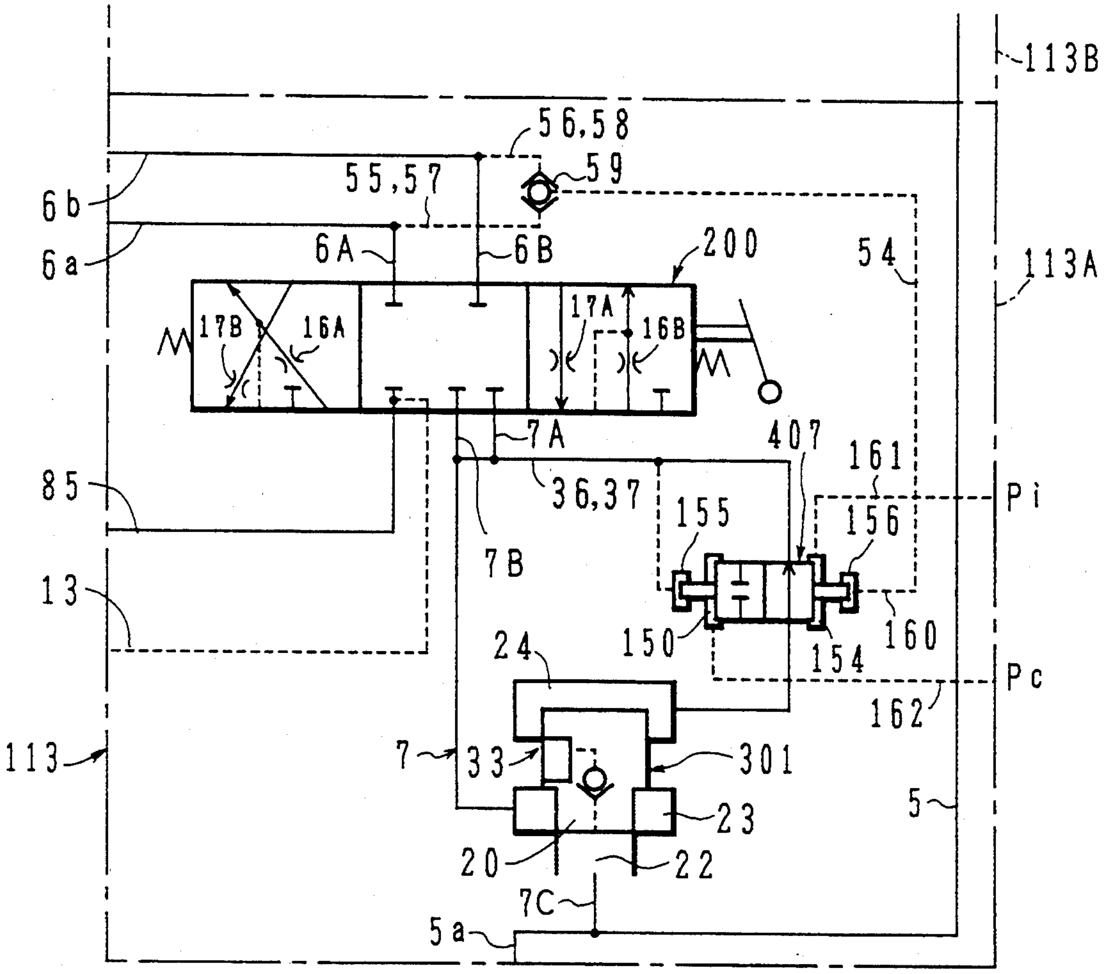
FIG. 33 is a circuit diagram of a hydraulic control valve apparatus according to a thirteenth embodiment of the present invention.

Specifically, in FIG. 33, a directional control valve device 113A of a hydraulic control valve apparatus 113 of this embodiment includes a pilot spool valve 407 which is of the same construction as the pilot spool valve 407 in the ninth embodiment.

Also, for producing the constant pressure introduced to the pressure receiving chamber 154 and the variable pressure introduced to the pressure receiving chamber 150, the pilot pump 500, the solenoid proportional reducing valve 504, and the controller 506A shown in FIG. 25 are provided similarly to the ninth embodiment.

According to this embodiment, above Equations (21) to (24) are held as with the ninth embodiment, resulting in a similar advantage to that of the ninth embodiment.

Consequently, in this embodiment, the seat valve 301 also functions as the auxiliary flow control means for restricting the flow rate of the hydraulic fluid supplied to the main variable throttle 16A or 16B and, on this occasion, the seat valve 301 simultaneously carries out pressure compensating function so that the differential pressure Pz - PL across the main variable throttle 16A or 16B is held at the target compensated differential pressure specified by the urging force Fh regardless of variations in the load pressure or the supply pressure. Thus, the seat valve 301 can be given with both the pressure compensating function and the load check function.

Furthermore, in this embodiment, the urging force Fh is adjustable by adjusting the pressure Pc, and the pressure Pc can be adjusted with ease and good controllability by using the controller 506, the solenoid proportional reducing valve 504, etc. Accordingly, it is possible to more finely adjust the target compensated differential pressure and to more appropriately control the flow rate Qv passing through the main variable throttle 16A or 16B of the main spool valve 200, whereby the operability of actuators is further improved.

Fourteenth Embodiment

A fourteenth embodiment of the present invention will be described with reference to FIGS. 34 to 36. In these figures, identical members to those in FIGS. 27, 28 and 29 are denoted by the same reference numerals. This embodiment is intended to provide, as target compensated differential pressure setting means for the pilot spool valve, means for applying an urging force based on a differential pressure between the pump delivery pressure and the maximum load pressure.

Figure 34:
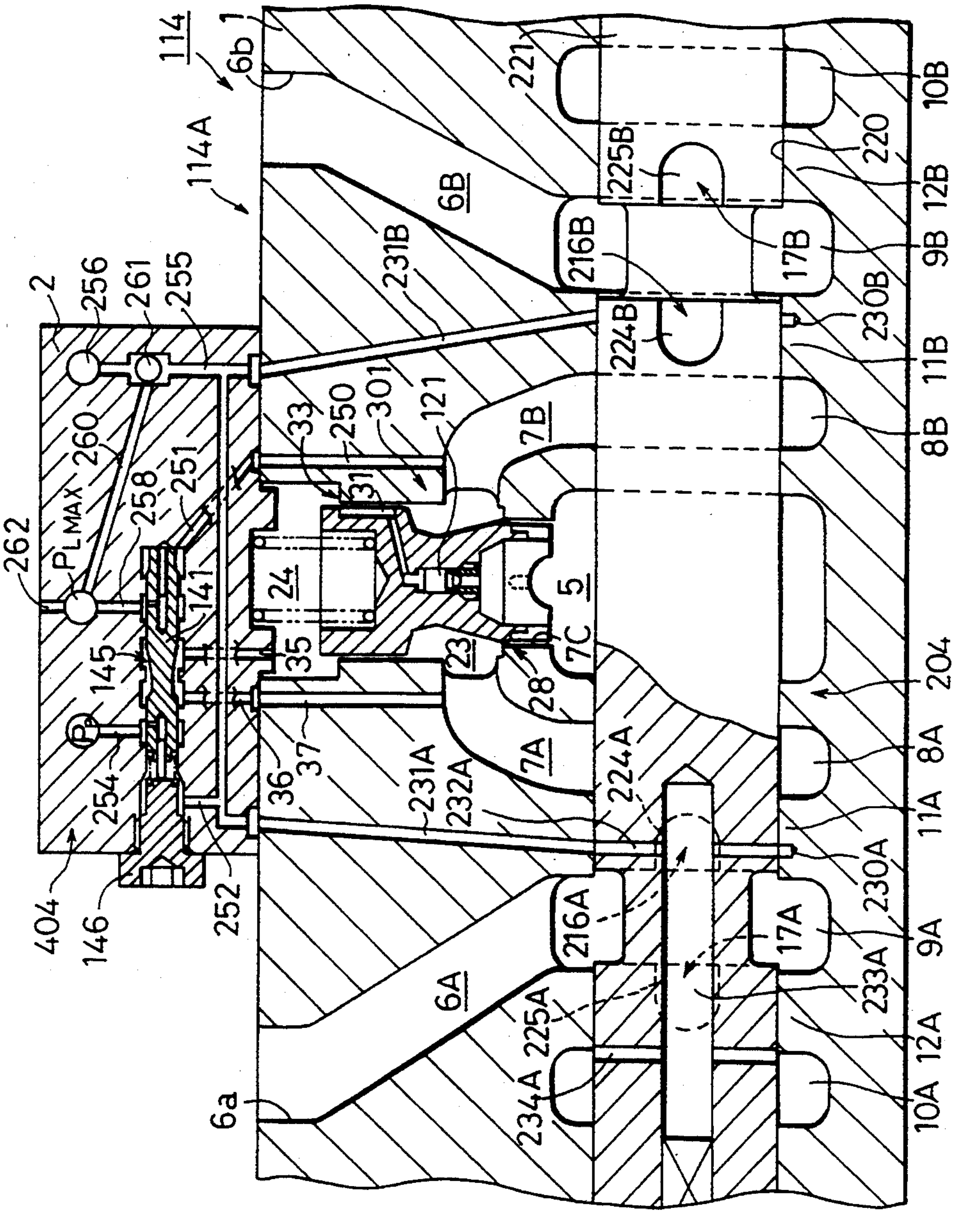
FIG. 34 is a sectional view of a hydraulic control valve apparatus according to a fourteenth embodiment of the present invention.
Figure 35:
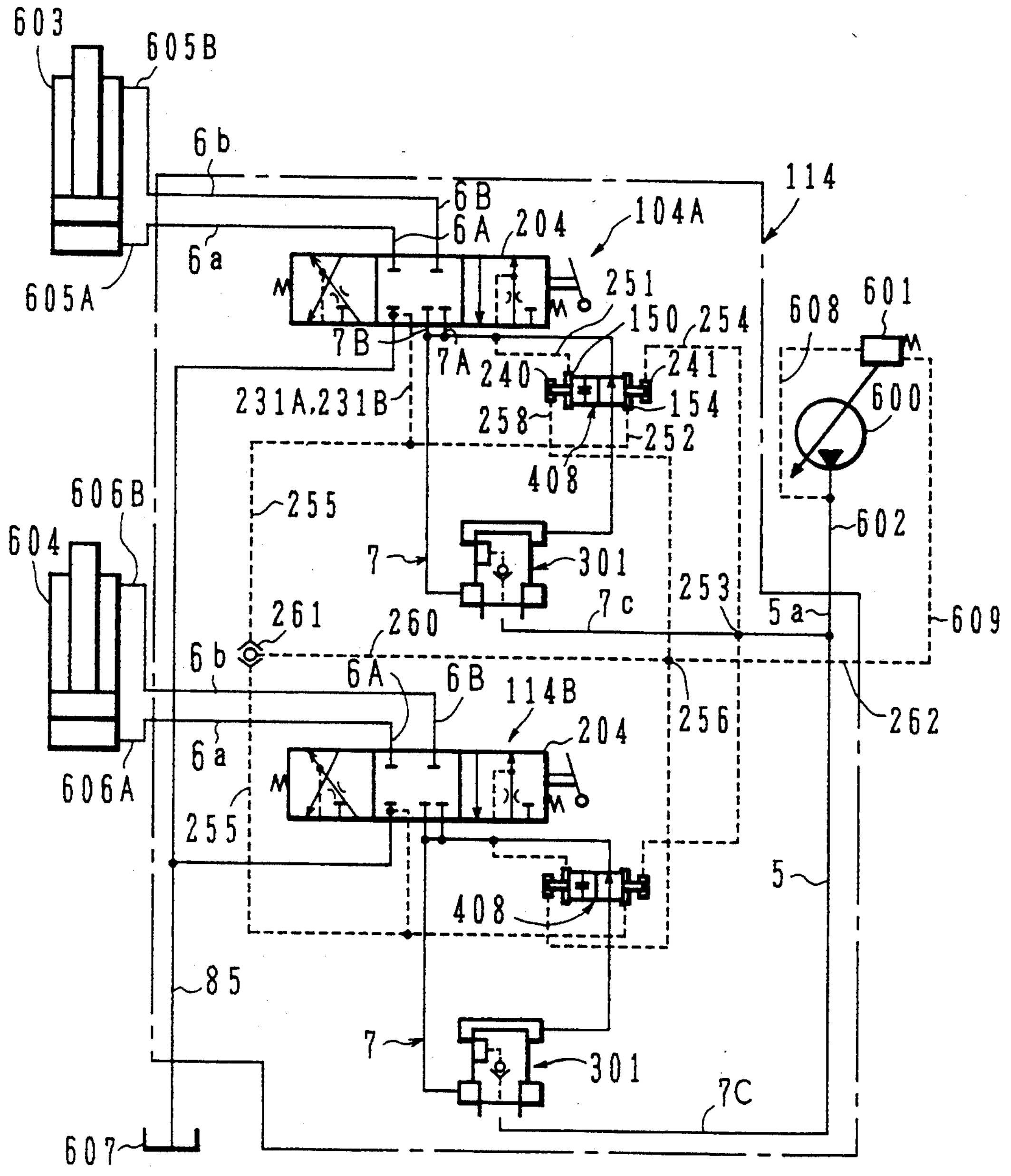
FIG. 35 is a circuit diagram of the hydraulic control valve apparatus shown in FIG. 34.

In FIGS. 34 and 35, a hydraulic control valve apparatus 114 of this embodiment comprises a first directional control valve device 114A and a second directional control valve device 114B. The first directional control valve device 114A is made in combination of a main spool valve 204, a seat valve 301, and a pilot pool valve 408.

More specifically, in FIG. 34, a bore 220 is formed to penetrate through the housing 1, and a main spool 221 of the main spool valve 204 is slidably inserted in the bore 220. In the housing 1, there are also formed load passages 6A, 6B having load ports **6*a*, 6*b* connected to a not-shown actuator, a pump passage 5 having a pump port 5*a*, and a feeder passage 7 (7A, 7B, 7C) branched from the pump passage 5 and being able to communicate with the load passages 6A, 6B**.

Similarly to the embodiment shown in FIG. 27, the bore 220 is also formed with annular feeder passages 8A, 8B, annular load passages 9A, 9B, and annular drain passages 10A, 10B, with lands 11A, 11B and 11B, 12B formed respectively between these passages. Further, the bore 220 is formed in its central portion with an annular passage serving as the pump passage 5, the pump port **5*a* of the pump passage 5 being connected to a hydraulic pump 600 (see FIG. 35**).

The main spool 221 is formed with notches 224A, 224B and notches 225A, 225B. The notch 224A cooperates with the land 11A to form a meter-in main variable throttle 16A positioned between the feeder passage 8A and the load passage 9A. The variable throttle 16A is changed from a fully closed position to a predetermined maximum position in its opening area depending on the amount of movement of the main spool 221 in the direction toward the right in FIG. 34. The notch 224B cooperates with the land 11B to form a meter-in main variable throttle 16B positioned between the feeder passage 8B and the load passage 9B. The variable throttle 225B is changed from a fully closed position to a predetermined maximum position in its opening area depending on the amount of movement of the main spool 221 in the direction toward the left in FIG. 34. Also, the notch 225B cooperates with the land 12B to form a meter-out main variable throttle 17B positioned between the load passage 9B and the drain passage 10B. The variable throttle 17B is changed from a fully closed position to a predetermined maximum position in its opening area depending on the amount of movement of the main spool 221 in the direction toward the right in FIG. 34. The notch 225A cooperates with the land 12A to form a meter-out main variable throttle 17A positioned between the load passage 9A and the drain passage 10A. The variable throttle 17A is changed from a fully closed position to a predetermined maximum position in its opening area depending on the amount of movement of the main spool 221 in the direction toward the right in FIG. 34.

At the junction between the feeder passage 7C and the feeder passages 7A, 7B, a valve body (hereinafter also referred to as a seat valve body) 20 of the seat valve 301 is disposed. The seat valve 301 is of the same construction as the seat valve of the second embodiment shown in FIG. 29, and will not be described here.

Additionally, the lands 11A, 11B are formed with annular load sensing chambers 230A, 230B for detecting the load pressure, and the housing 1 is formed with load sensing passages 231A, 231B connected to the load sensing chambers 230A, 230B. The load sensing chamber 230A is provided at such a position as being able to take out the load pressure in the load passage 9A when the main spool 221 is moved to the right in FIG. 34, and the load sensing chamber 230B is provided at such a position as being able to take out the load pressure in the load passage 9B when the main spool 221 is moved to the left in FIG. 34. Moreover, passages 232A, 233A, 234A are formed in the main spool 221 so that, when the main spool 221 is returned to its neutral position, the load sensing chamber 230A and the load sensing passage 231A are communicated with the drain passage 10A via those passages 232A, 233A, 234A for rendering the detected load pressure reduced down to the reservoir pressure. For the load sensing chamber 230B and the load sensing passage 231B, similar passages are provided in the main spool 221. By so reducing the load pressure detected at the neutral position of the main spool 221, it is possible to prevent the delivery pressure of the hydraulic pump from rising uselessly in the neutral condition, when the valve apparatus is used in a hydraulic drive system of load sensing type.

On the other hand, a pilot spool valve 408 is assembled in the fixed block 2. The construction of the pilot spool valve 408 is similar to that in the embodiments shown in FIGS. 25 and 33, and is illustrated in FIG. 36 in enlarged scale. In FIG. 36, identical members to those in FIG. 25 are denoted by the same reference numerals.

Figure 36:
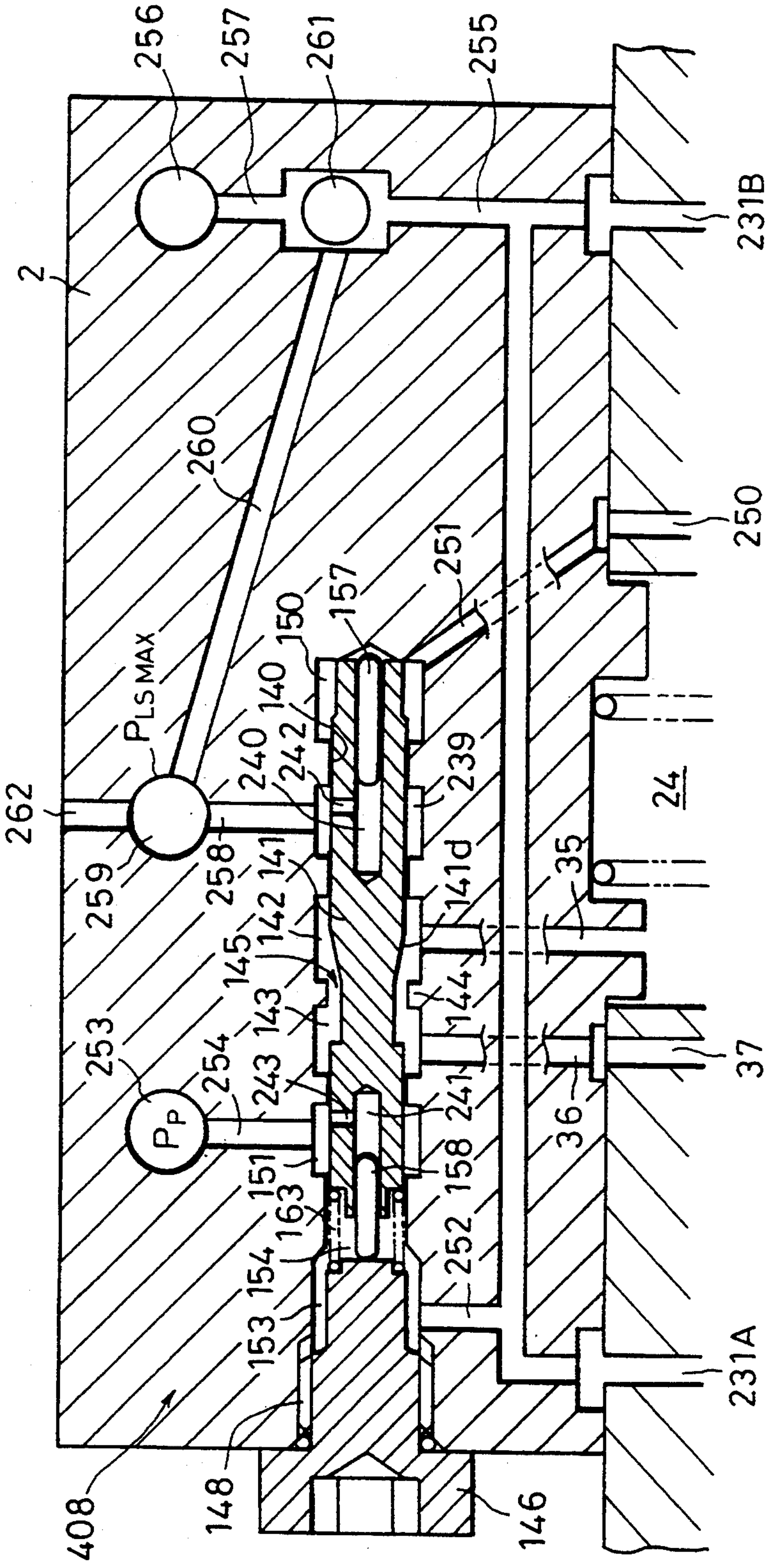
FIG. 36 is an enlarged view of a pilot control valve in the hydraulic control valve apparatus shown in FIG. 34.

Referring to FIG. 36, a bore 240 is formed in the fixed block 2, and a spool (hereinafter referred to as a pilot spool) 141 of the pilot spool valve 408 is slidably fitted in the bore 240.

As with the embodiment shown in FIG. 25, the bore 140 is formed with an annular pressure receiving chamber 150, an annular inlet passage 142, an annular outlet passage 143, an annular passage 151, an annular passage 153, and a threaded hole 148. A screw 146 is fastened to the threaded hole 148 for closing the open end of the bore 140. A pressure receiving chamber 154 communicating with the passage 153 is defined between the screw 146 and the pilot spool 141, with a weak spring 163 disposed in the pressure receiving chamber 154 for preventing vibrations. A land 144 is formed between the inlet passage 142 and the outlet passage 143, and a pilot variable throttle 145 is formed between the land 144 and a sloped portion **141*d* of the pilot spool 141. Further, another annular passage 239 is formed between the pressure receiving chamber 150 and the inlet passage 142**.

Formed inside the pilot spool 141 are pressure receiving chambers 240, 241 extending in the axial direction and accommodating pistons 157, 158 slidably inserted therein on the open end side.

The fixed block 2 is formed with a passage 251 for communicating the pressure receiving chamber 150 with the feeder passages 7A, 7B via a passage 250 formed in the housing 1, and a passage 252 for communicating the passage 153 with the load sensing passages 231A, 231B. Thereby, the pressure in the feeder passage 7A or 7B is introduced to the pressure receiving chamber 150 via the passages 250, 251, and is then applied to the pilot spool 141 in the valve closing direction. The pressure in the load passage 6A or 6B is introduced to the pressure receiving chamber 154 via the load sensing chambers 230A, 230B, the passages 231A, 231B, the passage 252 and the passage 153, and is then applied to the pilot spool 141 in the valve opening direction.

The fixed block 2 is also formed with passages 253, 254 for communicating the passage 151 with the pump passage 5, a passage 255 communicating with the load sensing passages 231A, 231B, passages 256, 257 communicating with similar load sensing passages for another not-shown directional control valve, and the passages 258, 259, 260 communicating with the passage 239. Between the passage 260 and the passages 255, 256, a shuttle valve 261 is disposed for taking out higher one of the pressures in the passages 255, 256 to the passage 260. The supply pressure of the pump port, i.e., the delivery pressure of the hydraulic pump, is introduced to the pressure receiving chamber 241 via the passages 253, 254 and the passages 151, 243, and is then applied to the pilot spool 141 in the valve opening direction. Also, the maximum load pressure among a plurality of actuators is introduced to the pressure receiving chamber 240 via the passages 255, 256, 257, the shuttle valve 261, the passages 258, 259, 260 and the passages 239, 242, and is then applied to the pilot spool 141 in the valve closing direction.

The fixed block 2 is further formed with a load sensing port 262 communicating with the passage 259 for tanking out the maximum load pressure to the outside.

In addition, the second directional control valve device 114B is of essentially the same structure as the first directional control valve device 114A, as shown in FIG. 35. Identical members are denoted by the same reference numerals and will not described here.

The circuit configuration of a hydraulic drive system in which the hydraulic control valve apparatus 114 constructed as described above is employed is shown in FIG. 35 together. Referring to FIG. 35, denoted by 600 is a hydraulic pump of variable displacement type of which displacement is controlled by a regulator 601 of load sensing type. A delivery line 602 of the hydraulic pump 600 is connected to the pump port **5*a* of the hydraulic control valve apparatus 114**. Also, 603, 604 are hydraulic actuators. The load ports *6a, 6b* of the first directional control valve device 114A are connected to the first actuator 603 via actuator lines 605A, 605B, and the second actuator 604 is connected to load ports *6a, 6b* of the second directional control valve device 114B via actuator lines 606A, 606B. Further, reservoir ports 85 of the first and second directional control valve devices 114A, 114B are connected to a reservoir 607 via reservoir ports 85. A delivery pressure of the hydraulic pump 600 is introduced to the passage 254, and higher one of load pressures of the hydraulic actuators 603, 604 is introduced as the maximum load pressure to the passage 260, these two pressures being then introduced respectively to the pressure receiving chambers 241, 240.

Further, introduced to the regulator 601 are the delivery pressure of the hydraulic pump 600 via a pilot line 608 and the maximum load pressure via a pilot line 609 connected to the load sensing ports 262. As well known, the regulator 601 controls the displacement of the hydraulic pump 600 based on the pump delivery pressure and the maximum load pressure so that the differential pressure therebetween is held at a predetermined value.

Accordingly, in the pilot spool valve 408, an urging force due to the differential pressure between the pump delivery pressure introduced to the pressure receiving chamber 240 and the maximum load pressure introduced to the pressure receiving chamber 241 acts instead of the preset force of the spring 47 as target compensated differential pressure setting means in the tenth embodiment shown in FIG. 27, thereby providing the seat valve 301 with both the pressure compensating function and the load check function similarly to the tenth embodiment.

More specifically, assuming that the pressure receiving chamber 150, 154 have the same pressure receiving area, the pressure receiving chamber 240, 241 have the same pressure receiving area, the pressure in the feeder passage 7A or 7B and the load pressure are respectively Pz, PL as with the case of the tenth embodiment, the delivery pressure of the hydraulic pump 600 is Pp, and the maximum load pressure is PLSmax, the balance among the forces exerted on the pilot spool 141 is expressed by;

$$Pp+PL=Pz+PLSmax \quad (25)$$

similarly to above Equation (13) for the tenth embodiment. Equation (25) is rewritten to:

$$Pz-PL=Pp-PLSmax=Fd \quad (26)$$

Therefore, the differential pressure between the pump delivery pressure and the maximum load pressure serves as the urging force Fd of the flow setting means.

By using above Equation (12) and this Equation (26), above Equation (18) representing the relationship between the flow rate passing through the main variable throttle 16A or 16B and the differential pressure across the same is modified to:

$$qs=C4\cdot A/(1+\alpha)\cdot Fd^{\frac{1}{2}} \quad (27)$$

Also, by using Equation (26), Equation (18) is modified to:

$$Qv=C4\cdot A\cdot Fd^{\frac{1}{2}} \quad (28)$$

Thus, similarly to the first embodiment, the flow rate Qv passing through the main variable throttle 16A or 16B of the main spool valve 204 is determined by the urging force Fd and the opening area A of the main variable throttle 16A or 16B irrespective of the supply pressure and the load pressure. The differential pressure Pz - PL across the main variable throttle at this time corresponds to the urging force Fd, as seen from Equation (26).

Consequently, in this embodiment, the seat valve 301 also functions as the auxiliary flow control means for restricting the flow rate of the hydraulic fluid supplied to the main variable throttle 16A or 16B and, on this occasion, the differential pressure Pz - PL across the main variable throttle 16A or 16B is subjected to pressure compensating control so that it is held at the target compensated differential pressure set by the urging force Fd regardless of variations in the load pressure or the supply pressure. Thus, the seat valve 301 can be given with both the pressure compensating function and the load check function.

Furthermore, in this embodiment, the target values of the differential pressures across the main variable throttles of the first and second directional control valve devices 114A, 114B (i.e., the target compensated differential pressure) are set by the same the urging force Fd due to the differential pressure between the delivery pressure of the hydraulic pump 600 subjected to load sensing control and the maximum load pressure. Accordingly, if the delivery rate of the hydraulic pump 600 becomes insufficient during the combined operation of the hydraulic actuators 603, 604, the differential pressure between the pump delivery pressure and the maximum load pressure is lowered, and the target values of the differential pressures across the main variable throttles are reduced in common to the two directional control valves. As a result, similarly to the hydraulic control valve apparatus described in the above-cited JP, A, 60-11706, it is possible to solve the problem that a large amount of the hydraulic fluid is supplied to an actuator having a light load and an actuator having a heavy load is likely not to be driven, and hence to achieve the proper combined operation.

INDUSTRIAL APPLICABILITY

According to the present invention, in a hydraulic control valve apparatus and a hydraulic drive system for use in construction machines such as hydraulic excavators, the auxiliary flow control function with high control accuracy can be effected without increasing the pressure loss and enlarging the structure, by using a flow control valve of spool type which has high reliability resulted from practical use for long years and is easy to design.

Also, in a hydraulic control valve apparatus and a hydraulic drive system including a flow control valve of center bypass type, a flow rate of the hydraulic fluid only supplied to the flow control valve of interest can be auxiliarily controlled during the combined operation in which a plurality of actuators are simultaneously driven, whereby efficiency of the combined operation can be improved.

Further, in a hydraulic control valve apparatus and a hydraulic drive system including a flow control valve of center bypass type, the pressure compensating function can be effected and efficiency of the combined operation can be improved.

Additionally, in a hydraulic control valve apparatus and a hydraulic drive system including a flow control valve of closed center type, the pressure compensating function can be effected without increasing the pressure loss and enlarging the structure.

What is claimed is:

1. A hydraulic control valve apparatus comprising a housing (1), a pump passage (5) formed in said housing, and at least one directional control valve means (100A; 101A; 102A; 103A; 105A; 106A; 107A; 108A; 110A; 111A; 112A; 113A; 114A) assembled in said housing, said directional control valve means comprising a main spool (4A; 4; 221) slidably disposed in said housing to form a pair of main variable throttles (16A, 16B) to constitute a flow control valve (200A; 201A; 200; 204), a feeder passage (7) formed in said housing for supplying a hydraulic fluid from said pump passage to said pair of main variable throttles, and a pair of load passages (6A, 6B) formed in said housing, into which load passages the hydraulic fluid having passed through said pair of main variable throttles flows respectively, wherein said directional control valve means (100A; 101A; 102A; 103A; 105A; 106A; 107A; 108A; 110A; 111A; 112A; 113A; 114A) further comprises auxiliary flow control means for restricting a flow rate of the hydraulic fluid supplied from said pump passage (5) to said pair of main variable throttles (16A, 16B) through said feeder passage (7) to auxiliarily controlled a flow rate of the hydraulic fluid flowing into said pair of load passages (6A, 6B), said auxiliary flow control means including:

(a) a seat valve (300, 301) disposed in said feeder passage, said seat valve (300, 301) having a seat valve body (20) movably disposed in said housing (1) to form an auxiliary variable throttle (28) in said feeder passage, and a control variable throttle (33) formed in said seat valve body for changing an opening area in accordance with an amount of movement of said seat valve body;

(b) a pilot line (24, 29–31, 35–37) for communicating a portion (7C) of said feeder passage upstream of said auxiliary variable throttle (28) with a downstream portion (7A, 7B) of said feeder passage through said control variable throttle to determine the amount of movement of said seat valve body in accordance with a flow rate of the hydraulic fluid passing through said pilot line; and (c) pilot flow control means (400; 401; 403; 405; 406; 407; 408) having a pilot variable throttle (45) disposed in said pilot line and input means (800; 52–59; 159, 54–59; 231A, 231B, 251, 252) for receiving a flow restricting signal whereby an opening area of said pilot variable throttle is changed in accordance with said received flow restricting signal to control a flow rate of the hydraulic fluid passing through said pilot line.

2. A hydraulic control valve apparatus according to claim 1, wherein said directional control valve means (100A; 101A; 102A; 103A; 105A; 106A; 107A; 108A; 110A; 111A; 112A; 113A; 114A) further comprises a fixed block (2) for holding said seat valve body (300; 301) in said housing (1) through a spring (25), and said pilot flow control means includes a pilot spool valve (400; 401; 403; 405; 406; 407; 408) assembled in said fixed block.

3. A hydraulic control valve apparatus according to claim 2, wherein said pilot spool valve (400; 401; 403; 405; 406; 407; 408)includes a pilot spool (41; 820; 843; 941; 141) disposed parallel to said main spool (4A; 4; 221).

4. A hydraulic control valve apparatus according to claim 1, wherein said seat valve (300, 301) is disposed perpendicularly to said main spool (4A; 4; 221).

5. A hydraulic control valve apparatus according to claim 1, wherein said feeder passage (7) includes a first passage portion (7C) located upstream of said auxiliary variable throttle (28) and communicating with said pump passage (5), and second and third passage portions (7A, 7B) located downstream of said auxiliary variable throttle on opposed sides of said first passage portion and communicating with said pair of main variable throttles (16A, 16B), respectively, said seat valve (300; 301) being disposed at a junction (23) between said first passage portion and said second and third passage portions.

6. A hydraulic control valve apparatus according to claim 1, wherein an opening characteristic of said control variable throttle (33) is set such that said control variable throttle is slightly opened at a fully closed position of said seat valve (301), and said directional control valve means (101A; 102A; 103A; 106A; 107A; 108A; 111A; 112A; 113A; 114A) further comprises a check valve (122) disposed in said pilot line (24, 29–31, 35–37) for preventing the hydraulic fluid from flowing reversely.

7. A hydraulic control valve apparatus according to claim 6, wherein said check valve (122) is assembled in said seat valve body (20).

8. A hydraulic control valve apparatus according to claim 1, wherein said apparatus comprises a plurality of directional control valve means (100A–100C; 101A; 102A; 103A; 105A–105C; 106A; 107A; 108A; 110A, 110B; 111A, 111B; 112A; 112B; 113A, 113B; 114A, 114B) of spool type assembled in said housing (1), at least one (100A; 101A; 102A; 103A; 105A; 106A; 107A; 108A; 110A; 111A; 112A; 113A; 114A) of these directional control valve means including said auxiliary flow control means (300, 400, etc.).

9. A hydraulic control valve apparatus according to claim 1, wherein said input means of the pilot flow control means (400; 401; 403) includes a passage (800) through which a hydraulic signal created externally of said directional control valve means (100A; 101A; 102A; 103A) is input as said flow restricting signal.

10. A hydraulic control valve apparatus according to claim 1, wherein said input means of the pilot flow control means (405; 406; 407; 408) includes passages (52–59; 159, 54–59; 231A, 231B, 251, 252) through which a differential pressure across each of said pair of main variable throttles is introduced as said flow restricting signal.

11. A hydraulic control valve apparatus according to claim 1, wherein said pilot flow control means (400; 401; 403; 405; 406; 407; 408) includes a pilot spool (41; 820; 843; 941; 141) forming said pilot variable throttle (45), first urging means (47; 821; 844; 150, 154; 240, 241) for applying a predetermined urging force to said pilot spool in the valve opening direction, and second urging means (50, 51; 155, 156; 150, 154) connected to said input means (800; 52–59; 159, 54–59; 231A, 231B, 251, 252) for applying an urging force in accordance with said flow restricting signal to said pilot spool in the valve closing direction.

12. A hydraulic control valve apparatus according to claim 11, wherein said first urging means includes a spring (47) for urging said pilot spool (41; 820; 843; 941) with a predetermined preset force in the valve opening direction.

13. A hydraulic control valve apparatus according to claim 12, wherein said pilot flow control means (406) further includes operating means (130, 131) capable of externally adjusting the preset force of said spring (47).

14. A hydraulic control valve apparatus according to claim 11, wherein said first urging means includes at least one pressure receiving chamber ( 821; 844; 150, 154; 240, 241) for exerting a predetermined hydraulic force upon said pilot spool (820; 843; 141) in the valve opening direction.

15. A hydraulic control valve apparatus according to claim 11, wherein said second urging means includes at least one pressure receiving chamber (50, 51; 155, 156;

150, 154) for exerting a hydraulic force in accordance with said flow restricting signal to said pilot spool (41; 820; 843; 941; 141) in the valve closing direction.

16. A hydraulic control valve apparatus according to claim 11, wherein said input means includes a passage (800) through which a hydraulic signal created externally of said directional control valve means (100A; 101A; 102A; 103A) is introduced as said flow restricting signal to said second biasing means (50).

17. A hydraulic control valve apparatus according to claim 16, wherein said first urging means includes a pressure receiving chamber (821) to which an inlet pressure of each of said pair of main variable throttle (16A, 15B) is introduced.

18. A hydraulic control valve apparatus according to claim 16, wherein said first urging means includes a pressure receiving chamber (844) to which a pressure in said pump passage (5) is introduced.

19. A hydraulic control valve apparatus according to claim 11, wherein said input means includes passages (52–59; 159, 54–59; 231A, 231B, 251, 252) through which a differential pressure across each of said pair of main variable throttles (16A, 16B) is introduced as said flow restricting signal to said second urging means (50, 51; 155, 156; 150, 154), and the predetermined urging force applied by said first urging means (47; 150, 154; 240, 241) sets a target compensated differential pressure for the differential pressure across each of said pair of main variable throttles.

20. A hydraulic control valve apparatus according to claim 19, wherein the predetermined urging force for setting said target compensated differential pressure is constant.

21. A hydraulic control valve apparatus according to claim 19, wherein the predetermined urging force for setting said target compensated differential pressure is variable.

22. A hydraulic drive system comprising a hydraulic pump (700); a plurality of hydraulic actuators (701–703) driven by a hydraulic fluid delivered from said hydraulic pump; the hydraulic control valve apparatus (100; 101; 102; 103) according to claim 1 comprising at least first and second directional control valve means (100A–100C; 101A; 102A; 103A) including flow control valves (200A) of spool type operated in accordance with respective operating signals for controlling respective flow rates of the hydraulic fluid supplied to said plurality of hydraulic actuators, at least said first directional control valve means (100A; 101A; 102A; 103A) being the directional control valve means including said auxiliary flow control means (300, 400, etc.); and signal producing and transmitting means (802, 803; 500–507) for producing said flow restricting signal externally of said first directional control valve means and introducing the produced signal to said input means (800) of the pilot flow control means (400; 401; 403).

23. A hydraulic drive system according to claim 22, wherein said signal producing and transmitting means comprises means (802) for detecting an operating signal applied to said second directional control valve means (100B), and means (803) for introducing the detected operating signal as said flow restricting signal to the input means (800) of said pilot flow control means (400; 401; 403).

24. A hydraulic drive system according to claim 22, wherein said signal producing and transmitting means comprises setting means (507) operated by an operator for outputting a set signal, means (500–504, 506) for producing a control signal in accordance with said set signal, and means (505) for introducing said control signal as said flow restricting signal to the input means (800) of said pilot flow control means (400).

25. A hydraulic drive system according to claim 22, wherein said signal producing and transmitting means comprises means (507) operated by an operator for outputting a set signal, means (500–504, 506, 510–511) for producing a control signal in accordance with the operating signal applied to said second directional control valve means (100B) and said set signal, and means (505) for introducing said control signal as said flow restricting signal to the input means (800) of said pilot flow control means (400).

26. A hydraulic drive system according to claim 22, wherein said flow control valve is a spool valve (200A) of center bypass type.

27. A hydraulic drive system comprising a hydraulic pump (700); a plurality of hydraulic actuators (701–703) driven by a hydraulic fluid delivered from said hydraulic pump; and the hydraulic control valve apparatus (105; 106; 107; 108) according to claim 1 comprising at least first and second directional control valve means (105A–105C; 106A; 107A; 108A) including flow control valves (201A) of spool type operated in accordance with respective operating signals for controlling respective flow rates of the hydraulic fluid supplied to said plurality of hydraulic actuators, at least said first directional control valve means (105A; 106A; 107A; 108A) being the directional control valve means including said auxiliary flow control means, said input means of the pilot flow control means (405; 406; 407) including passages (52–59; 159, 54–59) through which a differential pressure across each of said pair of main variable throttles (16A, 16B) of the flow control valve associated with said first directional control valve means is introduced as said flow restricting signal.

28. A hydraulic drive system according to claim 27, wherein said flow control valve is a spool valve (201A) of center bypass type.

29. A hydraulic drive system comprising a hydraulic pump (600); a plurality of hydraulic actuators (603, 604) driven by a hydraulic fluid delivered from said hydraulic pump; and the hydraulic control valve apparatus (110; 111; 112; 113; 114) according to claim 1 comprising at least first and second directional control valve means (110A, 110B; 111A, 111B; 112A, 112B; 113A, 113B; 114A, 114B) including flow control valves (200; 204) of spool type operated in accordance with respective operating signals for controlling respective flow rates of the hydraulic fluid supplied to said plurality of hydraulic actuators, said first and second directional control valve means each being the directional control valve means including said auxiliary flow control means (300, 400, etc.), said input means of the pilot flow control means (405; 406; 407; 408) including passages (52–59; 159, 54–59; 231A, 231B, 251, 252) through which a differential pressure across each of said pair of main variable throttles (16A, 16B) of the flow control valve associated with the corresponding directional control valve means is introduced as said flow restricting signal.

30. A hydraulic drive system according to claim 29, wherein said flow control valve is a spool valve (200; 204) of closed center type.

31. A hydraulic drive system according to claim 27, wherein said pilot flow control means (405; 406; 407; 408) includes a pilot spool (941; 141) forming said pilot variable throttle (45), first urging means (47; 150, 154; 240, 241) for applying a predetermined urging force to said pilot spool in the valve opening direction, and second urging means (50, 51; 155, 156; 150, 154) connected to said input means (52–59; 159, 54–59; 231A, 231B, 251, 252) for applying an urging force corresponding to a differential pressure across each of said pair of main variable throttles (16A, 16B) to said pilot spool in the valve closing direction.

32. A hydraulic drive system according to claim 31, further comprising means (500–506A) for producing a variable pressure and introducing the variable pressure to said first urging means, wherein said first urging means includes a hydraulic chamber (154) for exerting a hydraulic force corresponding to said variable pressure upon said pilot spool (141) as said predetermined urging force.

33. A hydraulic drive system according to claim 31, further comprising means (261) for detecting maximum one of load pressures of said plurality of actuators (603, 604) and means (258, 260, 253, 254) for introducing a delivery pressure of said hydraulic pump (600) and said maximum load pressure to said first urging means, wherein said first urging means includes at least one hydraulic chamber (240, 241) for exerting a hydraulic force corresponding to a differential pressure between said delivery pressure and said maximum load pressure upon said pilot spool as said predetermined urging force.

34. A hydraulic control valve apparatus according to claim 2, wherein said apparatus comprises a plurality of directional control valve means (100A–100C; 101A; 102A; 103A; 105A–105C; 106A; 107A; 108A; 110A, 110B; 111A, 111B; 112A; 112B; 113A, 113B; 114A, 114B) of spool type assembled in said housing (1), at least one (100A; 101A; 102A; 103A; 105A; 106A; 107A; 108A; 110A; 111A; 112A; 113A; 114A) of these directional control valve means including said auxiliary flow control means (300, 400, etc.).

35. A hydraulic control valve apparatus according to claim 3, wherein said apparatus comprises a plurality of directional control valve means (100A–100C; 101A; 102A; 103A; 105A–105C; 106A; 107A; 108A; 110A, 110B; 111A, 111B; 112A;. 112B; 113A, 113B; 114A, 114B) of spool type assembled in said housing (1), at least one (100A; 101A; 102A; 103A; 105A; 106A; 107A; 108A; 110A; 111A; 112A; 113A; 114A) of these directional control valve means including said auxiliary flow control means (300, 400, etc.).

36. A hydraulic control valve apparatus according to claim 4, wherein said apparatus comprises a plurality of directional control valve means (100A–100C; 101A; 102A; 103A; 105A–105C; 106A; 107A; 108A; 110A, 110B; 111A, 111B; 112A; 112B; 113A, 113B; 114A, 114B) of spool type assembled in said housing (1), at least one (100A; 101A; 102A; 103A; 105A; 106A; 107A; 108A; 110A; 111A; 112A; 113A; 114A) of these directional control valve means including said auxiliary flow control means (300, 400, etc.).

37. A hydraulic control valve apparatus according to claim 5, wherein said apparatus comprises a plurality of directional control valve means (100A–100C; 101A; 102A; 103A; 105A–105C; 106A; 107A; 108A; 110A, 110B; 111A, 111B; 112A; 112B; 113A, 113B; 114A, 114B) of spool type assembled in said housing (1), at least one (100A; 101A; 102A; 103A; 105A; 106A; 107A; 108A; 110A; 111A; 112A; 113A; 114A) of these directional control valve means including said auxiliary flow control means (300, 400, etc.).

38. A hydraulic control valve apparatus according to claim 6, wherein said apparatus comprises a plurality of directional control valve means (100A–100C; 101A; 102A; 103A; 105A–105C; 106A; 107A; 108A; 110A, 110B; 111A, 111B; 112A; 112B; 113A, 113B; 114A, 114B) of spool type assembled in said housing (1), at least one (100A; 101A; 102A; 103A; 105A; 106A; 107A; 108A; 110A; 111A; 112A; 113A; 114A) of these directional control valve means including said auxiliary flow control means (300, 400, etc.).

39. A hydraulic drive system according to claim 29, wherein said pilot flow control means (405; 406; 407; 408) includes a pilot spool (941; 141) forming said pilot variable throttle (45), first urging means (47; 150, 154; 240, 241) for applying a predetermined urging force to said pilot spool in the valve opening direction, and second urging means (50, 51; 155, 156; 150, 154) connected to said input means (52–59; 159, 54–59; 231A, 231B, 251, 252) for applying an urging force corresponding to a differential pressure across each of said pair of main variable throttles (16A, 16B) to said pilot spool in the valve closing direction.

* * * * *